(12) United States Patent
Lorenzo

(10) Patent No.: US 6,837,633 B2
(45) Date of Patent: Jan. 4, 2005

(54) STROKE-BASED INPUT OF CHARACTERS FROM AN ARBITRARY CHARACTER SET

(75) Inventor: Philip C. Lorenzo, Bellevue, WA (US)

(73) Assignee: Ventris, Inc., Bellevue, WA (US)

( * ) Notice: Subject to any disclaimer, the term of this patent is extended or adjusted under 35 U.S.C. 154(b) by 0 days.

(21) Appl. No.: 10/197,284

(22) Filed: Jul. 16, 2002

(65) Prior Publication Data

US 2003/0202832 A1 Oct. 30, 2003

Related U.S. Application Data

(63) Continuation of application No. 09/540,170, filed on Mar. 31, 2000, now abandoned.

(51) Int. Cl.⁷ .................................................. B41J 5/06
(52) U.S. Cl. ........................ 400/100; 400/472; 400/489; 400/103
(58) Field of Search ................................ 400/100, 103, 400/472, 489

(56) References Cited

U.S. PATENT DOCUMENTS

| | | | |
|---|---|---|---|
| 4,173,753 A | 11/1979 | Chou | 340/146.3 |
| 4,443,794 A | 4/1984 | Sakurai | 340/748 |
| 4,724,423 A | 2/1988 | Kinoshita | 340/365 |
| 4,872,196 A * | 10/1989 | Royer et al. | 455/564 |
| 5,047,932 A | 9/1991 | Hsieh | 364/419 |
| 5,067,165 A | 11/1991 | Nishida | 382/19 |
| 5,084,833 A | 1/1992 | Matsuda et al. | 364/709.04 |
| 5,109,352 A | 4/1992 | O'Dell | 395/150 |
| 5,303,150 A | 4/1994 | Kameda | 364/419.08 |
| 5,680,630 A | 10/1997 | Saint-Laurent | 395/796 |
| 5,724,031 A * | 3/1998 | Huang | 341/28 |
| 5,724,457 A | 3/1998 | Fukushima | 382/311 |
| 5,734,749 A | 3/1998 | Yamada et al. | 382/187 |
| 5,818,437 A | 10/1998 | Grover et al. | 345/326 |
| 5,945,928 A | 8/1999 | Kushler et al. | 341/28 |
| 5,952,942 A | 9/1999 | Balakrishnan et al. | 341/20 |
| 5,953,541 A | 9/1999 | King et al. | 395/887 |
| 6,005,495 A | 12/1999 | Connolly et al. | 341/22 |
| 6,009,444 A | 12/1999 | Chen | 707/535 |
| 6,231,252 B1 * | 5/2001 | Kitamura | 400/484 |

* cited by examiner

*Primary Examiner*—Charles H. Nolan, Jr.
(74) *Attorney, Agent, or Firm*—Mark R. Hennings; Merchant & Gould

(57) ABSTRACT

A method and apparatus for assigning a relatively large character set to a small keyboard. The apparatus includes a keyboard having a plurality of keys in a rectangular array. Each key is assigned to a stroke similar to handwriting strokes. A virtual keyboard is described with two alternate configurations. Combinations of keystrokes are used to resolve the characters with the order of keystrokes determined by analogy to scanning the character under the method.

10 Claims, 25 Drawing Sheets

| ア | イ | ウ | エ | オ | カ | ガ |
|---|---|---|---|---|---|---|
| 401 | 402 | 403 | 404 | 405 | 406 | 407 |
| キ | ギ | ク | グ | ケ | ゲ | コ |
| 408 | 409 | 410 | 411 | 412 | 413 | 414 |
| ゴ | サ | ザ | シ | ジ | ス | ズ |
| 415 | 416 | 417 | 418 | 419 | 420 | 421 |
| セ | ゼ | ソ | ゾ | タ | ダ | チ |
| 422 | 423 | 424 | 425 | 426 | 427 | 428 |
| ヂ | ツ | ヅ | テ | デ | ト | ド |
| 429 | 430 | 431 | 432 | 433 | 434 | 435 |
| ナ | ニ | ヌ | ネ | ノ | ハ | バ |
| 436 | 437 | 438 | 439 | 440 | 441 | 442 |

Figure 10

| | | | | | | |
|---|---|---|---|---|---|---|
| 尢 | 尸 | 中 | 山 | 巛 | 工 | 己 |
| 543 | 544 | 545 | 546 | 547 | 548 | 549 |
| 巾 | 干 | 幺 | 广 | 廴 | 廾 | 弋 |
| 550 | 551 | 552 | 553 | 554 | 555 | 556 |
| 弓 | 彐 | 彡 | 彳 | 心 | 戈 | 戶 |
| 557 | 558 | 559 | 560 | 561 | 562 | 563 |
| 手 | 支 | 攴 | 文 | 斗 | 斤 | 方 |
| 564 | 565 | 566 | 567 | 568 | 569 | 570 |
| 无 | 日 | 曰 | 月 | 木 | 欠 | 止 |
| 571 | 572 | 573 | 574 | 575 | 576 | 577 |
| 歹 | 殳 | 毋 | 比 | 毛 | 氏 | 气 |
| 578 | 579 | 580 | 581 | 582 | 583 | 584 |

Figure 13

| | | | | | | |
|---|---|---|---|---|---|---|
| 水 | 气 | 爪 | 父 | 爻 | 爿 | 片 |
| 585 | 586 | 587 | 588 | 589 | 590 | 591 |
| 牙 | 牛 | 犬 | 玄 | 玉 | 瓜 | 瓦 |
| 592 | 593 | 594 | 595 | 596 | 597 | 598 |
| 甘 | 生 | 用 | 田 | 疋 | 疒 | 癶 |
| 599 | 600 | 601 | 602 | 603 | 604 | 605 |
| 白 | 皮 | 皿 | 目 | 矛 | 矢 | 石 |
| 606 | 607 | 608 | 609 | 610 | 611 | 612 |
| 示 | 禸 | 禾 | 穴 | 立 | 竹 | 米 |
| 613 | 614 | 615 | 616 | 617 | 618 | 619 |
| 糸 | 缶 | 网 | 羊 | 羽 | 老 | 而 |
| 620 | 621 | 622 | 623 | 624 | 625 | 626 |

Figure 14

| | | | | | | |
|---|---|---|---|---|---|---|
| 耒 | 耳 | 聿 | 肉 | 臣 | 自 | 至 |
| 627 | 628 | 629 | 630 | 631 | 632 | 633 |
| 臼 | 舌 | 舛 | 舟 | 艮 | 色 | 艸 |
| 634 | 635 | 636 | 637 | 638 | 639 | 640 |
| 虍 | 虫 | 血 | 行 | 衣 | 両 | 見 |
| 641 | 642 | 643 | 644 | 645 | 646 | 647 |
| 角 | 言 | 谷 | 豆 | 豕 | 豸 | 貝 |
| 648 | 649 | 650 | 651 | 652 | 653 | 654 |
| 赤 | 走 | 足 | 身 | 車 | 辛 | 辰 |
| 655 | 656 | 657 | 658 | 659 | 660 | 661 |
| 辶 | 邑 | 酉 | 釆 | 里 | 金 | 長 |
| 662 | 663 | 664 | 665 | 666 | 667 | 668 |

Figure 15

| | | | | | | |
|---|---|---|---|---|---|---|
| 門 | 阜 | 隶 | 隹 | 雨 | 靑 | 非 |
| 669 | 670 | 671 | 672 | 673 | 674 | 675 |
| 面 | 革 | 韋 | 韭 | 音 | 頁 | 風 |
| 676 | 677 | 678 | 679 | 680 | 681 | 682 |
| 飛 | 食 | 首 | 香 | 馬 | 骨 | 高 |
| 683 | 684 | 685 | 686 | 687 | 688 | 689 |
| 髟 | 鬥 | 鬯 | 鬲 | 鬼 | 魚 | 鳥 |
| 690 | 691 | 692 | 693 | 694 | 695 | 696 |
| 鹵 | 鹿 | 麥 | 麻 | 黃 | 黍 | 黑 |
| 697 | 698 | 699 | 700 | 701 | 702 | 703 |
| 黹 | 黽 | 鼎 | 鼓 | 鼠 | 鼻 | 齊 |
| 704 | 705 | 706 | 707 | 708 | 709 | 710 |

Figure 16

| 齒 | 龍 | 龜 | 龠 | | | |
|---|---|---|---|---|---|---|
| 711 | 712 | 713 | 714 | | | |
| 冫 | 厂 | 乛 | 乚 | 乁 | 亻 | 刀 |
| 801 | 802 | 803 | 804 | 805 | 806 | 807 |
| 几 | 𠂉 | 刂 | 卜 | 㔾 | 丷 | 丷 |
| 808 | 809 | 810 | 811 | 812 | 813 | 814 |
| 兀 | 允 | 尢 | 允 | 巳 | 幺 | 互 |
| 815 | 816 | 817 | 818 | 819 | 820 | 821 |
| 彐 | 忄 | 小 | 扌 | 攵 | 旡 | 彐 |
| 822 | 823 | 824 | 825 | 826 | 827 | 828 |
| 彐 | 歨 | 母 | 民 | 氵 | 氺 | 巛 |
| 829 | 830 | 831 | 832 | 833 | 834 | 835 |

Figure 17

| 罒 | 丷 | 斗 | 生 | 犭 | 王 | 疋 |
|---|---|---|---|---|---|---|
| 836 | 837 | 838 | 839 | 840 | 841 | 842 |
| 四 | 示 | 衤 | 𥫗 | 糸 | 纟 | 冈 |
| 843 | 844 | 845 | 846 | 847 | 848 | 849 |
| 穴 | 冗 | 皿 | 𦍌 | 羊 | 芈 | 步 |
| 850 | 851 | 852 | 853 | 854 | 855 | 856 |
| 肀 | 聿 | 月 | 臼 | 艹 | 艹 | 艹 |
| 857 | 858 | 859 | 860 | 861 | 862 | 863 |
| 虎 | 衤 | 襾 | 西 | 见 | 角 | 肉 |
| 864 | 865 | 866 | 867 | 868 | 869 | 870 |
| 讠 | 贝 | 𧾷 | 车 | 辶 | 辶 | 辶 |
| 871 | 872 | 873 | 874 | 875 | 876 | 877 |

Figure 18

| 阝 | 钅 | 長 | 镸 | 长 | 门 | 自 |
|---|---|---|---|---|---|---|
| 878 | 879 | 880 | 881 | 882 | 883 | 884 |

| 雨 | 青 | 韦 | 页 | 飞 | 风 | 食 |
|---|---|---|---|---|---|---|
| 885 | 886 | 887 | 888 | 889 | 890 | 891 |

| 食 | 食 | 饣 | 昝 | 马 | 骨 | 鬼 |
|---|---|---|---|---|---|---|
| 892 | 893 | 894 | 895 | 896 | 897 | 898 |

| 鱼 | 鸟 | 卤 | 麦 | 黄 | 黾 | 斉 |
|---|---|---|---|---|---|---|
| 899 | 900 | 901 | 902 | 903 | 904 | 905 |

| 齐 | 齿 | 齒 | 竜 | 龙 | 龜 | 龟 |
|---|---|---|---|---|---|---|
| 906 | 907 | 908 | 909 | 910 | 911 | 912 |

| 龟 |
|---|
| 913 |

Figure 19

| あ | い | う | え | お | か | が |
|---|---|---|---|---|---|---|
| 1001 | 1002 | 1003 | 1004 | 1005 | 1006 | 1007 |
| き | ぎ | く | ぐ | け | げ | こ |
| 1008 | 1009 | 1010 | 1011 | 1012 | 1013 | 1014 |
| ご | さ | ざ | し | じ | す | ず |
| 1015 | 1016 | 1017 | 1018 | 1019 | 1020 | 1021 |
| せ | ぜ | そ | ぞ | た | だ | ち |
| 1022 | 1023 | 1024 | 1025 | 1026 | 1027 | 1028 |
| ぢ | つ | づ | て | で | と | ど |
| 1029 | 1030 | 1031 | 1032 | 1033 | 1034 | 1035 |
| な | に | ぬ | ね | の | は | ば |
| 1036 | 1037 | 1038 | 1039 | 1040 | 1041 | 1042 |

Figure 20

| | | | | | | |
|---|---|---|---|---|---|---|
| ぱ | ひ | び | ぴ | ふ | ぶ | ぷ |
| 1043 | 1044 | 1045 | 1046 | 1047 | 1048 | 1049 |
| へ | べ | ぺ | ほ | ぼ | ぽ | ま |
| 1050 | 1051 | 1052 | 1053 | 1054 | 1055 | 1056 |
| み | む | め | も | や | ゆ | よ |
| 1057 | 1058 | 1059 | 1060 | 1061 | 1062 | 1063 |
| ら | り | る | れ | ろ | わ | ゐ |
| 1064 | 1065 | 1066 | 1067 | 1068 | 1069 | 1070 |
| ゑ | を | ん | づ | ゛ | ゜ | ゝ |
| 1071 | 1072 | 1073 | 1074 | 1075 | 1076 | 1077 |

Figure 21

| | | | | | | |
|---|---|---|---|---|---|---|
| ء | آ | أ | ؤ | إ | ئ | ا |
| 1101 | 1102 | 1103 | 1104 | 1105 | 1106 | 1107 |
| ب | ة | ت | ث | ج | ح | خ |
| 1108 | 1109 | 1110 | 1111 | 1112 | 1113 | 1114 |
| د | ذ | ر | ز | س | ش | ص |
| 1115 | 1116 | 1117 | 1118 | 1119 | 1120 | 1121 |
| ض | ط | ظ | ع | غ | - | ف |
| 1122 | 1123 | 1124 | 1125 | 1126 | 1127 | 1128 |
| ق | ك | ل | م | ن | ه | و |
| 1129 | 1130 | 1131 | 1132 | 1133 | 1134 | 1135 |

Figure 22

| अ | आ | इ | ई | उ | ऊ | ऋ |
|---|---|---|---|---|---|---|
| 1301 | 1302 | 1303 | 1304 | 1305 | 1306 | 1307 |
| ऌ | एँ | ऎ | ए | ऐ | ऑ | ऒ |
| 1308 | 1309 | 1310 | 1311 | 1312 | 1313 | 1314 |
| ओ | औ | क | ख | ग | घ | ङ |
| 1315 | 1316 | 1317 | 1318 | 1319 | 1320 | 1321 |
| च | छ | ज | झ | ञ | ट | ठ |
| 1322 | 1323 | 1324 | 1325 | 1326 | 1327 | 1328 |
| ड | ढ | ण | त | थ | द | ध |
| 1329 | 1330 | 1331 | 1332 | 1333 | 1334 | 1335 |

Figure 25

| न | ऩ | प | फ | ब | भ | म |
|---|---|---|---|---|---|---|
| 1336 | 1337 | 1338 | 1339 | 1340 | 1341 | 1342 |
| य | र | ऱ | ल | ळ | ऴ | व |
| 1343 | 1344 | 1345 | 1346 | 1347 | 1348 | 1349 |
| श | ष | स | ह | क़ | ख़ | ग़ |
| 1350 | 1351 | 1352 | 1353 | 1354 | 1355 | 1356 |
| ज़ | ड़ | ढ़ | फ़ | य़ | ॠ | ॡ |
| 1357 | 1358 | 1359 | 1360 | 1361 | 1362 | 1363 |

Figure 26

STROKE-BASED INPUT OF CHARACTERS FROM AN ARBITRARY CHARACTER SET

The present application is a continuation under 35 United States Code § 120 of U.S. Utility patent application Ser. No. 09/540,170 filed on Mar. 31, 2000 now abandoned, which application is incorporated herein by reference.

TECHNICAL FIELD

This invention pertains to the manual input of data. In particular this invention pertains to the manual input of alphanumeric text data from a keyboard. With still greater particularity the invention pertains to the manual input of text from a character set of over twelve characters from a twelve key keyboard with minimal assignment of multiple functions to each key.

BACKGROUND OF THE INVENTION

Keyboards are used for the manual input of data to a wide variety of devices. Well-known devices with keyboard inputs include typewriters, computers, calculators, telephones, Personal Digital Assistants, television remote controls, cable set-top receivers, satellite receivers, VCRs, GPS receivers, kitchen appliances, information appliances and games. The data inputted by keyboards include numbers, text, and instructions.

Keyboards fall into two broad classifications. The first classification descended from early typewriters is a substantially rectangular array including a large number of keys. This first type of keyboard assigns an individual key to each character in the alphabet and includes additional keys for numbers and often instructions. The second classification descended from early touch-tone telephones includes a smaller number of keys. This second class has commonly twelve keys arranged in four tiers of three key rows. Both types of keyboards may be used to enter alphanumeric data such as text, numbers, and instructions. By necessity the second class of keyboard assigns multiple characters to each key.

The first typewriters patented in 1868 arranged the keys in alphabetic order. The mechanical nature of these early typewriters caused many common letter combinations to jam. This jamming problem led to the development of the now standard QWERTY keyboard. There have been many alternatives to the QWERTY keyboard proposed, but none have found widespread adoption. This is primarily because of the necessity of retraining operators who with experience are able to touch type.

The second broad classification of keyboards sometimes called data-entry keyboards derive from the first touch-tone telephone keyboard developed by Bell Labs in the 1960's. Such keyboards include a array of twelve keys arranged in four tiers of three keys each. A single digit is assigned to each key. This type of keyboards is very efficient for the entry of numerical data. When such keyboards are used for entry of alphanumeric data such as names, text, and addresses problems arise. Twelve keys are more than is necessary for numerical data, however, other schemes must be used with character sets of twelve or more members. All such systems require the assignment of multiple characters to each key.

The earliest system for imputing alphanumeric data was the now standard telephone touch pad. In this scheme the 2 key is also A, B, and C. 3 is also D, E, and F and so on. The letters Q and Z were not included in then standard touch pad. A shift key (usually * or #) is needed to select the proper letter as most keys have three letters and a number. The touch pad allows the input of alphanumeric data, but is slow and difficult to use. This is because the human mind does not order data in this manner. The result is that the user of such a system must often resort to reciting the alphabet each time they wish to input a letter. Mistakes are frequent and most users loathe the process. The method is unfamiliar to those trained to touch type both due to the different location of the keys and the lack of one-to-one correspondence between keys and symbols.

An alternative to the telephone touch pad method is the multiple pressing of a single key. This method is frequently used in consumer electronic devices such as VCR's, TV's, cellular phones, fax machines, and telephone answering machines. A single key (often an arrow) is pressed once for A, twice for B, and so on. Frequently, the selected letter is highlighted as one scrolls through the alphabet. Usually this system is only used for short text such as a first name or station call letters. Most users become quickly discouraged if more than a few letters are needed.

A third solution has been to try and link the thinking process with the input of data. In such systems each key is pressed once and a look-up table or dictionary is used to determine what word the user is trying to convey. In such systems each key represents more than one letter and the software attempts to resolve the inherent ambiguity. In more advanced systems artificial intelligence allows customization to a particular user. A system of this sort as described in U.S. Pat. No. 5,953,541 to Martin et al. Martin and similar systems have not met with wide scale adoption due to the highly ambiguous nature of a key input equivalent to three or more letters. The mix-matching of letters and words generated by the system may be enough to force users into temporary dyslexia.

The above difficulties have led to the development of touch screens and pen computing. In such systems letters are written by hand with a stylus onto a digitizing pad. Software converts the resulting bitmap data into text. Such software commonly called gesture recognition software is in an ongoing state of development. This type of system is frequently used in Personal Digital Assistant (PDA) or palm computers. The difficulty is that the recognition software requires substantial memory resources and is prone to error.

Each of the above systems was designed with the Latin alphabet in mind with English as the language in of choice. In the majority of the world, however, English is at best a second language. The problems are multiplied if Arabic or Hebrew is attempted to be inputted with any of these keyboards. When Chinese, Korean, or Japanese is tried the problems become near insurmountable. There is a long-standing need for a truly international twelve key keyboard.

Each of the above twelve key keyboards has the additional problem of having an extremely steep learning curve. Due to their unfamiliar nature and individual differences these keyboards are hard to learn and even harder to improve ones skills at. The many VCR's that still flash 12:00, evidence this problem.

SUMMARY OF THE INVENTION

The Invention provides a method for input of alphanumeric data from a twelve plus character set using a twelve key keyboard with unambiguous mapping. The method is equally usable in languages other than English, which use alphabets other than Latin. The apparatus described is usable with such diverse devices as computers, desk phones, cellular and wireless telephones, label writers, hand-held PDAs, television remote, controls, cable set-top receivers, satellite receivers, VCRs, Geo-Positioning Systems (GPS) receivers, keypad terminals, kitchen appliances, information appliances, and games consoles. The method is flexible, easy to learn initially and as a skill.

The method resolves the characters in the many languages used into eleven basic strokes. Combinations of these basic strokes are used to reconstruct the characters of the different alphabets. Choice of order and keystroke is based on a logical method similar to that used to hand write the characters. The interface is similar to the handwriting users learned as children. Initial use is highly intuitive. Continued use and experience rapidly increase speed and accuracy. With the application of shorthand like methods even greater speeds are possible as the method and apparatus has the capability of character-level, word-level and even phrase-level recognition.

BRIEF DESCRIPTION OF THE DRAWINGS

FIG. 10 is a diagram of the first 42 characters of the phonetic Japanese called Katakana.

FIG. 13 is a diagram of the second 42 radicals of CJKV Unified Ideographs.

FIG. 14 is a diagram of the third 42 radicals of CJKV Unified Ideographs.

FIG. 15 is a diagram of the fourth 42 radicals of CJKV Unified Ideographs.

FIG. 16 is a diagram of the fifth 42 radicals of CJKV Unified Ideographs.

FIG. 17 is a diagram of the last 4 radicals of CJKV Unified Ideographs and the first 30 CJKV Simplified and Supplemental Ideographs.

FIG. 18 is a diagram of second 42 CJKV Simplified and Supplemental Ideographs.

FIG. 19 is a diagram of third 36 CJKV Simplified and Supplemental Ideographs.

FIG. 20 is a diagram of the first 42 characters of the phonetic Japanese called Hiragana.

FIG. 21 is a diagram of the next 35 characters of the phonetic Japanese called Hiragana.

FIG. 22 is a diagram of the first 35 characters of the Arabic Alphabet.

FIG. 25 is a diagram of the first 35 characters of the Devanagari Alphabet.

FIG. 26 is a diagram of the next 28 characters of the Devanagari Alphabet.

DETAILED DESCRIPTION OF THE INVENTION

Figure 1:
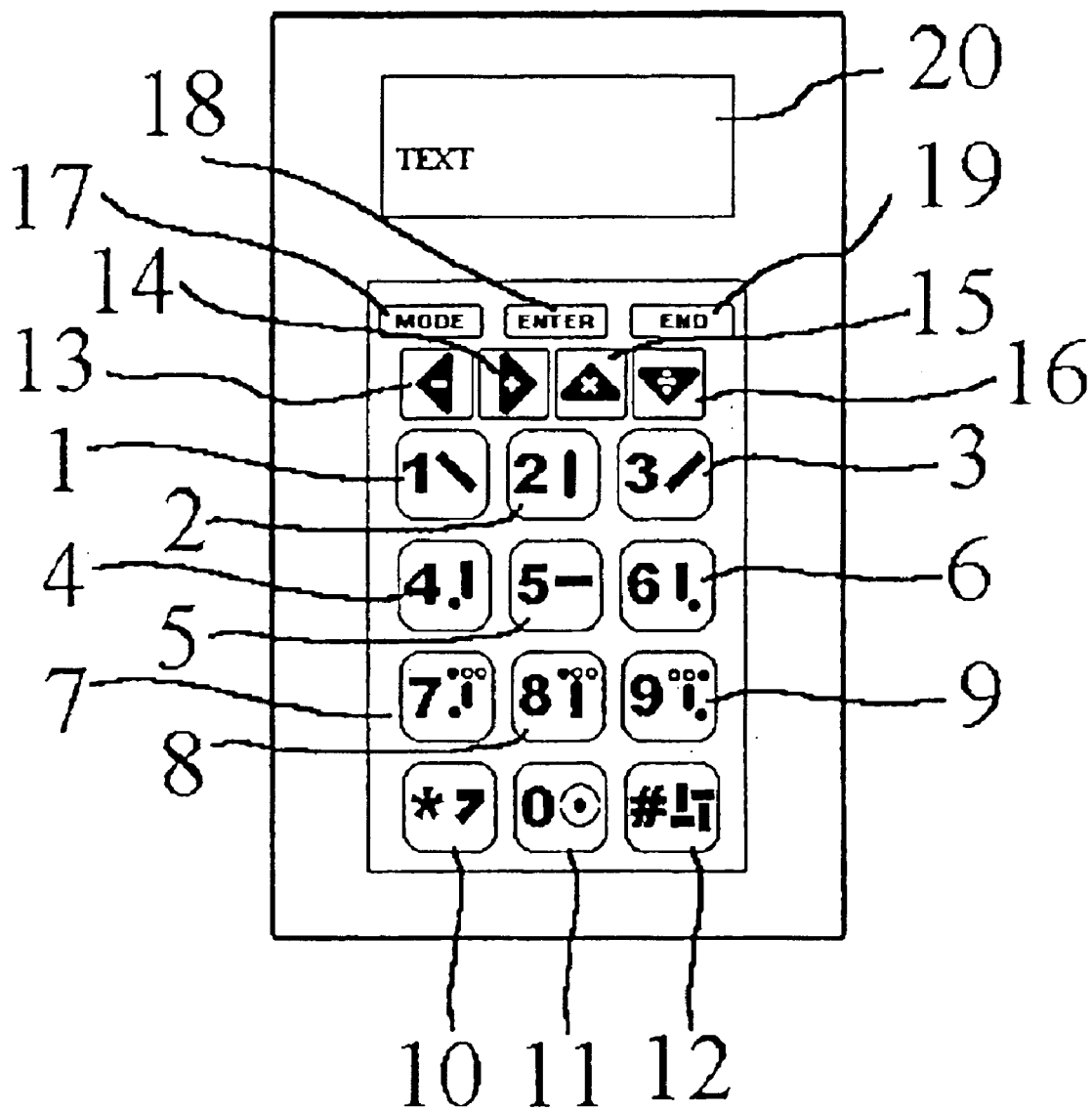
FIG. 1 is a front plan view of a first embodiment of the keyboard of the invention.

FIG. 1 is a front plan view of a first embodiment of the keyboard of the invention. The keyboard has twelve keys, 1–12 arranged in three columns of four keys. The symbols on keys 1–12 are shown as their symbol appears on a standard 5×7 matrix. In addition to these symbols a keyboard may also need arrow keys 13 (←), 14 (→), 15 (↑), and 16 (↓) which double as also representing math symbols ×, /, −, and + respectively. The arrow keys/math symbols may be moved around for different applications. For example in a game pad the math symbols are absent and arrow keys 13–16 are arranged in the familiar diamond.

The first column includes keys 1, 4, 7 and 10. This column groups the keys having the graphical characteristics of facing left handwriting characters. The middle column includes keys 2, 5, 8 and 11. The middle row groups the keys having the graphical characteristics of being horizontal, vertical, a combination downward, and circular elements of handwriting. The last column using keys 3, 6, 9, and 12 groups the keys having the graphical characteristics of facing right hand writing characters. This logical grouping aids the users to recall and navigate through the use of the system until use becomes intuitive.

The first row includes the strokes oblique-left 1, vertical 2 and oblique-right 3. These are the simplest elements of writing consisting of a single, usually downward stroke. Vertical 2 is a simple vertical line segment(|). Oblique strokes are diagonal and not vertical nor horizontal but, rather like a computer backslash (\) and front slash (/). These strokes are among the simplest strokes common to all handwriting systems.

The second row includes down-left 4, horizontal 5, and down-right 6 strokes. Down-left 4 is a downward stroke ending to the left similar to the Latin J. Down-right 6 is a downward stroke ending to the right. Horizontal 5 is some what similar to a dash (-) on a keyboard. The down-left and -right strokes in the second row are slightly more complex than those in the first row but are still single strokes common to all handwriting systems.

The third row includes added complexity as combination strokes. Combination strokes as the name implies include a combination of stroke segments. The strokes in the third row are combo-left 7, a left facing curve (⊃), combo-down 8 (⌉), somewhat similar to an inverted Latin J, and combo-right 9, a right facing curve (⊂). Following the internal logic of the preceding rows they are compound strokes ending to the left, down and to the right, respectively. The combination strokes are also the first strokes described on this keyboard that include a degree of graphical flexibility built into them. This flexibility is indicated by alternate origins of direction. For example combo-left 7 includes an alternative origin 7' indicating that the first stroke can begin either from the left or the right. Similarly combo-down 8 includes an alternative origin 8' which indicates that it's first stroke can begin on either side (⌉ or ⌈). Finally, combo-right also includes an alternative origin 9' which indicates it too may start with either a left or right horizontal stroke.

The fourth row includes the strokes zig 10, circ 11 and the symbol opp-side 12. Zig is the only angled stroke segment in this system. Zig 10 short for zigzag, is an acute angled stroke segment similar to the top stroke of a Latin Z. Circ 11 short for circular is a multipurpose stroke-segment. Circ 11 not only depicts circular characters such as the Latin O but also the dots in i and j as well as umlauts and punctuation marks. In addition, because of the alternate starts and stops, Circ 11 also represents semi circular line segments such as upward and downward facing bowls or domes (∪ or ∩) and loops. Such domes, loops, and bowls are commonly found in cursive scripts. Finally, opp-side 12 (short for the function opposite side) is a special key indicating how strokes are ordered and joined and is not a segment key.

A number of function keys are used to operate the keyboard. Arrow keys 13, 14, 15, and 16 comprise the first set of function keys. Keys 13, 14, 15, and 16 are arranged in a line in FIG. 1 but may be arranged in a diamond as on a game-pad or TV remote control. Intersecting is entered with the left arrow key 13 (←) is also the subtraction symbol in the FIG. 1 embodiment. The right arrow key 14 (→) also the symbol for addition toggles the keyboard to the detached state. The up key 15 (↑) moves the cursor on the screen 20 and functions as a multiplication symbol (×). Finally, the down key 16 (↓) moves the cursor on screen 20 and functions as the division symbol (÷).

The last set of function keys 17, 18 and 19 are shown on the top row in FIG. 1. The mode key 17 allows toggling between different states such as numeric, alphabetic, and language. The enter key 18 indicates the end of a character. The end key 19 indicates the end of a sequence. In cooperation with all of the keys is a screen which displays alternatives available to the user.

FIGS. 2–5 are diagrams of the scanning method of the invention used to map characters onto the keyboard of FIG. 1. The method is an adaptation of raster scanning as used in computer optical scanners. By a happy coincidence this method is similar to handwriting systems used in many languages. By virtue of this fact the system is more intuitive to an operator than conventional keyboards.

Figure 2:
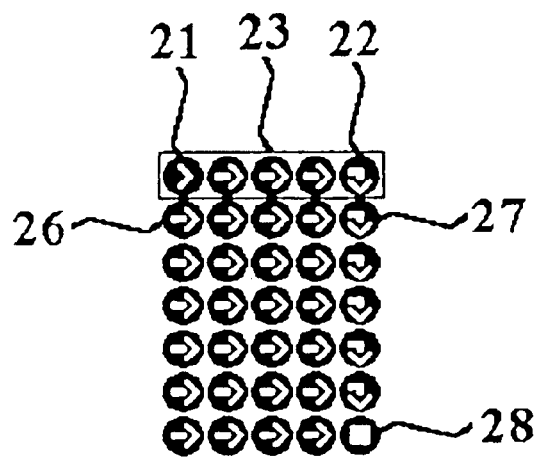
FIG. 2 is a diagram of a first method of scanning.

In FIG. 2 the first possible method of raster scanning is illustrated. In the FIG. 2 method, the method first scans the uppermost line 23 of pixels from the left 21 to the right 22. The second line is then scanned from left 26 to right 27. The process is continued until the end point is reached at the lower right corner 28. As an example, consider the Latin uppercase R. The scan first encounters the curved upper portion (⊃) indicated on the FIG. 1 keyboard as key 7. Next the straight left side (|) is hit shown on the FIG. 1 keyboard as key 2. Finally, the oblique left stroke (\) finishes the letter indicated by key 1 on the FIG. 1 keyboard. The proper key sequence for a top scan R is therefore 7, 2, 1.

Figure 3:
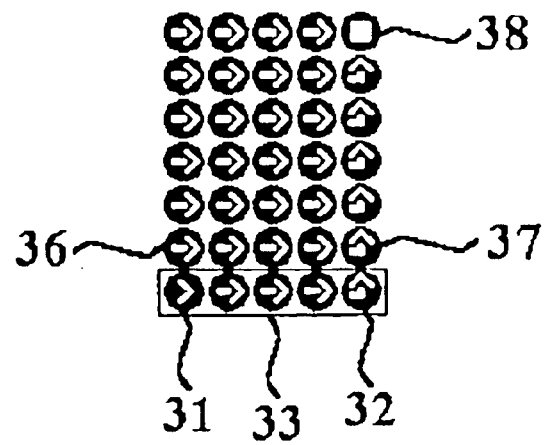
FIG. 3 is a diagram of a second method of scanning.

In FIG. 3 the second possible method of raster scanning is illustrated. In the FIG. 3 method, the method first scans the lowest line 33 of pixels from the left 31 to the right 32. The second line is then scanned from left 36 to right 37. The process is continued until the end point is reached at the upper right corner 38. A bottom beginning scan on the Latin R shows the following keystrokes are indicated. The scan first encounters straight left side (|) this is indicated on the FIG. 1 keyboard as key 2. Next the oblique left stroke (\) of the letter is scanned as indicated by key 1 on the FIG. 1 keyboard. Finally, the curved upper portion (⊃) is hit shown on the FIG. 1 keyboard as key 7. The proper key sequence for a bottom scan R is therefore 2, 1, 7.

Figure 4:
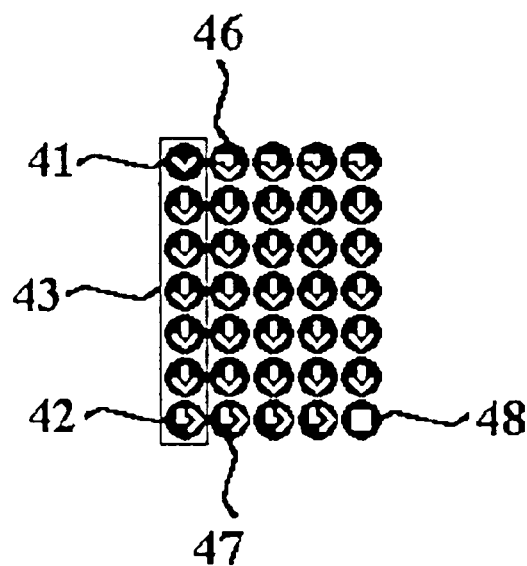
FIG. 4 is a diagram of a third method of scanning.

In FIG. 4 the third possible method of raster scanning is illustrated. In the FIG. 4 method, the first scan is the left line 43 of pixels from the top 41 to the bottom 42. The second line is then scanned from top 46 to bottom 47. The process is continued until the end point is reached at the bottom right corner 48. A top beginning scan of the Latin uppercase R indicates the following keystrokes on the FIG. 1 keyboard. The scan first encounters the straight left side (|) shown on the FIG. 1 keyboard as key 2. Next the curved upper portion (⊃) indicated on the FIG. 1 keyboard as key 7 is hit. Finally, the oblique left stroke (\) finishes the letter indicated by key 1 on the FIG. 1 keyboard. The proper key sequence for a left scan R is therefore 2, 7, 1.

Figure 5:
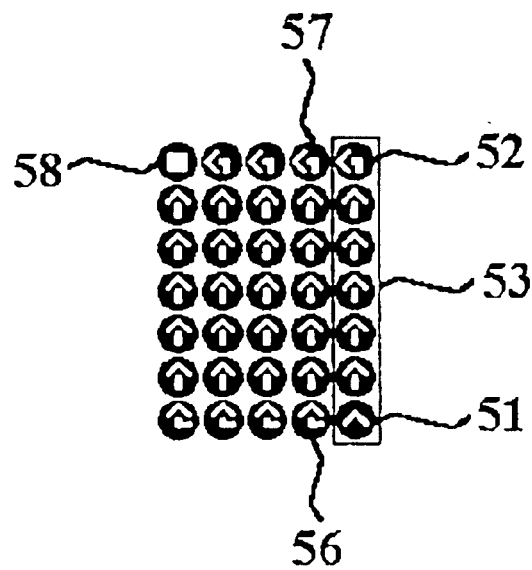
FIG. 5 is a diagram of a fourth method of scanning.

In FIG. 5 the fourth possible method of raster scanning is illustrated. In the FIG. 5 method, the method first scans the right line 53 of pixels from the bottom 51 to the top 52. The second line is then scanned from bottom 56 to top 57. The process is continued until the end point is reached at the top left corner 58. A Latin uppercase R scanned from the right indicates the following keystrokes on the FIG. 1 keyboard. The scan first encounters the oblique left stroke (\) indicated on the FIG. 1 keyboard as key 1. Next the curved upper stroke (⊃) is hit shown on the FIG. 1 keyboard as key 7. Straight left side (|) finishes the letter R indicated by key 2 on the FIG. 1 keyboard. The proper key sequence for a right scan R is therefore 1, 7, 2.

The systems of FIGS. 2–5 may be easily organized on the basis of opposite sides. Thus the system of FIG. 3 is the opposite side of FIG. 2 and the system of FIG. 4 is the opposite side of FIG. 5. Alternatively the systems of FIGS. 2–5 may also be organized into groups with common start points and end points such as FIGS. 2 and 4. The alternate is the systems with opposite start end points such as FIGS. 3 and 5.

The following charts describe the keystrokes on the FIG. 1 keyboard for various alphabets, scripts and characters. The numbers in the chart correspond to FIG. 1 reference numbers for keystrokes. In each chart, the column labeled top is for the FIG. 2 scanning method. The column labeled left is for the FIG. 4 scanning method. The column labeled bottom is for the FIG. 3 scanning method. And the column labeled right is for the FIG. 5 scanning method.

Table 1 summarizes the FIG. 1 keystrokes for uppercase English alphabet.

TABLE 1

English uppercase alphabet

| | Top | Left | Bottom | Right |
|---|---|---|---|---|
| A | 3, 1, 5 | 3, 5, 1 | 3, 1, 5 | 1, 5, 3 |
| B | 7, 2, 7 | 2, 7, 7 | 7, 2, 7 | 7, 7, 2 |
| C | 9 | 9 | 9 | 9 |
| D | 7, 2 | 2, 7 | 7, 2 | 7, 2 |
| E | 5, 2, 5, 5 | 2, 5, 5, 5 | 5, 2, 5, 5 | 5, 5, 15, 5, 15, 2 |
| F | 5, 2, 5 | 2, 5, 5 | 2, 5, 5 | 5, 5, 15, 2 |
| G | 9, 8 | 9, 8 | 9, 8 | 8, 9 |
| H | 2, 2, 14, 5 | 2, 5, 2 | 2, 2, 14, 5 | 2, 5, 2 |
| I | 2 | 2 | 2 | 2 |
| J | 4 | 4 | 4 | 4 |
| K | 2, 3, 1 | 2, 3, 1 | 2, 1, 14, 3 | 1, 3, 2 |
| L | 2, 5 | 2, 5 | 5, 2 | 5, 2 |
| M | 2, 3, 14, 1, 2 | 2, 1, 3, 2 | 2, 3, 14, 1, 2 | 2, 3, 1, 2 |
| N | 2, 2, 14, 1 | 2, 1, 2 | 2, 2, 14, 1 | 2, 1, 2 |
| O | 11 | 11 | 11 | 11 |
| P | 7, 2 | 2, 7 | 2, 7 | 7, 2 |
| Q | 11, 1, 13 | 11, 1, 13 | 11, 1, 13 | 1, 11, 13 |
| R | 7, 2, 1 | 2, 7, 1 | 2, 1, 14, 7 | 1, 7, 2 |
| S | 9, 7 | 9, 7 | 7, 9 | 7, 9 |
| T | 5, 2 | 5, 2 | 2, 5 | 5, 2 |
| U | 6, 4 | 6, 4 | 6, 4 | 4, 6 |
| V | 1, 3 | 1, 3 | 1, 3 | 3, 1 |
| W | 1, 1, 14, 3, 3 | 1, 3, 1, 3 | 1, 1, 14, 3, 3 | 3, 1, 3, 1 |
| X | 1, 3, 13 | 1, 3, 13 | 3, 1, 13 | 1, 3, 13 |
| Y | 1, 3, 2 | 1, 2, 3 | 2, 1, 3 | 3, 2, 1 |
| Z | 10, 5 | 10, 5 | 5, 10 | 5, 10 |

Table 2 summarizes the FIG. 1 keystrokes for lowercase English alphabet.

TABLE 2

English lowercase alphabet

| | Top | Left | Bottom | Right |
|---|---|---|---|---|
| a | 8, 9 | 8, 9 | 9, 8 | 8, 9 |
| b | 2, 7 | 2, 7 | 7, 2 | 7, 2 |
| c | 9 | 9 | 9 | 9 |
| d | 2, 9 | 9, 2 | 9, 2 | 2, 9 |
| e | 9, 5 | 9, 5 | 9, 5 | 5, 9 |
| f | 8, 5, 13 | 5, 8, 13 | 8, 5, 16 | 5, 8, 16 |
| g | 9, 4 | 9, 4 | 4, 9 | 4, 9 |
| h | 2, 8 | 2, 8 | 2, 8 | 8, 2 |
| i | 11, 2, 15 | 11, 2, 15 | 2, 11, 15 | 2, 11, 15 |
| j | 11, 4, 15 | 11, 4, 15 | 4, 11, 15 | 4, 11, 15 |
| k | 2, 3, 1 | 2, 3, 1 | 2, 1, 3 | 1, 3, 2 |
| l | 2 | 2 | 2 | 2 |
| m | 2, 8, 14, 8 | 2, 8, 8 | 2, 8, 14, 8 | 8, 8, 2 |
| n | 2, 8 | 2, 8 | 2, 8 | 8, 2 |
| o | 11 | 11 | 11 | 11 |
| p | 7, 2 | 2, 7 | 2, 7 | 7, 2 |
| q | 9, 2 | 9, 2 | 2, 9 | 2, 9 |
| r | 2, 3 | 2, 3 | 2, 3 | 3, 2 |
| s | 9, 7 | 9, 7 | 7, 9 | 7, 9 |
| t | 6, 5, 13 | 5, 6, 13 | 6, 5, 16 | 6, 5, 16 |
| u | 6, 2 | 6, 2 | 6, 2 | 2, 6 |
| v | 1, 3 | 1, 3 | 1, 3 | 3, 1 |
| w | 1, 1, 14, 3, 3 | 1, 3, 1, 3 | 1, 1, 14, 3, 3 | 3, 1, 3, 1 |
| x | 1, 3, 13 | 1, 3, 13 | 3, 1, 16 | 1, 3, 16 |
| y | 1, 3 | 1, 3 | 3, 1 | 3, 1 |
| z | 10, 5 | 10, 5 | 5, 10 | 5, 10 |

Using the same principles as above one can also resolve the keystrokes for European languages. These keystrokes are summarized in Table 3 for uppercase letters and Table 4 for lowercase letters.

TABLE 3

European uppercase alphabet

| | Top | Left | Bottom | Right |
|---|---|---|---|---|
| Á | 3, 3, 16, 1, 5 | 3, 3, 16, 5, 1 | 3, 1, 5, 3, 15 | 1, 3, 15, 5, 3 |
| À | 3, 1, 3, 16, 1, 5 | 3, 3, 16, 5, 1, 1 | 3, 1, 5, 3, 15, 1 | 1, 1, 15, 5, 3, 3 |
|  | 3, 1, 5, 9, 16 | 3, 9, 16, 5, 1 | 9, 3, 15, 1, 5 | 9, 1, 15, 5, 3 |
| Æ | 3, 5, 2, 5, 5, 5 | 3, 5, 2, 5, 5, 5 | 3, 5, 14, 2, 5, 5, 5 | 5, 5, 15, 5, 15, 2, 5, 3 |
| Ã | 1, 3, 16, 1, 5 | 1, 3, 16, 5, 1 | 3, 1, 5, 1, 15 | 1, 1, 15, 5, 3 |
|  | 1, 3, 3, 16, 1, 5 | 1, 3, 16, 5, 3, 1 | 3, 1, 5, 1, 15, 3 | 1, 3, 15, 5, 1, 3 |
|  | 5, 3, 16, 1, 5 | 5, 3, 16, 5, 1 | 3, 1, 5, 5, 15 | 1, 5, 15, 5, 3 |
| Ä | 11, 11, 14, 3, 16, 1, 5 | 11, 3, 16, 5, 11, 14, 1 | 3, 1, 5, 11, 15, 11, 14 | 1, 11, 15, 5, 3, 11, 15 |
| Å | 11, 3, 16, 1, 5 | 11, 3, 16, 5, 1 | 3, 1, 5, 11, 15 | 1, 11, 15, 5, 1 |
| Ā | 11, 11, 3, 16, 1, 5 | 11, 3, 16, 5, 11, 1 | 3, 1, 5, 11, 15, 11 | 1, 11, 15, 5, 3, 11 |
|  | 3, 9, 16 | 3, 9, 16, | 9, 3, 15 | 9, 3, 15 |
|  | 1, 3, 9, 16 | 1, 9, 16, 3 | 9, 1, 15, 3 | 9, 3, 15, 1 |
| Ç | 9, 7, 16 | 9, 7, 16, | 7, 9, 15 | 7, 9, 15 |
|  | 1, 3, 7, 16, 2 | 1, 2, 16, 7, 3 | 7, 2, 1, 15, 3 | 7, 3, 15, 1, 2 |
|  | 7, 2, 5, 13 | 5, 2, 13, 7 | 7, 2, 5, 16 | 7, 5, 13, 2, 16 |
| É | 3, 5, 16, 2, 5, 5 | 3, 2, 16, 5, 5, 5 | 5, 2, 5, 5, 3, 15 | 5, 3, 15, 5, 15, 5, 15, 2 |
| Ê | 3, 1, 5, 16, 2, 5, 5 | 3, 2, 16, 5, 5, 5, 1 | 5, 2, 5, 5, 3, 15, 1 | 5, 1, 15, 5, 15, 5, 15, 1, 2 |

TABLE 3-continued

European uppercase alphabet

| | Top | Left | Bottom | Right |
|---|---|---|---|---|
| È | 1, 5, 16, 2, 5, 5 | 1, 2, 16, 5, 5, 5 | 5, 2, 5, 5, 1, 15 | 5, 1, 15, 5, 15, 5, 15, 2 |
| | 1, 3, 5, 16, 2, 5, 5 | 1, 2, 16, 5, 5, 5, 3 | 5, 2, 5, 5, 1, 15, 3 | 5, 3, 15, 5, 15, 5, 15, 1, 2 |
| | 5, 5, 16, 2, 5, 5 | 5, 2, 16, 5, 5, 5 | 5, 2, 5, 5, 5, 15 | 5, 5, 15, 5, 15, 5, 15, 2 |
| | 5, 2, 5, 5, 9, 16 | 2, 9, 16, 5, 5, 5 | 9, 5, 15, 2, 5, 5 | 9, 5, 15, 5, 15, 5, 15, 2 |
| Ë | 11, 11, 14, 5, 16, 2, 5, 5 | 11, 2, 16, 5, 5, 5, 14, 11 | 5, 2, 5, 5, 11, 15, 11 | 5, 11, 15, 5, 15, 5, 15, 11, 15, 2 |
| | 11, 5, 16, 2, 5, 5 | 11, 2, 16, 5, 5, 5 | 5, 2, 5, 5, 11, 15 | 5, 11, 15, 5, 15, 5, 15, 2 |
| | 1, 3, 9, 16, 8 | 1, 9, 16, 3, 8 | 9, 8, 1, 15, 3 | 8, 3, 15, 9, 1 |
| | 9, 8, 7, 16 | 9, 7, 16, 8 | 7, 9, 15, 8 | 7, 8, 15, 9 |
| Í | 3, 2, 16 | 3, 2, 16 | 2, 3, 15 | 2, 3, 15 |
| Î | 3, 1, 2, 16 | 3, 2, 16, 1 | 2, 3, 15, 1 | 2, 1, 15, 3 |
| | 2, 9, 16 | 2, 9, 16 | 9, 2, 15 | 9, 2, 15 |
| Ì | 1, 2, 16 | 1, 2, 16 | 2, 1, 15 | 2, 1, 15 |
| | 5, 2, 16 | 5, 2, 16 | 2, 5, 15 | 2, 5, 15 |
| Ï | 11, 11, 14, 2, 16 | 11, 2, 16, 11, 14 | 2, 11, 15, 11, 14 | 2, 11, 15, 11, 14 |
| | 11, 2, 16 | 11, 2, 16 | 2, 11, 15 | 2, 11, 15 |
| | 2, 3, 1, 7, 16 | 2, 7, 16, 3, 1 | 7, 2, 15, 1, 14, 3 | 7, 1, 15, 3, 2 |
| | 3, 2, 16, 5 | 3, 2, 16, 5 | 5, 2, 3, 15 | 5, 3, 15, 2 |
| | 2, 3, 13, 5 | 3, 2, 13, 5 | 5, 2, 3, 16 | 5, 3, 15, 2, 16 |
| | 2, 7, 14, 5 | 2, 5, 7, 14 | 5, 2, 7, 15 | 5, 7, 15, 2 |
| | 2, 5, 7, 16 | 2, 7, 16, 5 | 7, 5, 15, 2 | 7, 5, 15, 2 |
| | 3, 2, 16, 2, 14, 1 | 3, 2, 16, 1, 2 | 2, 2, 14, 1, 3, 15 | 2, 3, 15, 1, 2 |
| Ñ | 11, 11, 2, 16, 2, 14, 1 | 11, 2, 16, 1, 11, 2 | 2, 2, 14, 1, 11, 15, 11 | 2, 11, 15, 1, 11, 2 |
| | 3, 3, 14, 11, 16 | 3, 11, 16, 3, 14 | 11, 3, 15, 3, 14 | 11, 3, 15, 3, 14 |
| Ó | 3, 11, 16 | 3, 11, 16 | 11, 3, 15 | 11, 3, 15 |
| Ô | 3, 1, 11, 16 | 3, 11, 16, 1 | 11, 3, 15, 1 | 11, 1, 15, 3 |
| Ò | 1, 11, 16 | 1, 11, 16 | 11, 1, 15 | 11, 1, 15 |
| | 5, 11, 16 | 5, 11, 16 | 11, 5, 15 | 11, 5, 15 |
| Ø | 11, 3, 13 | 11, 3, 13 | 3, 11, 16 | 11, 3, 16 |
| Œ | 11, 5, 14, 2, 5, 5, | 11, 2, 5, 5, 5 | 11, 5, 14, 2, 5, 5 | 5, 5, 15, 5, 15, 2, 11 |
| Ö | 11, 11, 14, 11, 16 | 11, 11, 16, 11, 14 | 11, 11, 15, 11, 14 | 11, 11, 15, 11, 14 |
| Õ | 11, 11, 11, 16 | 11, 11, 16, 11 | 11, 11, 15, 11 | 11, 11, 15, 11 |
| | 3, 7, 16, 2, 1 | 3, 2, 16, 7, 1 | 2, 1, 14, 7, 3, 15 | 1, 3, 15, 7, 2 |
| | 1, 3, 7, 16, 2, 1 | 1, 2, 16, 7, 3, 1 | 2, 1, 14, 7, 1, 15, 3 | 1, 3, 15, 7, 1, 2 |
| | 7, 2, 1, 7, 16 | 2, 7, 16, 7, 1 | 7, 2, 15, 1, 14, 7 | 7, 1, 15, 7, 2 |
| | 3, 9, 16, 7 | 3, 9, 16, 7 | 7, 9, 3, 15 | 7, 3, 15, 9 |
| Š | 1, 3, 9, 16, 7 | 1, 9, 16, 7, 3 | 7, 9, 1, 15, 3 | 7, 3, 15, 9, 1 |
| | 9, 7, 7, 16 | 9, 7, 16, 7 | 7, 7, 15, 9 | 7, 7, 15, 9 |
| | 1, 3, 5, 16, 2 | 1, 5, 16, 2, 3 | 2, 5, 1, 15, 3 | 5, 3, 15, 2, 1 |
| | 5, 2, 7, 16 | 5, 7, 16, 2 | 7, 2, 15, 5 | 7, 5, 15, 2 |
| | 3, 3, 14, 6, 16, 4 | 3, 6, 16, 3, 4, 14 | 6, 4, 3, 15, 3, 14 | 4, 3, 15, 6, 3, 15 |
| Ú | 3, 6, 16, 4 | 3, 6, 16, 4 | 6, 4, 3, 15 | 4, 3, 15, 6 |
| Û | 3, 1, 6, 16, 4 | 3, 6, 16, 1, 4 | 6, 4, 3, 15, 1 | 4, 1, 15, 6, 3 |
| | 6, 4, 9, 16 | 6, 9, 16, 4 | 9, 6, 15, 4 | 9, 4, 15, 6 |
| Ù | 1, 6, 16, 4 | 1, 6, 16, 4 | 6, 4, 1, 15 | 4, 1, 15, 6 |
| | 5, 6, 16, 4 | 5, 6, 16, 4 | 6, 4, 5, 15 | 4, 5, 15, 6 |
| Ü | 11, 11, 14, 6, 16, 4 | 11, 6, 16, 11, 14, 4 | 6, 4, 11, 15, 11, 14 | 4, 11, 15, 6, 11, 15 |
| | 11, 6, 16, 4 | 11, 6, 16, 4 | 6, 4, 11, 15 | 4, 11, 15, 6 |
| Ý | 3, 1, 16, 3, 2 | 3, 1, 16, 2, 3 | 2, 1, 3, 3, 15 | 2, 3, 15, 3, 1 |
| Ÿ | 11, 11, 14, 1, 16, 3, 2 | 11, 1, 16, 2, 11, 14, 3 | 2, 1, 3, 11, 15, 11, 14 | 2, 11, 15, 3, 1, 11, 15 |
| | 3, 10, 16, 5, | 3, 10, 16, 5 | 5, 10, 3, 15 | 5, 3, 15, 10 |
| | 1, 3, 10, 16, 5 | 1, 10, 16, 5, 3 | 5, 10, 1, 15, 3 | 5, 3, 15, 10, 1 |
| | 11, 10, 16, 5 | 11, 10, 16, 5 | 5, 10, 11, 15 | 5, 11, 15, 10 |
| Þ | 2, 7 | 2, 7 | 2, 7 | 7, 2 |
| ß | 7, 2, 7 | 2, 7, 7 | 2, 7, 14, 7 | 7, 7, 2 |

TABLE 4

European lowercase alphabet

| | Top | Left | Bottom | Right |
|---|---|---|---|---|
| á | 3, 8, 16, 9 | 3, 8, 16, 9 | 9, 8, 3, 15 | 8, 3, 15, 9 |
| â | 3, 1, 8, 16, 9 | 3, 8, 16, 9, 1 | 9, 8, 3, 15, 1 | 8, 1, 15, 9, 3 |
| à | 1, 8, 16, 9 | 1, 8, 16, 9 | 9, 8, 1, 15 | 8, 1, 15, 9 |
| | 1, 3, 8, 16, 9 | 1, 8, 16, 9, 3 | 9, 8, 1, 15, 3 | 8, 3, 15, 9, 1 |

TABLE 4-continued

European lowercase alphabet

| | Top | Left | Bottom | Right |
|---|---|---|---|---|
| | 5, 8, 16, 9 | 5, 8, 16, 9 | 9, 8, 5, 15 | 8, 5, 15, 9 |
| | 8, 9, 9, 16 | 8, 9, 16, 9 | 9, 9, 15, 8 | 9, 8, 15, 9 |
| æ | 8, 9, 9, 5 | 8, 9, 9, 5 | 9, 9, 14, 8, 5 | 5, 9, 8, 9 |
| á | 11, 11, 14, 8, 16, 9 | 11, 8, 16, 9, 11, 14 | 9, 8, 11, 15, 11, 14 | 8, 11, 15, 9, 11, 15 |
| å | 11, 8, 16, 9 | 11, 8, 16, 9 | 9, 8, 11, 15 | 8, 11, 15, 9 |
| ã | 11, 11, 8, 16, 9 | 11, 8, 16, 9, 11 | 9, 8, 11, 15, 11 | 8, 11, 15, 9, 11 |
| | 3, 9, 16 | 3, 9, 16 | 9, 3, 15 | 9, 3, 15 |
| | 1, 3, 9, 16 | 1, 9, 16, 3 | 9, 1, 15, 3 | 9, 3, 15, 1 |
| ç | 9, 7, 16 | 9, 7, 16 | 7, 9, 15 | 7, 9, 15 |
| | 2, 5, 13, 9 | 5, 9, 16, 2, 13 | 9, 2, 5, 16 | 5, 2, 16, 9 |
| | 2, 7, 14, 9 | 9, 2, 7, 14 | 9, 7, 14, 2 | 7, 2, 13, 9 |
| é | 3, 9, 16, 5 | 3, 9, 16, 5 | 9, 5, 3, 15 | 5, 3, 15, 9 |
| ê | 3, 1, 9, 16, 5 | 3, 9, 16, 5, 1 | 9, 5, 3, 15, 1 | 5, 1, 15, 9, 1 |
| è | 1, 9, 16, 5 | 1, 9, 16, 5 | 9, 5, 1, 15 | 5, 1, 15, 9 |
| | 1, 3, 9, 16, 5 | 1, 9, 16, 5, 3 | 9, 5, 1, 15, 3 | 5, 3, 15, 9, 1 |
| | 5, 9, 16, 5 | 5, 9, 16, 5 | 9, 5, 5, 15 | 5, 5, 15, 9 |
| | 9, 5, 9, 16 | 9, 9, 16, 5 | 9, 9, 5, 15 | 9, 5, 15, 9 |
| ë | 11, 11, 14, 9, 16, 5 | 11, 9, 16, 5, 11, 14 | 9, 5, 11, 15, 11, 14 | 5, 11, 15, 9, 11, 15 |
| | 11, 9, 16, 5 | 11, 9, 16, 5 | 9, 5, 11, 15 | 5, 11, 15, 9 |
| | 1, 3, 9, 16, 4 | 1, 9, 16, 4, 3 | 4, 9, 1, 15, 3 | 4, 3, 15, 9, 1 |
| | 9, 9, 16, 4 | 9, 9, 16, 4 | 4, 9, 9, 15 | 4, 9, 15, 9 |
| í | 3, 2, 16 | 3, 2, 16 | 2, 3, 15 | 2, 3, 15 |
| î | 3, 1, 2, 16 | 3, 2, 16, 1 | 2, 3, 15, 1 | 2, 1, 15, 3 |
| | 2 | 2 | 2 | 2 |
| ì | 1, 2, 16 | 1, 2, 16 | 2, 1, 15 | 2, 1, 15 |
| | 5, 2, 16 | 5, 2, 16 | 2, 5, 15 | 2, 5, 15 |
| ï | 11, 11, 14, 2, 16 | 11, 2, 16, 11, 14 | 2, 11, 15, 11, 14 | 2, 11, 15, 11, 14 |
| | 11, 2, 16, 7, 16 | 11, 2, 16, 7, 16 | 9, 2, 15, 11, 15 | 9, 2, 15, 11, 15 |
| | 2, 3, 1, 7, 16 | 2, 7, 16, 3, 1 | 7, 2, 15, 1, 14, 3 | 7, 1, 15, 3, 2 |
| | 3, 2, 16 | 3, 2, 16 | 2, 3, 15 | 2, 3, 15 |
| | 2, 3, 13 | 3, 2, 13 | 2, 3, 16 | 3, 2, 16 |
| | 2, 7, 14 | 2, 7, 14 | 2, 7, 14 | 7, 2, 13 |
| | 2, 7, 16 | 2, 7, 16 | 7, 2, 15 | 7, 2, 15 |
| | 3, 2, 16, 8 | 3, 2, 16, 8 | 2, 8, 3, 15 | 8, 3, 15, 2 |
| ñ | 11, 11, 2, 16, 8 | 11, 2, 16, 8, 11 | 2, 8, 11, 15, 11 | 8, 11, 15, 11, 2 |
| | 3, 3, 14, 11, 16 | 3, 11, 16, 3, 14 | 11, 3, 15, 3, 14 | 11, 3, 15, 3, 14 |
| ó | 3, 11, 16 | 3, 11, 16 | 11, 3, 15 | 11, 3, 15 |
| ô | 3, 1, 11, 16 | 3, 11, 16, 1 | 11, 3, 15, 1 | 11, 1, 15, 3 |
| ò | 1, 11, 16 | 1, 11, 16 | 11, 1, 15 | 11, 1, 15 |
| | 5, 11, 16 | 5, 11, 16 | 11, 5, 15 | 11, 5, 15 |
| ø | 11, 3, 13 | 11, 3, 13 | 3, 11, 16 | 11, 3, 16 |
| ö | 11, 11, 14, 11, 16 | 11, 11, 16, 11, 14 | 11, 11, 15, 11, 14 | 11, 11, 15, 11, 14 |
| œ | 11, 9, 5 | 11, 9, 5 | 11, 9, 5 | 5, 9, 11 |
| õ | 11, 11, 11, 16 | 11, 11, 16, 11 | 11, 11, 15, 11 | 11, 11, 15, 11 |
| | 3, 2, 16, 3 | 3, 2, 16, 3 | 2, 3, 3, 15 | 3, 3, 15, 2 |
| | 2, 3, 7 | 2, 7, 16, 3 | 7, 2, 15, 3 | 7, 3, 15, 2 |
| | 1, 3, 2, 16, 3 | 1, 2, 16, 3, 3 | 2, 3, 1, 15, 3 | 3, 3, 15, 2, 1 |
| | 3, 9, 16, 7 | 3, 9, 16, 7 | 7, 9, 3, 15 | 7, 3, 15, 9 |
| š | 1, 3, 9, 16, 7 | 1, 9, 16, 7, 3 | 7, 9, 1, 15, 3 | 7, 3, 15, 9, 1 |
| | 9, 7, 7, 16 | 9, 7, 16, 7 | 7, 7, 15, 9 | 7, 7, 15, 9 |
| | 6, 5, 13, 7 | 5, 7, 16, 6, 13 | 7, 6, 15, 5, 16 | 7, 6, 15, 5, 16 |
| | 6, 7, 14, 5, 13 | 5, 6, 13, 7, 14 | 6, 7, 15, 5, 16 | 7, 6, 13, 5, 16 |
| | 3, 3, 14, 6, 16, 2 | 3, 6, 16, 3, 14, 2 | 6, 2, 3, 15, 3, 14 | 2, 3, 15, 6, 3, 15 |
| ú | 3, 6, 16, 2 | 3, 6, 16, 2 | 6, 2, 3, 15 | 2, 3, 15, 6 |
| û | 3, 1, 6, 16, 2 | 3, 6, 16, 1, 2 | 6, 2, 3, 15, 1 | 2, 1, 15, 6, 3 |
| | 6, 2, 9, 16 | 6, 9, 16, 2 | 9, 6, 15, 2 | 9, 2, 15, 6 |
| ù | 1, 6, 16, 2 | 1, 6, 16, 2 | 6, 2, 1, 15 | 2, 1, 15, 6 |
| | 5, 6, 16, 2 | 5, 6, 16, 2 | 6, 2, 5, 15 | 2, 5, 15, 6 |
| ü | 11, 11, 14, 6, 16, 2 | 11, 6, 16, 11, 14, 2 | 6, 2, 11, 15, 11, 14 | 2, 11, 15, 6, 11, 15 |
| | 11, 6, 16, 2 | 11, 6, 16, 2 | 6, 2, 11, 15 | 2, 11, 15, 6 |
| ý | 3, 1, 16, 3 | 3, 1, 16, 3 | 3, 1, 3, 15 | 3, 3, 15, 1 |
| ÿ | 11, 11, 14, 1, 16, 3 | 11, 1, 16, 3, 11, 14 | 3, 1, 11, 15, 11, 14 | 3, 11, 15, 1, 11, 15 |
| | 3, 10, 16, 5 | 3, 10, 16, 5 | 5, 10, 3, 15 | 5, 3, 15, 10 |
| | 1, 3, 10, 16, 5 | 1, 10, 16, 5, 3 | 5, 10, 1, 15, 3 | 5, 3, 15, 10, 1 |
| | 11, 10, 16, 5 | 11, 10, 16, 5 | 5, 10, 11, 15 | 5, 11, 15, 10 |
| þ | 2, 7 | 2, 7 | 2, 7 | 7, 2 |
| ô | 7, 3, 13, 9 | 3, 9, 16, 7, 13 | 7, 9, 3, 16 | 7, 3, 16, 9 |

Table 5 resolves the Cyrillic alphabet into the keystrokes for the FIG. 1 keyboard.

TABLE 5

Cyrillic uppercase alphabet

| Top | Left | Bottom | Right |
|---|---|---|---|
| 3, 1, 5 | 3, 5, 1 | 3, 1, 5 | 1, 5, 3 |
| 5, 2, 7 | 5, 2, 7 | 7, 2, 5 | 7, 5, 15, 2 |
| 7, 2, 7 | 2, 7, 7 | 7, 2, 7 | 7, 7, 2 |
| 5, 2 | 2, 5 | 2, 5 | 5, 2 |
| 8, 4, 8, 2 | 4, 2, 8, 8 | 2, 8, 4, 8 | 8, 8, 2, 4 |
| 5, 2, 5, 5 | 2, 5, 5, 5 | 5, 2, 5, 5 | 5, 5, 15, 5, 15, 2, 15 |
| 11, 11, 14, 5, 16, 2, 5, 5 | 11, 2, 5, 5, 5, 11, 16, 14 | 5, 2, 5, 5, 11, 15, 11, 14 | 5, 11, 15, 5, 15, 5, 15, 11, 15, 2 |
| 1, 2, 3, 3, 1 | 1, 3, 2, 3, 1 | 3, 2, 1, 1, 3 | 1, 3, 2, 3, 1 |
| 7, 7 | 7, 7 | 7, 7 | 7, 7 |
| 2, 2, 14, 3 | 2, 3, 2 | 2, 3, 14, 2 | 2, 3, 2 |
| 1, 3, 2, 16, 2, 14, 3 | 1, 2, 3, 3, 2, 16 | 2, 3, 14, 2, 1, 15, 3 | 2, 3, 15, 3, 1, 2 |
| 2, 3, 1 | 2, 3, 1 | 2, 1, 14, 3 | 1, 3, 2 |
| 8, 4 | 4, 8 | 4, 8 | 8, 4 |
| 2, 3, 14, 1, 2 | 2, 1, 3, 2 | 2, 3, 14, 1, 2 | 2, 3, 1, 2 |
| 2, 2, 14, 5 | 2, 5, 2 | 2, 2, 14, 5 | 2, 5, 2 |
| 11 | 11 | 11 | 11 |
| 8, 2 | 8, 2 | 2, 8 | 8, 2 |
| 7, 2 | 2, 7 | 2, 7 | 7, 2 |
| 9 | 9 | 9 | 9 |
| 5, 2 | 5, 2 | 2, 5 | 5, 2 |
| 1, 3 | 1, 3 | 3, 1 | 3, 1 |
| 2, 11, 13 | 11, 2, 13 | 2, 11, 16 | 11, 2, 16 |
| 1, 3, 13 | 1, 3, 13 | 3, 1, 16 | 1, 3, 16 |
| 2, 2, 14, 8 | 2, 8, 2 | 8, 2, 2 | 8, 2, 2 |
| 6, 2 | 6, 2 | 2, 6 | 2, 6 |
| 2, 2, 14, 2, 14, 5 | 2, 5, 2, 2 | 5, 2, 2, 2 | 5, 2, 2, 2 |
| 2, 2, 14, 2, 14, 8 | 2, 8, 2, 2 | 8, 2, 2, 2 | 8, 2, 2, 2 |
| 8, 7 | 8, 7 | 7, 8 | 7, 8 |
| 2, 2, 14, 7 | 2, 7, 2, 14 | 7, 2, 14, 2 | 2, 7, 13, 2 |
| 2, 7 | 2, 7 | 7, 2 | 7, 2 |
| 7, 5 | 7, 5 | 7, 5 | 7, 5 |
| 2, 11, 14, 5 | 2, 5, 11 | 2, 11, 14, 5 | 11, 5, 2, 13 |
| 9, 2, 3 | 9, 3, 2 | 3, 2, 14, 9 | 2, 9, 3 |
| 1, 3, 1, 16, 3 | 1, 1, 3, 3, 16 | 3, 1, 1, 15, 3 | 3, 3, 15, 1, 1 |
| 8, 4, 7 | 4, 8, 7 | 4, 7, 14, 8 | 7, 8, 4 |
| 2, 2, 14, 7, 13 | 2, 7, 2 | 2, 7, 14, 2, 16 | 7, 2, 7, 16 |
| 3, 2, 16, 3, 1 | 3, 2, 3, 1, 16 | 2, 1, 14, 3, 3, 15 | 1, 3, 15, 3, 2 |
| 5, 2, 7 | 5, 2, 7 | 2, 7, 5 | 7, 5, 15, 2 |
| 2, 2, 14, 5, 2, 16 | 2, 2, 5, 2, 16 | 2, 2, 15, 5, 2 | 2, 2, 15, 5, 2 |
| 5, 2, 8 | 5, 2, 8 | 2, 8, 5 | 8, 5, 15, 2 |
| 3, 5, 16, 2 | 3, 2, 5, 16 | 2, 5, 3, 15 | 5, 3, 15, 2 |
| 2, 5, 16, 2 | 2, 2, 5 | 2, 5, 2, 15 | 5, 2, 15, 2 |
| 9, 5 | 9, 5 | 9, 5 | 9, 5 |
| 4 | 4 | 4 | 4 |
| 11, 11, 14, 2, 16 | 11, 2, 11, 16, 14 | 2, 11, 15, 11, 14 | 2, 11, 15, 11, 14 |
| 9, 7 | 9, 7 | 7, 9 | 7, 9 |

Table 6 resolves the lowercase Cyrillic (Slavic) alphabet into the keystrokes for the FIG. 1 keyboard.

TABLE 6

Cyrillic lowercase alphabet

| Top | Left | Bottom | Right |
|---|---|---|---|
| 8, 9 | 8, 9 | 9, 8 | 8, 9 |
| 9, 7 | 9, 7 | 9, 7 | 7, 9 |
| 7, 2, 7 | 2, 7, 7 | 7, 2, 7 | 7, 7, 2 |
| 5, 2 | 2, 5 | 2, 5 | 5, 2 |
| 8, 4, 8, 2 | 4, 2, 8, 8 | 2, 8, 4, 8 | 8, 8, 2, 4 |
| 9, 5 | 9, 5 | 9, 5 | 5, 9 |
| 11, 11, 14, 9, 16, 5 | 11, 9, 5, 11, 16, 14 | 9, 5, 11, 11, 15, 14 | 5, 11, 9, 11, 15, 15 |
| 1, 2, 3, 3, 1 | 1, 3, 2, 3, 1 | 3, 2, 1, 1, 3 | 1, 3, 2, 3, 1 |
| 7, 7 | 7, 7 | 7, 7 | 7, 7 |
| 2, 2, 14, 3 | 2, 3, 2 | 2, 3, 2, 14 | 2, 3, 2 |
| 1, 3, 2, 16, 2, 14, 3 | 1, 2, 3, 3, 2, 16 | 2, 3, 2, 1, 3, 14, 15 | 2, 3, 3, 3, 1, 2, 15 |

TABLE 6-continued

Cyrillic lowercase alphabet

| Top | Left | Bottom | Right |
|---|---|---|---|
| 2, 3, 1 | 2, 3, 1 | 2, 1, 3, 14 | 1, 3, 2 |
| 8, 4 | 4, 8 | 4, 8 | 8, 4 |
| 2, 3, 14, 1, 2 | 2, 1, 3, 2 | 2, 3, 1, 2, 14 | 2, 3, 1, 2 |
| 2, 2, 14, 5 | 2, 5, 2 | 2, 2, 5, 14 | 2, 5, 2 |
| 11 | 11 | 11 | 11 |
| 8, 2 | 8, 2 | 2, 8 | 8, 2 |
| 7, 2 | 2, 7 | 2, 7 | 7, 2 |
| 9 | 9 | 9 | 9 |
| 5, 2 | 5, 2 | 2, 5 | 5, 2 |
| 1, 3 | 1, 3 | 3, 1 | 3, 1 |
| 2, 9, 7 | 9, 2, 7 | 2, 9, 7 | 7, 2, 9 |
| 1, 3, 13 | 1, 3, 13 | 3, 1, 16 | 1, 3, 16 |
| 2, 2, 14, 8 | 2, 8, 2 | 8, 2, 2 | 8, 2, 2 |
| 6, 2 | 6, 2 | 2, 6 | 2, 6 |
| 2, 2, 14, 2, 14, 5 | 2, 5, 2, 2 | 5, 2, 2, 2 | 5, 2, 2, 2 |
| 2, 2, 14, 2, 14, 8 | 2, 8, 2, 2 | 8, 2, 2, 2 | 8, 2, 2, 2 |
| 8, 7 | 8, 7 | 7, 8 | 7, 8 |
| 2, 2, 14, 7 | 2, 7, 2, 14 | 7, 2, 2, 14 | 2, 7, 2, 13 |
| 2, 7 | 2, 7 | 7, 2 | 7, 2 |
| 7, 5 | 7, 5 | 7, 5 | 7, 5 |
| 2, 11, 14, 5 | 2, 5, 11 | 2, 11, 5, 14 | 11, 5, 2, 13 |
| 9, 2, 3 | 9, 3, 2 | 3, 2, 9, 14 | 2, 9, 3 |
| 1, 3, 1, 16, 3 | 1, 1, 3, 3, 16 | 3, 1, 1, 3, 15 | 3, 3, 1, 1, 15 |
| 8, 4, 7 | 4, 8, 7 | 4, 7, 8, 14 | 7, 8, 4 |
| 2, 2, 14, 7, 13 | 2, 7, 2 | 2, 7, 2, 14, 16 | 7, 2, 7, 16 |
| 3, 2, 16, 3, 1 | 3, 2, 3, 1, 16 | 2, 1, 3, 3, 14, 15 | 1, 3, 3, 2, 15 |
| 2, 5, 13, 7 | 5, 2, 7, 13 | 2, 7, 5, 16 | 7, 5, 2, 15, 16 |
| 2, 2, 14, 5, 2, 16 | 2, 2, 5, 2, 16 | 2, 2, 5, 2, 15 | 2, 2, 5, 2, 15 |
| 2, 5, 13, 8 | 5, 2, 8, 13 | 2, 8, 5, 16 | 8, 5, 2, 15, 16 |
| 3, 5, 16, 2 | 3, 2, 5, 16 | 2, 5, 3, 15 | 5, 3, 2, 15 |
| 2, 5, 16, 2 | 2, 2, 5 | 2, 5, 2, 15 | 5, 2, 2, 15 |
| 9, 5 | 9, 5 | 9, 5 | 9, 5 |
| 11, 4, 16 | 11, 4, 16 | 4, 11, 15 | 4, 11, 15 |
| 11, 11, 14, 2, 16 | 11, 2, 11, 16, 14 | 2, 11, 11, 15, 14 | 2, 11, 11, 15, 14 |
| 9, 7 | 9, 7 | 7, 9 | 7, 9 |

Table 7 resolves the characters of the uppercase Greek alphabet into the keystrokes appropriate for the FIG. 1 keyboard.

TABLE 7

Greek uppercase alphabet

| Top | Left | Bottom | Right |
|---|---|---|---|
| 3, 1, 5 | 3, 5, 1 | 3, 1, 5 | 1, 5, 3 |
| 7, 2, 7 | 2, 7, 7 | 7, 2, 7 | 7, 7, 2 |
| 5, 2 | 2, 5 | 2, 5 | 5, 2 |
| 3, 1, 5 | 3, 5, 1 | 5, 3, 1 | 5, 1, 3 |
| 5, 2, 5, 5 | 2, 5, 5, 5 | 5, 2, 5, 5 | 5, 5, 15, 5, 15, 2 |
| 10, 5 | 10, 5 | 5, 10 | 5, 10 |
| 2, 2, 14, 5 | 2, 5, 2 | 2, 2, 14, 5 | 2, 5, 2 |
| 11, 5, 16 | 11, 5, 14 | 11, 5, 13 | 11, 5, 13 |
| 2 | 2 | 2 | 2 |
| 2, 3, 1 | 2, 3, 1 | 2, 1, 14, 3 | 1, 3, 2 |
| 3, 1 | 3, 1 | 3, 1 | 1, 3 |
| 2, 3, 14, 1, 2 | 2, 1, 3, 2 | 2, 3, 14, 1, 2 | 2, 3, 1, 2 |
| 2, 2, 14, 1 | 2, 1, 2 | 2, 2, 14, 1 | 2, 1, 2 |
| 5, 5, 16, 5, 16 | 5, 5, 16, 5, 16 | 5, 5, 15, 5, 15 | 5, 5, 15, 5, 15 |
| 11 | 11 | 11 | 11 |
| 8, 2 | 2, 8 | 2, 8 | 8, 2 |
| 7, 2 | 2, 7 | 2, 7 | 7, 2 |
| 5, 1, 3, 5 | 5, 3, 1, 5 | 5, 3, 1, 5 | 5, 1, 15, 3, 5 |
| 5, 2 | 5, 2 | 2, 5 | 5, 2 |
| 1, 3, 2 | 1, 2, 3 | 2, 1, 3 | 3, 2, 1 |
| 2, 11, 13 | 11, 2, 13 | 2, 11, 16 | 11, 2, 16 |
| 1, 3, 13 | 1, 3, 13 | 3, 1, 16 | 1, 3, 16 |
| 6, 2, 13, 4 | 6, 2, 13, 4 | 2, 6, 16, 4 | 4, 2, 16, 6 |
| 11, 5, 5 | 11, 5, 5 | 5, 5, 14, 11 | 5, 11, 5 |
| 2, 3, 16, 1, 5 | 2, 3, 16, 5, 1 | 3, 1, 5, 2, 15 | 1, 2, 15, 5, 3 |
| 2, 5, 16, 2, 5, 5 | 2, 2, 16, 5, 5, 5 | 5, 2, 5, 5, 2, 15 | 5, 2, 15, 5, 15, 5, 15, 2 |

TABLE 7-continued

Greek uppercase alphabet

| Top | Left | Bottom | Right |
|---|---|---|---|
| 2, 2, 16, 2, 5 | 2, 2, 16, 5, 2 | 2, 2, 14, 5, 2, 15 | 2, 2, 15, 5, 2 |
| 2, 1, 16 | 2, 1, 16 | 2, 2, 15 | 2, 2, 15 |
| 2, 11, 16 | 2, 11, 16 | 11, 2, 15 | 11, 2, 15 |
| 2, 1, 16, 3, 2 | 2, 1, 16, 2, 3 | 2, 1, 3, 2, 15 | 3, 2, 15, 2, 1 |
| 2, 11, 16, 5, 5 | 2, 11, 16, 5, 5 | 5, 5, 14, 11, 2, 15 | 5, 2, 15, 11, 5 |
| 11, 11, 14, 2, 16 | 11, 2, 16, 11, 14 | 2, 11, 15, 11, 14 | 2, 11, 15, 11, 14 |
| 11, 11, 14, 1, 16, 3, 2 | 11, 1, 16, 2, 11, 14, 3 | 2, 1, 3, 11, 15, 11, 14 | 2, 11, 15, 3, 1, 11, 15 |

Table 8 resolves the characters of the lowercase Greek alphabet into the keystrokes appropriate for the FIG. 1 keyboard.

TABLE 8

Greek lowercase alphabet

| Top | Left | Bottom | Right |
|---|---|---|---|
| 9, 2 | 9, 2 | 9, 2 | 2, 9 |
| 7, 2, 7 | 2, 7, 7 | 2, 7, 14, 7 | 7, 7, 2 |
| 1, 3, 2 | 1, 2, 3 | 2, 1, 3 | 3, 2, 1 |
| 9, 11 | 9, 11 | 11, 9 | 11, 9 |
| 9, 9 | 9, 9 | 9, 9 | 9, 9 |
| 9, 7 | 9, 7 | 7, 9 | 7, 9 |
| 2, 8 | 2, 8 | 2, 8 | 8, 2 |
| 11, 5 | 11, 5 | 11, 5 | 11, 5 |
| 2 | 2 | 2, 2 | 2 |
| 2, 3, 1 | 2, 3, 1 | 2, 1, 14, 3 | 1, 3, 2 |
| 1, 3 | 1, 3 | 3, 1 | 1, 3 |
| 2, 2, 11 | 2, 11, 2 | 2, 2, 14, 11 | 2, 11, 2 |
| 1, 3 | 1, 3 | 1, 3 | 3, 1 |
| 9, 9, 7 | 9, 9, 7 | 7, 9, 9 | 7, 9, 9 |
| 11 | 11 | 11 | 11 |
| 5, 2, 2 | 5, 2, 2 | 2, 2, 14, 5 | 5, 2, 2 |
| 7, 2 | 2, 7 | 2, 7 | 7, 2 |
| 9, 7 | 9, 7 | 11, 5 | 7, 9 |
| 9, 7 | 9, 7 | 7, 9 | 7, 9 |
| 5, 2 | 5, 2 | 2, 5 | 5, 2 |
| 6, 4 | 6, 4 | 6, 4 | 4, 6 |
| 9, 7, 2, 13 | 9, 2, 13, 7 | 2, 7, 16, 9 | 7, 2, 16, 9 |
| 1, 3, 13 | 1, 3, 13 | 3, 1, 16 | 1, 3, 16 |
| 6, 2, 13, 4 | 6, 2, 13, 4 | 2, 6, 16, 4 | 4, 2, 16, 6 |
| 9, 2, 7 | 9, 2, 7 | 9, 7, 2 | 7, 2, 9 |
| 2, 8, 16, 9 | 2, 8, 16, 9 | 9, 2, 2, 15 | 2, 2, 15, 9 |
| 2, 9, 16, 9 | 2, 9, 16, 9 | 9, 9, 2, 15 | 9, 2, 15, 9 |
| 2, 2, 16, 8 | 2, 2, 16, 8 | 2, 8, 2, 15 | 8, 2, 15, 2 |
| 2, 2, 16 | 2, 2, 16 | 2, 2, 15 | 2, 2, 15 |
| 2, 11, 16 | 2, 11, 16 | 11, 2, 15 | 11, 2, 15 |
| 2, 6, 16, 4 | 2, 6, 16, 4 | 4, 6, 2, 15 | 4, 2, 15, 6 |
| 2, 9, 16, 2, 7 | 2, 9, 16, 2, 7 | 9, 7, 2, 2, 15 | 7, 2, 15, 2, 9 |
| 11, 2, 14, 11, 14, 2, 16 | 11, 2, 16, 2, 14, 11, 14 | 2, 11, 15, 2, 14, 11, 14 | 2, 11, 15, 2, 13, 11, 13 |
| 11, 2, 14, 11, 14, 6, 16, 4 | 11, 6, 16, 2, 14, 11, 14, 4 | 6, 4, 11, 15, 2, 14, 11, 14 | 4, 11, 15, 2, 13, 6, 11, 15 |
| 11, 11, 14, 2, 16 | 11, 2, 16, 11, 14 | 2, 11, 15, 11, 14 | 2, 11, 15, 11, 14 |
| 11, 11, 14, 6, 16, 4 | 11, 6, 16, 11, 14, 4 | 6, 4, 11, 15, 11, 14 | 4, 11, 15, 6, 11, 15 |

Figure 6:
FIG. 6 is a diagram of the first 35 characters of the Thai characters.

FIG. 6 is a diagram of the first 35 characters of the Thai Alphabet. The resolving of these characters is summarized in the following Table 9. In Table 9 the first numeral is the reference number from FIG. 6 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 9

Thai characters

| No. 2. | Top | Left | Bottom | Right |
|---|---|---|---|---|
| 101 | 8, 1, 2 | | | 8, 1, 2 |
| | 1, 8, 2 | | | 2, 8, 1, 14 |
| 102 | 9, 4, 14, 7, 7, 2 | | | 4, 7, 13, 2, 7, 9 |
| | 9, 4, 16, 7, 7, 2 | | | 4, 2, 7, 9, 7 |
| 103 | 9, 4, 14, 7, 14, 2, 7, 2 | | | 4, 7, 13, 2, 2, 7, 13, 9 |
| | 9, 4, 16, 7, 2, 7, 2 | | | 4, 2, 7, 9, 7, 2, 13 |
| 104 | 9, 8, 7, 3 | | | 8, 7, 13, 3, 9 |
| | 9, 3, 7, 8 | | | 9, 8, 3, 7 |
| 105 | 9, 8, 14, 2, 14, 7, 3 | | | 8, 2, 7, 13, 3, 9 |
| | 9, 3, 7, 2, 8 | | | 9, 8, 3, 7, 2, 14 |
| 106 | 9, 4, 14, 7, 14, 2, 7, 13, 9 | | | 4, 7, 13, 9, 16, 2, 7, 9 |
| | 9, 9, 16, 7, 2, 7, 13, 4 | | | 9, 4, 7, 9, 7, 2, 14, 16, 13 |
| 107 | 9, 4 | | | 4, 9 |
| | 9, 4 | | | 4, 9 |
| 108 | 8, 9, 7 | | | 8, 9, 7 |
| | 8, 9, 7 | | | 8, 9, 7 |
| 109 | 8, 9, 16, 6, 7, 13 | | | 7, 8, 16, 6, 9 |
| | 8, 9, 16, 6, 7, 13 | | | 6, 8, 7, 9, 14, 16 |
| 110 | 3, 9, 14, 7, 7, 7, 2 | | | 7, 3, 2, 7, 7, 13, 9 |
| | 9, 7, 16, 7, 7, 2, 3 | | | 7, 2, 7, 9, 7, 3 |
| 111 | 3, 9, 14, 7, 14, 2, 7, 7, 2 | | | 7, 3, 2, 7, 2, 7, 13, 9 |
| | 9, 7, 16, 7, 2, 7, 2, 3 | | | 7, 2, 7, 9, 7, 3, 2, 13 |
| 112 | 7, 4, 14, 1, 6, 7, 9, 13 | | | 4, 7, 13, 9, 16, 7, 6, 1 |
| | 1, 6, 16, 7, 7, 9, 4, 13 | | | 6, 7, 4, 7, 9, 1, 14, 14, 16 |
| 113 | 8, 4, 14, 1, 6, 7, 9, 16, 4, 7 | | | 4, 4, 15, 9, 7, 13, 8, 7, 6, 1 |
| | 1, 9, 16, 6, 6, 8, 7, 4, 7, 4 | | | 9, 4, 7, 6, 8, 7, 4, 1, 15, 14 |
| 114 | 7, 1, 4, 9, 3, 9, 13 | | | 7, 3, 13, 9, 16, 4, 1, 9 |
| | 1, 9, 16, 9, 16, 4, 3, 7, 13 | | | 9, 7, 3, 9, 4, 1, 16 |
| 115 | 7, 1, 4, 9, 3, 9, 13, 6 | | | 7, 6, 3, 16, 9, 1, 4, 9 |
| | 1, 9, 16, 9, 16, 4, 3, 7, 13, 6 | | | 9, 6, 3, 7, 9, 4, 1, 16, 15 |
| 116 | 11, 4, 8, 9, 7, 9, 16, 7, 9, 3, 13 | | | 7, 8, 15, 4, 15, 9, 6, 3, 16, 9, 9, 7 |
| | 11, 9, 16, 9, 16, 7, 8, 4, 3, 13, 6, 7 | | | 9, 6, 3, 7, 9, 8, 9, 7, 11, 16, 15 |
| 117 | 9, 8, 14, 7, 14, 2, 7, 6 | | | 8, 6, 7, 2, 7, 13, 9 |
| | 9, 7, 2, 7, 6, 8 | | | 6, 8, 9, 7, 7, 2, 13, 14 |
| 118 | 9, 4, 14, 7, 14, 2, 9, 3, 9, 13 | | | 4, 7, 13, 9, 16, 2, 3, 13, 9, 9 |
| | 9, 3, 9, 2, 7, 9, 13, 4 | | | 9, 9, 4, 3, 7, 9, 2, 14, 14, 16 |
| 119 | 8, 6, 14, 1, 6, 7, 7, 13 | | | 7, 6, 16, 8, 7, 6, 1 |
| | 1, 6, 16, 7, 8, 7, 6, 13 | | | 6, 8, 6, 7, 7, 1, 14, 14, 16 |
| 120 | 9, 8, 9, 16, 3 | | | 8, 3, 13, 9, 9 |
| | 9, 3, 9, 8 | | | 9, 8, 3, 9 |
| 121 | 9, 8, 14, 2, 14, 9, 3 | | | 8, 2, 3, 13, 9, 9 |
| | 9, 3, 9, 2, 8 | | | 9, 8, 3, 9, 2, 14 |
| 122 | 8, 1, 6, 7 | | | 8, 7, 6, 1 |
| | 1, 8, 6, 7 | | | 6, 8, 7, 1, 14 |
| 123 | 9, 8, 14, 6 | | | 8, 6, 9 |
| | 9, 6, 8 | | | 6, 8, 9 |
| 124 | 11, 4, 7, 2 | | | 7, 4, 15, 2, 11 |
| | 11, 7, 2, 4 | | | 7, 2, 11, 4 |
| 125 | 9, 6, 14, 6, 7, 13 | | | 7, 6, 16, 6, 9 |
| | 9, 6, 6, 7, 13 | | | 6, 6, 7, 9, 14, 16 |
| 126 | 9, 4, 14, 2 | | | 4, 2, 9 |
| | 9, 4, 16, 2 | | | 4, 2, 9 |
| 127 | 4, 9, 14, 2 | | | 4, 2, 9 |
| | 9, 4, 16, 2 | | | 4, 2, 9 |
| 128 | 9, 4, 14, 7 | | | 4, 9, 7 |
| | 9, 7, 4 | | | 9, 4, 7 |
| 129 | 4, 9, 14, 7 | | | 4, 9, 7 |
| | 9, 7, 4 | | | 9, 4, 7 |
| 130 | 9, 4, 14, 6 | | | 4, 6, 9 |
| | 9, 6, 4 | | | 6, 4, 9 |
| 131 | 4, 9, 14, 6 | | | 4, 6, 9 |
| | 9, 6, 4 | | | 6, 4, 9 |
| 132 | 8, 1, 4, 9 | | | 8, 1, 4, 9 |
| | 1, 9, 16, 8, 4 | | | 9, 8, 4, 1, 14 |
| 133 | 9, 4, 14, 7, 13, 9 | | | 4, 7, 13, 9, 16, 9 |
| | 9, 9, 16, 7, 13, 4 | | | 9, 4, 7, 9, 14 |
| 134 | 9, 4, 14, 7, 9 | | | 4, 9, 13, 7, 9 |
| | 9, 9, 7, 4 | | | 9, 4, 9, 7 |
| 135 | 11, 4, 7, 9 | | | 7, 4, 15, 9, 11 |
| | 11, 9, 16, 7, 4 | | | 9, 7, 11, 4 |

Figure 7:
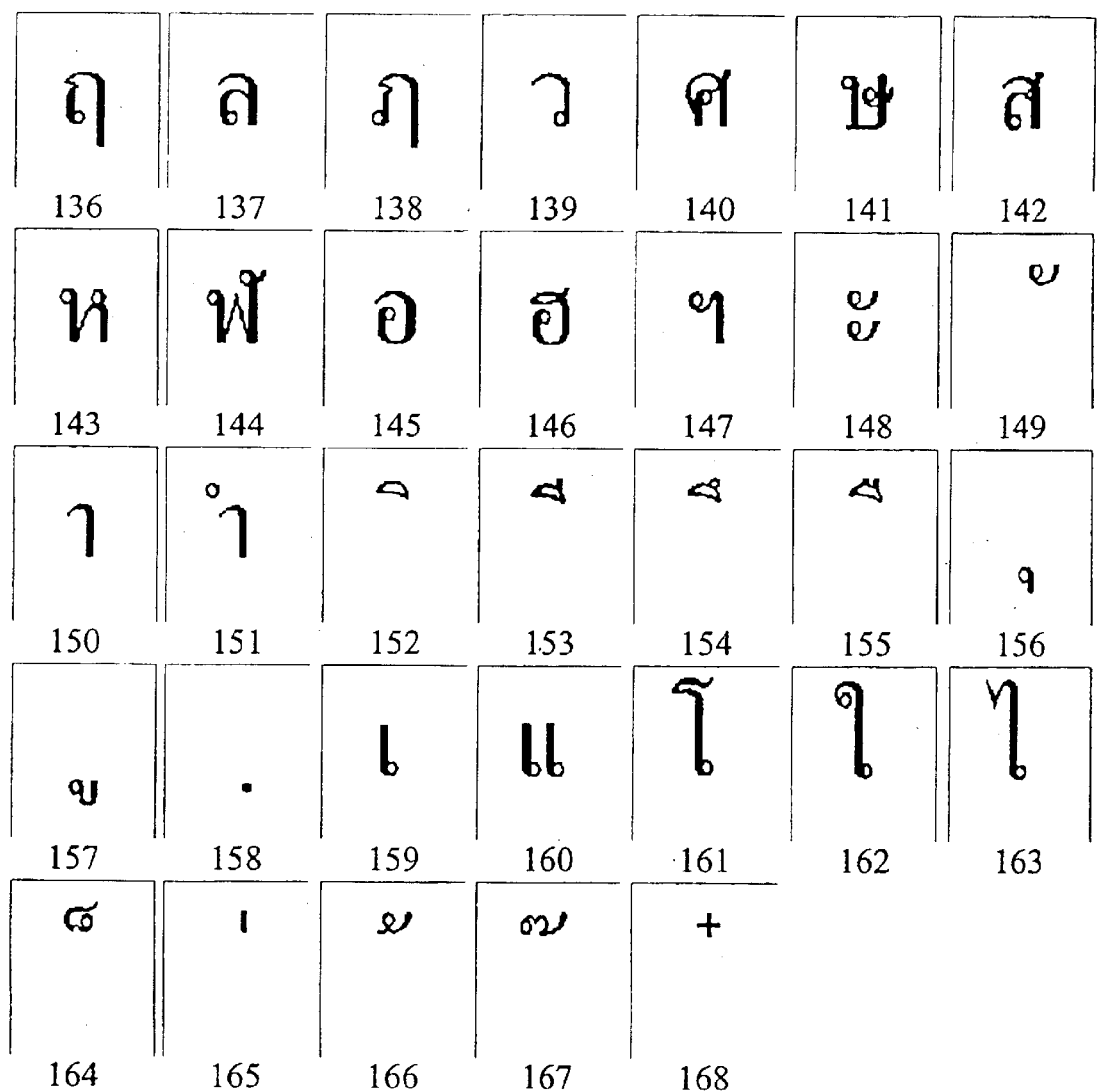
FIG. 7 is a diagram of the next 33 characters of the Thai characters.

FIG. 7 is a diagram of the last 33 characters of the Thai alphabet. The resolving of these characters is summarized in the following Table 10. In Table 10 the first numeral is the reference number from FIG. 7 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 10

Thai characters

| No. 3. | Top | Left | Bottom | Right |
|---|---|---|---|---|
| 136 | 8, 1, 6, 7 | | | 8, 7, 13, 6, 1 |
| | 1, 8, 6, 7 | | | 8, 6, 7, 1, 13 |
| 137 | 8, 9, 7 | | | 8, 9, 7 |
| | 8, 9, 7 | | | 9, 8, 7 |
| 138 | 8, 1, 4, 9 | | | 8, 1, 4, 7 |
| | 1, 9, 16, 8, 4 | | | 8, 9, 4, 1, 13 |
| 139 | 7, 9 | | | 7, 9 |
| | 7, 9 | | | 9, 7 |
| 140 | 3, 9, 13, 8, 7, 3, 16 | | | 3, 8, 16, 7, 13, 3, 9 |
| | 9, 3, 7, 8, 3, 13 | | | 9, 8, 3, 7, 3, 16 |
| 141 | 9, 4, 14, 2, 9, 4, 13, 7 | | | 4, 4, 16, 7, 9, 2, 9 |
| | 9, 4, 16, 2, 9, 14, 7, 13, 3 | | | 4, 2, 9, 4, 7, 9, 15, 16 |
| 142 | 3, 8, 13, 9, 16, 7 | | | 3, 8, 16, 9, 7 |
| | 8, 9, 7, 3, 13 | | | 9, 8, 7, 3, 16 |
| 143 | 9, 9, 14, 6, 7, 13, 8 | | | 8, 7, 15, 9, 16, 6, 9 |
| | 9, 6, 9, 7, 8, 13 | | | 6, 8, 9, 9, 7, 14, 16 |
| 144 | 3, 9, 7, 13, 9, 6 | | | 3, 7, 16, 9, 6, 9 |
| | 9, 6, 9, 14, 4, 3, 13 | | | 6, 7, 9, 9, 3, 16 |
| 145 | 7, 9, 7 | | | 7, 9, 7 |
| | 7, 9, 7 | | | 9, 7, 7 |
| 146 | 3, 9, 7, 13, 9, 7 | | | 7, 3, 16, 9, 9, 7 |
| | 9, 9, 16, 7, 7, 3, 13 | | | 9, 7, 7, 9, 3, 16 |
| 147 | 9, 4, 7, 2 | | | 2, 4, 7, 9 |
| | 9, 7, 4, 2 | | | 2, 9, 4, 7, 13 |
| 148 | 9, 4, 7, 9, 16, 4, 7 | | | 4, 4, 15, 7, 7, 9, 9 |
| | 9, 9, 16, 7, 7, 4, 4 | | | 9, 4, 7, 9, 4, 7, 15 |
| 149 | 9, 4, 7 | | | 4, 9, 7 |
| | 9, 7, 4 | | | 9, 4, 7 |
| 150 | 8 | | | 8 |
| | 8 | | | 8 |
| 151 | 11, 8, 16 | | | 8, 11, 15 |
| | 11, 8, 16 | | | 8, 11, 16 |
| 152 | 11, 1 | | | 1, 11 |
| | 1, 11 | | | 1, 11 |
| 153 | 2, 11, 1 | | | 1, 11, 2 |
| | 1, 11, 2 | | | 1, 11, 2 |
| 154 | 11, 11, 1 | | | 1, 11, 11 |
| | 1, 11, 11 | | | 1, 11, 11 |
| 155 | 2, 2, 14, 11, 1 | | | 1, 11, 2, 2 |
| | 1, 11, 2, 2 | | | 1, 11, 2, 2 |
| 156 | 9, 2 | | | 2, 9 |
| | 9, 2 | | | 2, 9 |
| 157 | 9, 4, 14, 6 | | | 4, 6, 9 |
| | 9, 6, 4 | | | 6, 4, 9 |
| 158 | 11 | | | 11 |
| | 11 | | | 11 |
| 159 | 6, 7 | | | 7, 6 |
| | 6, 7 | | | 6, 7 |
| 160 | 6, 6, 14, 7, 7 | | | 7, 6, 7, 13, 6 |
| | 6, 7, 6, 14, 7 | | | 6, 6, 7, 7, 14 |
| 161 | 11, 4, 8, 7 | | | 7, 4, 15, 8, 11 |
| | 11, 8, 4, 7 | | | 8, 7, 11, 4 |
| 162 | 9, 6, 7, 7 | | | 7, 6, 9, 7 |
| | 9, 7, 6, 7 | | | 6, 7, 9, 7 |
| 163 | 1, 8, 14, 7 | | | 7, 8, 1 |
| | 1, 8, 7 | | | 8, 7, 1 |

TABLE 10-continued

Thai characters

| No. 3. | Top | Left | Bottom | Right |
|---|---|---|---|---|
| 164 | 3, 9, 14, 7, 13 | | | 7, 3, 16, 9 |
| | 9, 3, 14, 7, 13 | | | 9, 7, 3, 16 |
| 165 | 2 | | | 2 |
| | 2 | | | 2 |
| 166 | 9, 4, 7, 13 | | | 4, 9, 7, 16 |
| | 7, 9, 13, 4 | | | 7, 4, 9, 14, 16 |
| 167 | 9, 4, 14, 7, 14, 2, 7 | | | 4, 7, 2, 7, 13, 9 |
| | 9, 7, 2, 7, 4 | | | 9, 7, 7, 4, 2, 14 |
| 168 | 2, 5, 13 | | | 5, 2, 16 |
| | 5, 2, 13 | | | 2, 5, 16 |

Figure 8:
FIG. 8 is a diagram of the 40 characters of the phonetic Chinese characters called Zhuyin or Bopomofo.

FIG. 8 is a diagram of the second 40 characters of the phonetic Chinese characters called Zhuyin or Bopomofo. The resolving of these characters is summarized in the following Table 11. In Table 11 the first numeral is the reference number from FIG. 8 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 11

Chinese Zhuyin characters (Bopomofo)

| No. 4. | Top | Left | Bottom | Right |
|---|---|---|---|---|
| 201 | 3, 7 | | | 7, 3 |
| | 3, 7 | | | 7, 3 |
| 202 | 3, 10, 1, 13 | | | 1, 10, 16, 3 |
| | 3, 1, 16, 10, 13 | | | 10, 1, 16, 3 |
| 203 | 8, 2 | | | 8, 2 |
| | 2, 8 | | | 2, 8 |
| 204 | 5, 6 | | | 6, 5 |
| | 6, 5 | | | 6, 5 |
| 205 | 3, 7, 4 | | | 7, 4, 3 |
| | 3, 4, 16, 7 | | | 4, 7, 3 |
| 206 | 3, 5, 13, 1, 16, 3 | | | 1, 5, 15, 3, 3, 16 |
| | 5, 3, 16, 3, 13, 1 | | | 3, 1, 3, 5, 16 |
| 207 | 10, 7 | | | 7, 10 |
| | 10, 7 | | | 7, 10 |
| 208 | 3, 4, 14, 7, 13 | | | 7, 4, 16, 3 |
| | 3, 4, 16, 7 | | | 4, 7, 16, 3 |
| 209 | 3, 3, 14, 1, 1 | | | 3, 1, 3, 13, 1 |
| | 3, 1, 3, 14, 1 | | | 1, 1, 14, 3, 3 |
| 210 | 5, 3, 7 | | | 7, 5, 15, 3 |
| | 5, 3, 7 | | | 7, 3, 5 |
| 211 | 5, 4 | | | 5, 4 |
| | 4, 5 | | | 4, 5 |
| 212 | 2, 2, 14, 3 | | | 2, 3, 2 |
| | 3, 2, 2 | | | 2, 3, 2 |
| 213 | 3, 1 | | | 3, 1 |
| | 3, 1 | | | 1, 3 |
| 214 | 5, 2 | | | 5, 2 |
| | 5, 2 | | | 2, 5 |
| 215 | 2, 2, 14, 2, 14, 5, 13, 5 | | | 5, 2, 15, 5, 2, 16, 2 |
| | 2, 5, 16, 5, 2, 13, 2 | | | 5, 2, 2, 15, 5, 16, 2 |
| 216 | 3, 3, 16, 2 | | | 3, 3, 15, 2 |
| | 3, 3, 16, 2 | | | 2, 3, 3, 15 |
| 217 | 8, 5, 4 | | | 8, 5, 4 |
| | 8, 4, 16, 5 | | | 4, 5, 8 |
| 218 | 8, 2, 1, 16, 5 | | | 8, 5, 1, 13, 2 |
| | 2, 8, 5, 1, 14 | | | 2, 5, 8, 1, 15 |

TABLE 11-continued

Chinese Zhuyin characters (Bopomofo)

| No. 4. | Top | Left | Bottom | Right |
|---|---|---|---|---|
| 219 | 7, 2 | | | 7, 2 |
| | 7, 2 | | | 2, 7 |
| 220 | 3, 5, 13, 10 | | | 10, 5, 15, 3, 16 |
| | 5, 3, 13, 10 | | | 10, 3, 5, 16 |
| 221 | 3, 1, 16, 3 | | | 1, 3, 3 |
| | 3, 3, 1 | | | 3, 1, 3 |
| 222 | 1, 3, 2 | | | 3, 2, 1 |
| | 1, 2, 6 | | | 2, 1, 3 |
| 223 | 5, 2, 9 | | | 9, 5, 15, 2 |
| | 5, 9, 16, 2 | | | 9, 2, 5 |
| 224 | 2, 5, 13, 9 | | | 9, 5, 15, 2, 16 |
| | 5, 9, 16, 2, 13 | | | 9, 2, 5, 16 |
| 225 | 6, 2, 14, 5, 13 | | | 6, 5, 16, 2, 16 |
| | 5, 6, 13, 2, 13 | | | 6, 2, 15, 5, 16 |
| 226 | 5, 4, 3, 16, 10, 13 | | | 10, 5, 15, 4, 16, 3 |
| | 5, 3, 16, 4, 10, 13 | | | 4, 10, 16, 3, 5 |
| 227 | 9 | | | 9 |
| | 9 | | | 9 |
| 228 | 3, 3, 16, 3, 1, 16, 3 | | | 1, 3, 3, 3, 3 |
| | 3, 3, 16, 3, 3, 1 | | | 3, 1, 3, 3, 3 |
| 229 | 10, 1, 13 | | | 1, 10, 16 |
| | 10, 1, 13 | | | 10, 1, 16 |
| 230 | 10, 3, 16, 10 | | | 10, 10, 3 |
| | 10, 3, 16, 10 | | | 10, 3, 10 |
| 231 | 3, 10 | | | 10, 3 |
| | 3, 10 | | | 10, 3 |
| 232 | 4, 5, 13, 6, 16 | | | 6, 5, 15, 4, 16 |
| | 5, 4, 13, 6, 14 | | | 4, 6, 14, 5, 16 |
| 233 | 3, 5 | | | 5, 3 |
| | 3, 5 | | | 5, 3 |
| 234 | 4, 6, 14 | | | 6, 4, 13 |
| | 4, 6, 14 | | | 4, 6 |
| 235 | 5 | | | 5 |
| | 5 | | | 5 |
| 236 | 1, 3, 13 | | | 1, 3, 16 |
| | 1, 3, 13 | | | 3, 1, 16 |
| 237 | 2, 2, 14, 5 | | | 2, 5, 2 |
| | 2, 5, 2 | | | 2, 5, 2 |
| 238 | 5, 4, 7 | | | 7, 5, 15, 4 |
| | 5, 4, 7 | | | 4, 7, 5 |
| 239 | 5, 4, 6 | | | 6, 5, 4 |
| | 5, 4, 6 | | | 4, 6, 14, 5 |
| 240 | 2, 5, 4 | | | 5, 2, 4 |
| | 4, 5, 2 | | | 4, 5, 2 |

Figure 9:
FIG. 9 is a diagram of the 40 characters of the phonetic Korean characters called Hangul.

FIG. 9 is a diagram of the 40 characters of the phonetic Korean called Hangul characters. The resolving of these characters is summarized in the following Table 12. In Table 12 the first numeral is the reference number from FIG. 9 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 12

Korean Hangul characters

| No. 5. | Top | Left | Bottom | Right |
|---|---|---|---|---|
| 301 | 8 | | | 8 |
| | 8 | | | 8 |
| 302 | 6 | | | 6 |
| | 6 | | | 6 |
| 303 | 5, 6 | | | 6, 5 |
| | 6, 5 | | | 6, 5 |
| 304 | 8, 5, 6 | | | 6, 8, 15, 5 |
| | 8, 6, 16, 5 | | | 6, 5, 8 |
| 305 | 8, 2, 5 | | | 8, 5, 2 |
| | 2, 8, 5 | | | 2, 5, 8 |
| 306 | 2, 2, 14, 5, 5 | | | 2, 5, 5, 2 |
| | 2, 5, 5, 2 | | | 2, 5, 2, 5 |
| 307 | 3, 1 | | | 1, 3 |
| | 3, 1 | | | 3, 1 |
| 308 | 2, 11 | | | 11, 2 |
| | 11, 2 | | | 11, 2 |
| 309 | 5, 3, 1 | | | 1, 5, 15, 3 |
| | 5, 3, 1 | | | 3, 1, 5 |
| 310 | 5, 5, 16, 3, 1 | | | 1, 5, 15, 5, 15, 3 |
| | 5, 5, 16, 3, 1 | | | 3, 1, 5, 5, 15 |
| 311 | 10, 5 | | | 10, 5 |
| | 10, 5 | | | 10, 5 |

TABLE 12-continued

Korean Hangul characters

| No. 5. | Top | Left | Bottom | Right |
|---|---|---|---|---|
| 312 | 5, 6, 5 | | | 6, 5, 5 |
| | 6, 5, 5 | | | 6, 5, 5 |
| 313 | 5, 1, 16, 3, 14, 5 | | | 5, 5, 15, 3, 13, 1 |
| | 5, 5, 16, 1, 14, 3 | | | 5, 1, 15, 3, 5, 15 |
| 314 | 5, 5, 16, 2, 16, 11 | | | 11, 5, 15, 5, 15, 2 |
| | 5, 5, 16, 2, 16, 11 | | | 11, 2, 5, 15, 5 |
| 315 | 8, 8, 14 | | | 8, 8, 13 |
| | 8, 8, 14 | | | 8, 8, 14 |
| 316 | 5, 5, 14, 6, 6 | | | 6, 5, 6, 13, 5 |
| | 6, 5, 6, 14, 5 | | | 6, 6, 14, 5, 5 |
| 317 | 2, 2, 14, 2, 14, 2, 14, 5, 5, 5, 5 | | | 2, 5, 5, 2, 2, 13, 5, 5, 2 |
| | 2, 5, 5, 2, 2, 14, 5, 5, 2 | | | 2, 2, 14, 5, 5, 2, 2, 5, 5 |
| 318 | 3, 3, 14, 1, 1 | | | 1, 3, 1, 13, 3 |
| | 3, 1, 3, 14, 1 | | | 3, 3, 14, 1, 1 |
| 319 | 5, 5, 14, 3, 3, 1, 1 | | | 1, 5, 15, 3, 1, 13, 5, 15, 3 |
| | 5, 3, 1, 5, 14, 3, 1 | | | 3, 3, 14, 1, 1, 5, 5 |
| 320 | 2, 5 | | | 5, 2 |
| | 2, 5 | | | 2, 5 |
| 321 | 2, 5, 5 | | | 5, 5, 15, 2 |
| | 2, 5, 5 | | | 2, 5, 5 |
| 322 | 2, 5 | | | 5, 2 |
| | 5, 2 | | | 2, 5 |
| 323 | 2, 5, 5 | | | 2, 5, 5 |
| | 5, 5, 16, 2 | | | 2, 5, 5 |
| 324 | 2, 5 | | | 5, 2 |
| | 5, 2 | | | 5, 2 |
| 325 | 2, 2, 14, 5 | | | 5, 2, 2 |
| | 5, 2, 2 | | | 5, 2, 2 |
| 326 | 5, 2 | | | 5, 2 |
| | 5, 2 | | | 2, 5 |
| 327 | 5, 2, 2 | | | 5, 2, 2 |
| | 5, 2, 2 | | | 2, 2, 14, 5 |
| 328 | 5 | | | 5 |
| | 5 | | | 5 |
| 329 | 2 | | | 2 |
| | 2 | | | 2 |
| 330 | 2, 2, 14, 5 | | | 2, 5, 2 |
| | 2, 5, 2 | | | 2, 2, 14, 5 |
| 331 | 2, 2, 14, 5, 5 | | | 2, 5, 5, 2 |
| | 2, 5, 5, 2 | | | 2, 2, 14, 5, 5 |
| 332 | 2, 2, 14, 5 | | | 2, 2, 13, 5 |
| | 5, 2, 2, 14 | | | 2, 2, 14, 5 |
| 333 | 2, 2, 14, 5, 5 | | | 2, 2, 13, 5, 5 |
| | 5, 5, 16, 2, 2, 14 | | | 2, 2, 14, 5, 5 |
| 334 | 2, 2, 14, 3, 5 | | | 5, 2, 3, 2 |
| | 3, 2, 2, 5 | | | 2, 3, 2, 5 |
| 335 | 2, 2, 14, 2, 14, 3, 5 | | | 2, 5, 2, 3, 2 |
| | 3, 2, 2, 5, 2 | | | 2, 2, 14, 3, 2, 5 |
| 336 | 2, 2, 14, 3 | | | 2, 3, 2 |
| | 3, 2, 2 | | | 2, 3, 2 |
| 337 | 2, 3, 14, 2, 5 | | | 2, 5, 3, 13, 2 |
| | 3, 2, 5, 14, 2 | | | 2, 2, 14, 5, 3 |
| 338 | 2, 3, 14, 2, 14, 2, 5 | | | 2, 2, 13, 3, 6, 13, 2 |
| | 3, 2, 5, 14, 2, 2, 14 | | | 2, 2, 14, 2, 14, 5, 3 |
| 339 | 2, 3, 2 | | | 2, 3, 2 |
| | 3, 2, 2 | | | 2, 2, 14, 3 |
| 340 | 2, 3 | | | 2, 3 |
| | 3, 2 | | | 2, 3 |

FIG. 10 is a diagram of the first 42 characters of the phonetic Japanese called Katakana. The resolving of these characters is summarized in the following Table 13. In Table 13 the first numeral is the reference number from FIG. 10 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 13

Japanese Katakana characters

| No. 6. | Top | Left | Bottom | Right |
|---|---|---|---|---|
| 401 | 10, 4 | | | 10, 4 |
| | 10, 4 | | | 4, 10 |
| 402 | 3, 2 | | | 3, 2 |
| | 3, 2 | | | 2, 3 |

TABLE 13-continued

Japanese Katakana characters

| No. 6. | Top | Left | Bottom | Right |
|---|---|---|---|---|
| 403 | 2, 10, 2 | | | 10, 2, 2 |
| | 2, 10, 2 | | | 10, 2, 2 |
| 404 | 5, 2, 5 | | | 5, 5, 15, 2 |
| | 5, 5, 16, 2 | | | 5, 2, 5 |
| 405 | 4, 5, 13, 3 | | | 5, 4, 16, 3 |
| | 5, 3, 4, 13 | | | 3, 4, 5, 13 |
| 406 | 4, 7, 13 | | | 7, 4, 16 |
| | 7, 4, 13 | | | 4, 7, 13 |
| 407 | 4, 1, 14, 1, 14, 7, 13 | | | 7, 1, 15, 1, 13, 4, 16 |
| | 7, 4, 13, 1, 14, 1, 14 | | | 4, 7, 13, 1, 15, 1, 14 |
| 408 | 1, 5, 13, 5, 13 | | | 5, 5, 16, 1, 16 |
| | 5, 5, 16, 1, 13 | | | 1, 5, 13, 5, 13 |
| 409 | 1, 1, 14, 1, 14, 5, 13, 5, 13 | | | 5, 1, 15, 5, 15, 1, 13, 1, 16 |
| | 5, 5, 16, 1, 13, 1, 14, 1, 14 | | | 1, 5, 13, 5, 13, 1, 15, 1, 14 |
| 410 | 3, 10 | | | 10, 3 |
| | 3, 10 | | | 10, 3 |
| 411 | 3, 1, 14, 1, 14, 10 | | | 10, 1, 15, 1, 13, 3 |
| | 1, 10, 1, 14, 1, 14 | | | 10, 3, 1, 15, 1, 14 |
| 412 | 3, 5, 3 | | | 5, 3, 3 |
| | 3, 3, 16, 5 | | | 3, 3, 15, 5 |
| 413 | 3, 1, 14, 1, 14, 5, 3 | | | 5, 1, 15, 1, 13, 3, 3 |
| | 1, 1, 16, 5, 1, 14, 1, 14 | | | 3, 3, 15, 5, 1, 15, 1, 14 |
| 414 | 8, 5 | | | 8, 5 |
| | 8, 5 | | | 5, 8 |
| 415 | 8, 1, 14, 1, 14, 5 | | | 8, 1, 15, 1, 13, 5 |
| | 8, 5, 1, 14, 1, 14 | | | 5, 8, 1, 15, 1, 14 |
| 416 | 2, 4, 14, 5, 13 | | | 5, 4, 16, 2, 16 |
| | 5, 2, 13, 4, 13 | | | 4, 2, 15, 5, 16 |
| 417 | 2, 1, 14, 4, 14, 1, 14, 5, 13 | | | 5, 1, 15, 1, 13, 4, 16, 2, 16 |
| | 5, 2, 13, 4, 13, 1, 14, 1, 14 | | | 4, 2, 15, 5, 16, 1, 15, 1, 14 |
| 418 | 1, 1, 16, 3, 16 | | | 3, 1, 13, 1, 15 |
| | 1, 1, 16, 3, 16 | | | 3, 1, 15, 1, 15 |
| 419 | 1, 1, 14, 1, 14, 1, 16, 3, 16 | | | 3, 1, 15, 1, 13, 1, 13, 1, 15 |
| | 1, 1, 16, 3, 16, 1, 14, 1, 14 | | | 3, 1, 15, 1, 15, 1, 14, 1, 14 |
| 420 | 10, 1 | | | 1, 10 |
| | 10, 1 | | | 10, 1 |
| 421 | 10, 1, 14, 1, 14, 1 | | | 1, 1, 15, 1, 13, 10 |
| | 10, 1, 1, 14, 1, 14 | | | 10, 1, 1, 15, 1, 14 |
| 422 | 6, 10, 13 | | | 6, 10, 16 |
| | 10, 6, 13 | | | 6, 10, 13 |
| 423 | 6, 1, 14, 1, 14, 10, 13 | | | 6, 1, 15, 10, 16, 1, 13 |
| | 10, 6, 13, 1, 14, 1, 14 | | | 6, 10, 13, 1, 15, 1, 14 |
| 424 | 1, 3, 14 | | | 3, 1, 13 |
| | 1, 3, 16 | | | 3, 1, 15 |
| 425 | 1, 1, 14, 3, 16, 1, 14 | | | 3, 1, 15, 1, 13, 1, 13 |
| | 1, 3, 16, 1, 14, 1, 14 | | | 3, 1, 15, 1, 14, 1, 14 |
| 426 | 3, 10, 1 | | | 10, 1, 3 |
| | 3, 10, 1 | | | 10, 1, 3 |
| 427 | 3, 1, 14, 1, 14, 10, 1 | | | 10, 1, 15, 1, 13, 1, 3 |
| | 1, 10, 1, 1, 14, 1, 14 | | | 10, 1, 3, 1, 15, 1, 14 |
| 428 | 3, 4, 5, 13 | | | 5, 3, 15, 4, 16 |
| | 3, 5, 16, 4, 13 | | | 4, 5, 16, 1 |
| 429 | 3, 1, 14, 1, 14, 4, 5, 13 | | | 5, 1, 15, 1, 13, 3, 13, 4, 16 |
| | 1, 5, 16, 6, 13, 1, 14, 1, 14 | | | 4, 5, 13, 3, 1, 15, 1, 14 |
| 430 | 1, 1, 14, 3, 14 | | | 3, 1, 13, 1, 13 |
| | 1, 3, 16, 1, 14 | | | 3, 1, 15, 1, 14 |
| 441 | 1, 1, 14, 1, 14, 1, 14, 3, 16 | | | 3, 1, 15, 1, 13, 1, 13, 1, 13 |
| | 1, 3, 16, 1, 14, 1, 14, 1, 14 | | | 3, 1, 15, 1, 14, 1, 14, 1, 14 |
| 432 | 5, 5, 16, 3 | | | 5, 5, 15, 3 |
| | 5, 5, 16, 3 | | | 3, 5, 5, 15 |
| 433 | 5, 1, 14, 1, 14, 5, 16, 3 | | | 5, 1, 15, 1, 13, 5, 13, 3 |
| | 5, 5, 16, 3, 1, 14, 1, 14 | | | 3, 5, 5, 15, 1, 15, 1, 14 |
| 434 | 2, 1 | | | 1, 2 |
| | 2, 1 | | | 2, 1 |
| 435 | 2, 1, 14, 1, 14, 1 | | | 1, 1, 15, 1, 13, 2 |
| | 2, 1, 1, 14, 1, 14 | | | 2, 1, 1, 15, 1, 14 |
| 436 | 4, 5, 13 | | | 5, 4, 16 |
| | 5, 4, 13 | | | 4, 5, 13 |
| 437 | 5, 5, 16 | | | 5, 5, 15 |
| | 5, 5, 16 | | | 5, 5, 15 |
| 438 | 10, 1, 13 | | | 1, 10, 16 |
| | 10, 1, 13 | | | 10, 1, 13 |
| 439 | 1, 10, 16, 2, 1, 14 | | | 1, 1, 15, 10, 2 |
| | 1, 10, 16, 2, 1, 14 | | | 2, 10, 1, 14, 1, 15 |
| 440 | 3 | | | 3 |
| | 3 | | | 3 |
| 441 | 3, 1, 14 | | | 1, 3, 13 |
| | 3, 1, 14 | | | 3, 1, 14 |
| 442 | 3, 1, 14, 1, 14, 1, 15 | | | 1, 1, 15, 1, 13, 3, 13 |
| | 3, 1, 14, 1, 14, 1, 14 | | | 3, 1, 14, 1, 15, 1, 14 |

Figure 11:
FIG. 11 is a diagram of the next 38 characters of the phonetic Japanese called Katakana.

FIG. 11 is a diagram of the last 38 characters of the phonetic Japanese called Katakana. The resolving of these characters is summarized in the following Table 14. In Table 14 the first numeral is the reference number from FIG. 11 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 14

Japanese Katakana characters

| No. | Top | Left | Bottom | Right |
|---|---|---|---|---|
| 443 | 3, 11, 14, 1, 15 | | | 1, 11, 15, 3, 13 |
| | 3, 1, 14, 11, 14 | | | 3, 1, 14, 11, 15 |
| 444 | 6, 3 | | | 6, 3 |
| | 6, 3 | | | 6, 3 |
| 445 | 6, 1, 14, 1, 14, 3 | | | 6, 1, 15, 3, 1, 13 |
| | 6, 3, 1, 14, 1, 14 | | | 6, 3, 1, 15, 1, 14 |
| 446 | 6, 11, 14, 3 | | | 6, 11, 15, 3 |
| | 6, 3, 11, 14 | | | 6, 3, 11, 15 |
| 447 | 10 | | | 10 |
| | 10 | | | 10 |
| 448 | 10, 1, 14, 1, 14 | | | 10, 1, 15, 1, 13 |
| | 10, 1, 14, 1, 14 | | | 10, 1, 15, 1, 14 |
| 449 | 10, 11, 14 | | | 10, 11, 15 |
| | 10, 11, 14 | | | 10, 11, 15 |
| 450 | 3, 1 | | | 1, 3 |
| | 3, 1 | | | 3, 1 |
| 451 | 3, 1, 14, 1, 14, 1 | | | 1, 1, 15, 1, 13, 3 |
| | 3, 1, 1, 14, 1, 14 | | | 3, 1, 1, 15, 1, 14 |
| 452 | 3, 11, 14, 1 | | | 1, 11, 15, 3 |
| | 3, 1, 11, 14 | | | 3, 1, 11, 15 |
| 453 | 4, 5, 13, 3, 16, 1, 14 | | | 1, 5, 15, 4, 16, 3, 13 |
| | 5, 3, 16, 4, 13, 1, 14 | | | 3, 4, 14, 1, 14, 5, 13 |
| 454 | 4, 1, 14, 1, 14, 5, 13, 3, 16, 1, 14 | | | 1, 5, 15, 1, 15, 1, 13, 4, 16, 3, 13 |
| | 5, 3, 16, 4, 13, 1, 14, 1, 16, 1, 14 | | | 3, 4, 14, 1, 14, 5, 13, 1, 15, 1, 14 |
| 455 | 4, 11, 14, 5, 13, 3, 16, 1, 14 | | | 1, 5, 15, 11, 15, 4, 13, 3, 13 |
| | 5, 3, 16, 4, 13, 11, 14, 1, 16 | | | 3, 4, 14, 1, 14, 5, 13, 11, 15 |
| 456 | 10, 1 | | | 1, 10 |
| | 10, 1 | | | 1, 10 |
| 457 | 1, 1, 16, 1, 16 | | | 1, 1, 15, 1, 15 |
| | 1, 1, 16, 1, 16 | | | 1, 1, 15, 1, 15 |
| 458 | 3, 1, 16, 3 | | | 1, 3, 3 |
| | 3, 3, 1 | | | 3, 1, 3 |
| 459 | 3, 1, 13 | | | 1, 3, 16 |
| | 1, 3, 13 | | | 3, 1, 16 |
| 460 | 5, 6, 5, 13 | | | 6, 5, 16, 5 |
| | 5, 5, 16, 6, 13 | | | 6, 5, 13, 5 |
| 461 | 1, 10, 13 | | | 10, 1, 16 |
| | 10, 1, 13 | | | 1, 10, 13 |
| 462 | 8, 5 | | | 5, 8 |
| | 8, 5 | | | 5, 8 |
| 463 | 8, 5, 5 | | | 8, 5, 5 |
| | 8, 5, 5 | | | 5, 8, 5 |
| 464 | 5, 10, 16 | | | 10, 5, 15 |
| | 5, 10, 16 | | | 10, 5, 15 |
| 465 | 2, 4, 14 | | | 4, 2, 13 |
| | 2, 4, 14 | | | 2, 4, 14 |
| 466 | 3, 6, 14 | | | 6, 3, 13 |
| | 3, 6, 14 | | | 3, 6, 14 |
| 467 | 6 | | | 6 |
| | 6 | | | 6 |
| 468 | 8, 2, 5 | | | 8, 5, 2 |
| | 2, 8, 5 | | | 2, 5, 8 |
| 469 | 10, 2 | | | 10, 2 |
| | 2, 10 | | | 10, 2 |
| 470 | 2, 5, 13, 2, 5, 13 | | | 5, 5, 15, 2, 16, 2 |
| | 5, 5, 16, 2, 2, 13 | | | 2, 5, 13, 2, 5, 13 |
| 471 | 10, 2, 5 | | | 5, 10, 15, 2 |
| | 10, 5, 16, 2 | | | 5, 2, 10 |
| 472 | 10, 5 | | | 10, 5 |
| | 10, 5 | | | 10, 5 |
| 473 | 1, 3, 16 | | | 3, 1, 13 |
| | 1, 3, 16 | | | 3, 1, 15 |
| 474 | 2, 1, 14, 1, 14, 10, 2 | | | 10, 1, 15, 1, 13, 2, 2 |
| | 2, 10, 2, 1, 14, 1, 14 | | | 10, 2, 2, 1, 15, 1, 14 |
| 475 | 10, 1, 14, 1, 14, 2 | | | 10, 1, 15, 1, 13, 2 |
| | 2, 10, 1, 14, 1, 14 | | | 10, 2, 1, 15, 1, 14 |
| 476 | 2, 1, 14, 1, 14, 5, 13, 2, 5, 13 | | | 5, 1, 15, 1, 13, 5, 16, 2, 2 |
| | 5, 5, 16, 2, 2, 13, 1, 14, 1, 14 | | | 2, 5, 13, 2, 5, 13, 1, 15, 1, 14 |
| 477 | 10, 1, 14, 1, 14, 2, 5 | | | 5, 1, 15, 10, 15, 1, 13, 2 |
| | 10, 5, 16, 2, 1, 14, 1, 14 | | | 5, 2, 10, 1, 15, 1, 14 |
| 478 | 10, 1, 14, 1, 14, 5 | | | 10, 1, 15, 1, 13, 5 |
| | 10, 5, 1, 14, 1, 14 | | | 10, 5, 1, 15, 1, 14 |

TABLE 14-continued

Japanese Katakana characters

| No. 7. | Top | Left | Bottom | Right |
|---|---|---|---|---|
| 479 | 5 | | | 5 |
| | 5 | | | 5 |
| 480 | 1 | | | 1 |
| | 1 | | | 1 |

Chinese characters are used in Chinese, Japanese, Korean, and Vietnamese (CJKV). They are ideographs and are not necessarily phonetic. The invention is particularly adapted for resolving CJKV unified ideographs. Radicals are the building blocks of CJKV unified ideographs of which the most common set contains 214 radicals. A supplemental set of radicals are used for simplified and alternative forms of traditional ideographs used for combining ideographs to form separate entries in character dictionaries.

Figure 12:
FIG. 12 is a diagram of the first 42 radicals of Chinese, Japanese, Korean, Vietnamese (CJKV) Unified Ideographs.

FIG. 12 is a diagram of the first 42 radicals of unified ideographs. The resolving of these characters is summarized in the following Table 15. In Table 15 the first numeral is the reference number from FIG. 12 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 15

CJKV unified ideographs

| No. 8. | Top | Left | Bottom | Right |
|---|---|---|---|---|
| 501 | 5 | | | 5 |
| | 5 | | | 5 |
| 502 | 2 | | | 2 |
| | 2 | | | 2 |
| 503 | 1 | | | 1 |
| | 1 | | | 1 |
| 504 | 4 | | | 4 |
| | 4 | | | 4 |
| 505 | 9 | | | 9 |
| | 9 | | | 9 |
| 506 | 4 | | | 4 |
| | 4 | | | 4 |
| 507 | 5, 5, 16 | | | 5, 5, 15 |
| | 5, 5, 16 | | | 5, 5, 15 |
| 508 | 1, 5, 16 | | | 1, 5, 15 |
| | 1, 5, 16 | | | 5, 1, 15 |
| 509 | 4, 1 | | | 1, 4 |
| | 4, 1 | | | 4, 1 |
| 510 | 4, 6, 14 | | | 6, 4, 13 |
| | 4, 6, 14 | | | 4, 6, 14 |
| 511 | 1, 3 | | | 1, 3 |
| | 1, 3 | | | 1, 3 |
| 512 | 3, 1, 14 | | | 1, 3, 13 |
| | 3, 1, 14 | | | 3, 1, 14 |
| 513 | 7, 2 | | | 7, 2 |
| | 2, 7 | | | 2, 7 |
| 514 | 10, 3 | | | 10, 3 |
| | 3, 10 | | | 3, 10 |
| 515 | 1, 3, 16 | | | 1, 3, 15 |
| | 1, 3, 16 | | | 1, 3, 15 |

TABLE 15-continued

CJKV unified ideographs

| No. 8. | Top | Left | Bottom | Right |
|---|---|---|---|---|
| 516 | 9, 4 | | | 9, 4 |
| | 4, 9 | | | 4, 9 |
| 517 | 2, 2, 14, 5 | | | 2, 5, 2 |
| | 2, 5, 2 | | | 2, 5, 2 |
| 518 | 7, 4 | | | 7, 4 |
| | 7, 4 | | | 4, 7 |
| 519 | 4, 7, 13 | | | 7, 4, 16 |
| | 7, 4, 13 | | | 4, 7, 16 |
| 520 | 3, 7 | | | 7, 3 |
| | 3, 7 | | | 7, 3 |
| 521 | 6, 3 | | | 6, 3 |
| | 6, 3 | | | 6, 3 |
| 522 | 5, 2, 5 | | | 5, 5, 15, 2 |
| | 2, 5, 5 | | | 5, 2, 5 |
| 523 | 5, 2, 5 | | | 5, 5, 15, 2 |
| | 5, 2, 5 | | | 5, 2, 5 |
| 524 | 2, 5, 13 | | | 5, 2, 16 |
| | 5, 2, 13 | | | 2, 5, 16 |
| 525 | 2, 1 | | | 1, 2 |
| | 2, 1 | | | 2, 1 |
| 526 | 7, 2 | | | 7, 2 |
| | 2, 7 | | | 2, 7 |
| 527 | 5, 4 | | | 5, 4 |
| | 4, 5 | | | 4, 5 |
| 528 | 3, 1, 16, 3 | | | 1, 3, 3 |
| | 3, 3, 1 | | | 3, 1, 3 |
| 529 | 10, 1, 13 | | | 1, 10, 16 |
| | 10, 1, 13 | | | 10, 1, 16 |
| 530 | 8, 2, 5 | | | 8, 5, 2 |
| | 2, 8, 5 | | | 2, 5, 8 |
| 531 | 8, 2, 5 | | | 8, 5, 2 |
| | 2, 8, 5 | | | 2, 5, 8 |
| 532 | 2, 5, 13, 5 | | | 5, 5, 15, 2, 16 |
| | 5, 5, 16, 2, 13 | | | 5, 2, 5, 16 |
| 533 | 2, 5, 13, 5 | | | 5, 5, 15, 2, 16 |
| | 5, 5, 16, 2, 13 | | | 5, 2, 5, 16 |
| 534 | 3, 10, 1, 13 | | | 1, 10, 16, 3 |
| | 3, 10, 1, 13 | | | 10, 1, 16, 3 |
| 535 | 3, 10, 1, 13 | | | 1, 10, 16, 3, 16 |
| | 3, 1, 13, 10, 13 | | | 10, 1, 16, 3 |
| 536 | 3, 10, 1 | | | 10, 1, 3 |
| | 3, 10, 1 | | | 10, 1, 3 |
| 537 | 4, 5, 13, 1 | | | 1, 5, 4, 16 |
| | 5, 4, 13, 1 | | | 4, 1, 5, 16 |
| 538 | 3, 5, 13, 3, 1, 13 | | | 1, 5, 15, 3, 16, 3, 16 |
| | 5, 3, 3, 13, 1, 13 | | | 3, 1, 16, 3, 5, 16 |
| 539 | 10, 4, 5, 13 | | | 5, 10, 15, 4, 16 |
| | 10, 5, 16, 4, 13 | | | 4, 5, 16, 10 |
| 540 | 1, 10, 16, 3 | | | 10, 1, 15, 3 |
| | 1, 3, 16, 10 | | | 3, 10, 1, 15 |
| 541 | 4, 5, 13, 1, 16 | | | 5, 4, 16, 1, 13 |
| | 5, 1, 16, 4, 13 | | | 1, 4, 14, 5, 16 |
| 542 | 4, 3, 16, 1, 14 | | | 1, 4, 13, 3, 13 |
| | 3, 4, 14, 1, 14 | | | 3, 4, 14, 1, 14 |

FIG. 13 is a diagram of the second 42 radicals of unified ideographs. The resolving of these characters is summarized in the following Table 16. In Table 16 the first numeral is the reference number from FIG. 13 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 16

CJKV unified ideographs

| No. 9. | Top | Left | Bottom | Right |
|---|---|---|---|---|
| 543 | 4, 5, 13, 6 | | | 6, 5, 4, 16 |
| | 5, 4, 13, 6, 14 | | | 4, 6, 14, 5, 16 |
| 544 | 8, 4, 5 | | | 8, 5, 4 |
| | 4, 8, 5 | | | 4, 5, 8 |
| 545 | 2, 2, 14, 2, 14, 5, 13 | | | 2, 5, 2, 16, 2 |
| | 2, 5, 2, 13, 2 | | | 2, 2, 15, 5, 16, 2 |
| 546 | 2, 2, 14, 2, 14, 5 | | | 2, 5, 2, 2 |
| | 2, 5, 2, 2 | | | 2, 5, 2, 2 |
| 547 | 3, 3, 14, 3, 14, 1, 1, 1 | | | 1, 3, 1, 13, 3, 1, 13, 3 |
| | 3, 1, 3, 14, 1, 3, 14, 1 | | | 1, 1, 14, 1, 14, 3, 3, 3 |
| 548 | 5, 2, 5 | | | 5, 5, 15, 2 |
| | 5, 5, 16, 2 | | | 5, 2, 5 |
| 549 | 8, 5, 6 | | | 6, 8, 15, 5 |
| | 8, 6, 16, 5 | | | 6, 5, 8 |
| 550 | 2, 7, 13, 2 | | | 7, 2, 16, 2 |
| | 2, 7, 2, 13 | | | 2, 2, 14, 7, 16 |
| 551 | 5, 2, 5, 13 | | | 5, 5, 15, 2, 16 |
| | 5, 5, 16, 2, 13 | | | 2, 5, 16, 5 |
| 552 | 3, 3, 3, 1, 16, 3 | | | 1, 3, 3, 3, 3 |
| | 3, 3, 16, 3, 3, 1 | | | 3, 1, 3, 3, 3 |
| 553 | 1, 5, 16, 4 | | | 5, 1, 15, 4 |
| | 1, 4, 16, 5 | | | 4, 5, 1, 15 |
| 554 | 10, 10, 1, 13 | | | 1, 10, 16, 10 |
| | 10, 10, 1 | | | 10, 1, 16, 10 |
| 555 | 4, 2, 14, 5, 13 | | | 5, 2, 16, 4, 16 |
| | 5, 4, 13, 2, 13 | | | 4, 2, 14, 5, 16 |
| 556 | 6, 1, 14, 3, 13 | | | 6, 1, 15, 3, 16 |
| | 3, 6, 13, 1, 14 | | | 6, 3, 16, 1, 15 |
| 557 | 8, 5, 3, 7 | | | 7, 8, 15, 5, 3 |
| | 8, 3, 16, 7, 5 | | | 7, 3, 5, 8 |
| 558 | 8, 5, 5 | | | 5, 8, 5 |
| | 8, 5, 5 | | | 5, 8, 5 |
| 559 | 3, 3, 16, 3, 16 | | | 3, 3, 15, 3, 15 |
| | 3, 3, 16, 3, 16 | | | 3, 3, 15, 3, 15 |
| 560 | 3, 3, 16, 2 | | | 3, 3, 15, 2 |
| | 3, 3, 16, 2 | | | 2, 3, 3, 15 |
| 561 | 1, 6, 16, 3, 16, 1, 14 | | | 1, 6, 13, 1, 15, 3, 13 |
| | 3, 1, 14, 6, 16, 1, 14 | | | 3, 6, 14, 3, 14, 1, 15 |
| 562 | 6, 1, 14, 3, 13, 3, 13 | | | 6, 1, 15, 3, 16, 3, 16 |
| | 3, 3, 16, 6, 13, 1, 14 | | | 3, 6, 16, 3, 16, 1, 15 |
| 563 | 3, 4, 8, 5 | | | 8, 3, 15, 5, 4 |
| | 4, 3, 8, 5 | | | 4, 3, 8, 3 |
| 564 | 3, 4, 5, 13, 5, 13 | | | 5, 5, 15, 5, 15, 4, 16 |
| | 3, 5, 16, 5, 16, 4, 13 | | | 4, 5, 16, 5, 16, 3 |
| 565 | 2, 5, 13, 10, 1, 13 | | | 1, 5, 15, 10, 16, 2, 16 |
| | 5, 10, 16, 1, 13, 2, 13 | | | 10, 1, 16, 2, 5, 16 |
| 566 | 2, 5, 10, 16, 1, 13 | | | 1, 5, 15, 10, 16, 2 |
| | 2, 10, 16, 1, 13, 5 | | | 10, 1, 16, 2, 5 |
| 567 | 1, 5, 16, 1, 16, 3, 13 | | | 1, 5, 15, 1, 15, 3, 16 |
| | 1, 5, 16, 1, 13, 3 | | | 3, 1, 16, 5, 15, 1, 15 |
| 568 | 1, 2, 14, 1, 16, 3, 13 | | | 3, 2, 16, 1, 13, 1, 15 |
| | 1, 1, 16, 3, 16, 2, 13 | | | 2, 3, 16, 1, 15, 1, 15 |
| 569 | 3, 4, 5, 2 | | | 5, 3, 15, 2, 4 |
| | 4, 3, 5, 2 | | | 4, 2, 14, 5, 3 |
| 570 | 1, 5, 16, 4, 7 | | | 7, 5, 15, 1, 15, 4 |
| | 1, 5, 16, 4, 7 | | | 4, 7, 5, 1, 15 |
| 571 | 5, 4, 5, 13, 6, 16 | | | 6, 5, 5, 15, 4, 16 |
| | 5, 5, 4, 13, 6, 14 | | | 4, 6, 14, 5, 16, 5 |
| 572 | 8, 2, 5, 5 | | | 8, 5, 5, 2 |
| | 2, 8, 5, 5 | | | 2, 5, 8, 5 |
| 573 | 8, 2, 5, 5 | | | 8, 5, 5, 13, 2 |
| | 2, 8, 5, 5 | | | 2, 5, 8, 5 |
| 574 | 7, 4, 5, 5 | | | 7, 5, 5, 4 |
| | 4, 7, 5, 5 | | | 4, 7, 5, 5 |
| 575 | 2, 5, 13, 3, 1 | | | 1, 5, 2, 13, 3 |
| | 5, 3, 2, 13, 1 | | | 3, 2, 1, 5, 16 |
| 576 | 3, 10, 4, 16, 1 | | | 1, 10, 15, 4, 3 |
| | 3, 4, 16, 10, 1 | | | 4, 1, 3, 15, 10 |

TABLE 16-continued

CJKV unified ideographs

| No. 9. | Top | Left | Bottom | Right |
|---|---|---|---|---|
| 577 | 2, 2, 16, 5, 5 | | | 5, 5, 15, 2, 2 |
| | 5, 2, 2, 5 | | | 5, 2, 2, 5 |
| 578 | 5, 3, 10, 1 | | | 10, 5, 15, 1, 3 |
| | 5, 3, 10, 1 | | | 10, 1, 3, 5 |
| 579 | 9, 4, 10, 16, 1 | | | 1, 9, 15, 10, 16, 4 |
| | 4, 10, 16, 9, 1, 13 | | | 10, 1, 16, 4, 15, 9 |
| 580 | 7, 3, 3, 5, 13, 5, 13 | | | 5, 5, 15, 7, 15, 3, 16, 3, 16 |
| | 5, 3, 13, 7, 13, 5, 13, 3, 13, 13 | | | 7, 3, 5, 16, 3, 5, 16 |
| 581 | 2, 6, 14, 5, 3, 3 | | | 6, 3, 3, 13, 5, 2 |
| | 3, 2, 5, 6, 14, 3 | | | 3, 6, 14, 5, 3, 3 |
| 582 | 3, 6, 3, 13, 3, 13 | | | 6, 3, 16, 3, 16, 3 |
| | 3, 3, 16, 3, 16, 6, 13 | | | 6, 3, 16, 3, 16, 3 |
| 583 | 3, 2, 6, 5, 13, 3 | | | 6, 5, 16, 3, 3, 13, 2 |
| | 3, 2, 3, 5, 6, 13 | | | 3, 6, 14, 2, 5, 16, 3 |
| 584 | 3, 5, 5, 16, 9, 16 | | | 9, 5, 15, 5, 15, 3 |
| | 3, 5, 16, 9, 16, 5 | | | 9, 5, 15, 3, 15, 5 |

FIG. 14 is a diagram of the third 42 radicals of unified ideographs. The resolving of these characters is summarized in the following Table 17. In Table 17 the first numeral is the reference number from FIG. 14 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 17

CJKV unified ideographs

| No. 10. | Top | Left | Bottom | Right |
|---|---|---|---|---|
| 585 | 4, 10, 16, 1, 14, 3 | | | 1, 3, 4, 13, 10, 13 |
| | 10, 4, 14, 1, 14, 3, 14 | | | 10, 4, 14, 1, 14, 3 |
| 586 | 4, 3, 16, 1, 14, 3 | | | 1, 3, 15, 4, 3, 13 |
| | 3, 4, 14, 1, 3, 14 | | | 4, 1, 3, 15, 3, 14 |
| 587 | 3, 4, 6, 2, 16 | | | 6, 3, 2, 4 |
| | 4, 3, 2, 14, 6 | | | 4, 2, 14, 6, 14, 3 |
| 588 | 3, 1, 14, 1, 16, 3, 13 | | | 1, 1, 15, 3, 16, 3, 13 |
| | 3, 1, 16, 3, 13, 1, 14 | | | 3, 1, 16, 1, 15, 3, 14 |
| 589 | 1, 3, 13, 1, 16, 3, 13 | | | 1, 1, 15, 3, 16, 3, 16 |
| | 1, 1, 16, 3, 13, 3, 13 | | | 1, 3, 16, 1, 15, 3, 16 |
| 590 | 2, 2, 14, 5, 5, 4 | | | 2, 5, 5, 4, 2 |
| | 5, 2, 16, 4, 5, 2 | | | 4, 2, 14, 5, 2, 5 |
| 591 | 4, 2, 14, 5, 8 | | | 8, 5, 15, 2, 4 |
| | 4, 5, 8, 2 | | | 4, 8, 5, 2 |
| 592 | 5, 4, 3, 16, 5, 13, 3 | | | 5, 5, 15, 4, 16, 3, 3 |
| | 5, 3, 16, 3, 16, 5, 4, 13 | | | 3, 4, 3, 15, 5, 16, 5 |
| 593 | 2, 3, 16, 5, 13, 5, 13 | | | 5, 5, 15, 2, 16, 3 |
| | 3, 5, 16, 5, 2, 13 | | | 2, 5, 16, 3, 15, 5, 16 |
| 594 | 4, 1, 14, 5, 13, 1 | | | 1, 1, 15, 5, 15, 4, 16 |
| | 5, 4, 13, 1, 1, 14 | | | 4, 1, 5, 16, 1, 14 |
| 595 | 1, 5, 16, 3, 16, 3, 3, 1, 16, 3, 3 | | | 1, 5, 15, 1, 15, 3, 3, 3, 3, 3 |
| | 1, 5, 16, 3, 16, 3, 16, 3, 3, 1, 1 | | | 3, 1, 3, 3, 3, 5, 15, 3, 15, 3, 15 |
| 596 | 5, 2, 5, 13, 1, 16, 5 | | | 5, 1, 15, 5, 15, 5, 15, 2, 16 |
| | 5, 5, 16, 5, 16, 2, 13, 1, 14 | | | 5, 2, 1, 15, 5, 16, 5 |
| 597 | 3, 4, 6, 2, 16, 1, 14, 3 | | | 6, 3, 1, 13, 3, 2, 4 |
| | 4, 3, 3, 14, 2, 1, 6 | | | 4, 3, 14, 6, 14, 1, 2, 3 |
| 598 | 5, 3, 9, 1, 16, 3 | | | 9, 5, 15, 3, 13, 1, 15, 3 |
| | 5, 3, 16, 2, 9, 1, 14 | | | 3, 9, 14, 3, 1, 15, 5 |
| 599 | 2, 2, 14, 5, 13, 5, 5 | | | 5, 2, 16, 5, 5, 2, 16 |
| | 5, 2, 13, 5, 5, 2, 13 | | | 2, 5, 2, 5, 5, 16 |
| 600 | 2, 3, 16, 5, 13, 5, 13, 5 | | | 5, 5, 15, 5, 15, 2, 16, 3 |
| | 3, 5, 16, 5, 16, 5, 2, 13 | | | 5, 2, 5, 16, 3, 15, 5, 16 |
| 601 | 7, 4, 2, 5, 13, 5, 13 | | | 7, 5, 5, 2, 16, 4 |
| | 4, 7, 5, 5, 2, 13 | | | 4, 2, 14, 7, 5, 16, 5, 16 |
| 602 | 8, 2, 2, 5, 13, 5, 13 | | | 8, 5, 5, 2, 16, 2 |
| | 2, 8, 5, 5, 2 | | | 2, 5, 8, 2, 5, 16 |
| 603 | 10, 2, 3, 16, 5, 1 | | | 1, 10, 15, 5, 15, 2, 3 |
| | 10, 3, 16, 1, 2, 5 | | | 3, 1, 2, 5, 10 |

TABLE 17-continued

CJKV unified ideographs

| No. 10. | Top | Left | Bottom | Right |
|---|---|---|---|---|
| 604 | 1, 5, 16, 4, 1, 16, 3, 16 | | | 5, 1, 15, 4, 3, 13, 1, 15 |
| | 1, 3, 16, 1, 14, 4, 16, 5 | | | 4, 3, 15, 1, 15, 5, 1, 15 |
| 605 | 10, 1, 14, 3, 1, 3 | | | 1, 3, 3, 10, 1 |
| | 10, 1, 1, 14, 3, 3 | | | 10, 1, 14, 1, 3, 3 |
| 606 | 3, 8, 16, 2, 5, 5 | | | 8, 3, 15, 5, 5, 2 |
| | 3, 2, 16, 8, 5, 5 | | | 2, 5, 8, 5, 3, 15 |
| 607 | 2, 10, 13, 4, 10, 1, 13 | | | 1, 10, 15, 10, 16, 2, 16, 4 |
| | 4, 10, 10, 14, 1, 13, 2, 13 | | | 4, 10, 14, 1, 16, 2, 10, 16 |
| 608 | 8, 2, 2, 2, 5 | | | 5, 8, 2, 2, 2 |
| | 5, 2, 8, 2, 2 | | | 5, 2, 2, 2, 8 |
| 609 | 8, 2, 5, 5, 5 | | | 8, 5, 5, 5, 2 |
| | 2, 8, 5, 5, 5 | | | 2, 5, 8, 5, 5 |
| 610 | 10, 1, 10, 16, 3, 4 | | | 10, 10, 15, 1, 4, 3 |
| | 10, 10, 16, 3, 1, 4 | | | 3, 4, 10, 1, 10 |
| 611 | 3, 5, 4, 5, 13, 1 | | | 1, 5, 5, 15, 4, 16, 3 |
| | 3, 5, 16, 4, 13, 5, 1 | | | 4, 1, 5, 16, 3, 15, 5 |
| 612 | 5, 3, 8, 16, 2, 5 | | | 8, 5, 15, 5, 2, 3 |
| | 5, 3, 2, 8, 5 | | | 2, 5, 8, 3, 15, 5 |
| 613 | 5, 5, 16, 2, 3, 16, 1, 14 | | | 1, 5, 15, 5, 15, 2, 3, 13 |
| | 5, 5, 16, 3, 16, 2, 1, 14 | | | 3, 2, 14, 1, 14, 5, 5, 15 |
| 614 | 3, 7, 13, 2, 1, 16, 3 | | | 7, 1, 13, 3, 3, 16, 2 |
| | 2, 7, 3, 3, 1 | | | 2, 3, 14, 7, 1, 3, 16 |
| 615 | 3, 2, 5, 13, 3, 1 | | | 1, 5, 3, 15, 2, 16, 3 |
| | 3, 5, 16, 3, 2, 13, 1 | | | 3, 2, 1, 5, 16, 3 |
| 616 | 1, 10, 16, 3, 3, 16, 1, 14 | | | 1, 10, 15, 1, 15, 3, 13, 3 |
| | 1, 3, 16, 3, 16, 10, 1, 14 | | | 3, 1, 14, 3, 15, 10, 1, 15 |
| 617 | 1, 5, 16, 1, 16, 3, 14, 5 | | | 5, 5, 15, 1, 15, 3, 1, 13 |
| | 1, 5, 16, 1, 16, 5, 16, 3 | | | 5, 3, 1, 15, 5, 15, 1, 15 |
| 618 | 3, 3, 14, 5, 5, 2, 4 | | | 5, 4, 3, 5, 13, 2, 3 |
| | 3, 5, 2, 3, 14, 4, 16, 5 | | | 2, 4, 14, 3, 15, 3, 15, 5, 5 |
| 619 | 1, 2, 14, 3, 14, 5, 13, 3, 1 | | | 1, 5, 3, 15, 2, 16, 3, 1, 13 |
| | 1, 5, 16, 3, 2, 13, 1, 1, 14 | | | 3, 2, 1, 5, 16, 3, 15, 1, 15 |
| 120 | 3, 3, 3, 1, 16, 3, 4, 3, 16, 1, 14, 3, 16, 1, 14 | | | 1, 1, 15, 3, 3, 3, 3, 4, 13, 3, 13, 4, 13, 3, 13 |
| | 3, 3, 16, 3, 16, 3, 3, 4, 1, 1, 16, 1, 1, 16 | | | 3, 4, 14, 1, 14, 3, 15, 1, 3, 3, 3, 3, 3 |
| 621 | 3, 5, 2, 5, 13, 2, 16, 2, 14, 5, 5 | | | 2, 5, 15, 5, 15, 5, 2, 16, 2, 3, 3 |
| | 3, 5, 16, 2, 16, 5, 5, 2, 13, 2, 2 | | | 2, 5, 2, 2, 5, 16, 3, 15, 5, 5 |
| 622 | 7, 2, 1, 16, 1, 14, 3, 13, 3, 13 | | | 7, 1, 13, 3, 16, 1, 13, 3, 16, 2 |
| | 2, 7, 1, 14, 3, 13, 1, 14, 3, 13 | | | 2, 3, 14, 3, 14, 7, 3, 16, 3, 16 |
| 623 | 1, 3, 14, 5, 16, 2, 5, 13, 5, 13 | | | 5, 3, 15, 5, 15, 5, 15, 2, 16, 1, 13 |
| | 1, 5, 16, 5, 16, 5, 16, 2, 13, 3, 14 | | | 2, 5, 16, 5, 16, 5, 1, 15, 3, 14 |
| 624 | 7, 7, 14, 1, 16, 1, 14, 3, 16, 3, 14 | | | 7, 3, 1, 13, 7, 13, 3, 1, 13 |
| | 7, 1, 16, 3, 16, 7, 14, 1, 16, 3, 16 | | | 3, 3, 14, 7, 7, 1, 15, 1, 15 |
| 625 | 2, 5, 13, 3, 16, 5, 13, 6, 16, 3 | | | 6, 5, 15, 3, 16, 3, 5, 13, 2, 16 |
| | 5, 3, 16, 6, 16, 5, 13, 2, 13, 3 | | | 6, 3, 3, 15, 5, 16, 2, 5, 16 |
| 626 | 5, 3, 7, 16, 2, 2, 2 | | | 7, 5, 15, 3, 13, 2, 2, 2 |
| | 5, 2, 16, 3, 7, 2, 2 | | | 2, 2, 14, 2, 14, 7, 3, 15, 5 |

FIG. 15 is a diagram of the fourth 42 radicals of unified ideographs. The resolving of these characters is summarized in the following Table 18. In Table 18 the first numeral is the reference number from FIG. 15 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 18

CJKV unified ideographs

| No. 11. | Top | Left | Bottom | Right |
|---|---|---|---|---|
| 627 | 2, 3, 13, 5, 13, 5, 13, 3, 1 | | | 1, 5, 5, 15, 3, 15, 2, 16, 1 |
| | 3, 5, 16, 5, 16, 3, 2, 13, 1 | | | 3, 2, 1, 5, 16, 5, 16, 3, 16 |
| 628 | 5, 2, 2, 5, 5, 3, 13 | | | 3, 5, 15, 2, 16, 5, 5, 2 |
| | 5, 3, 16, 2, 5, 5, 2, 13 | | | 2, 5, 16, 2, 5, 5, 5 |
| 629 | 2, 8, 13, 5, 13, 5, 13, 5, 13, 5, 13 | | | 5, 5, 15, 5, 15, 8, 16, 5, 15, 2, 16 |
| | 8, 5, 13, 5, 5, 16, 5, 16, 2, 13 | | | 2, 5, 16, 5, 16, 5, 16, 8, 16, 5, 16 |

TABLE 18-continued

CJKV unified ideographs

| No. | Top | Left | Bottom | Right |
|---|---|---|---|---|
| 630 | 3, 7, 13, 2, 1, 3, 16, 1 | | | 7, 1, 13, 1, 15, 3, 3, 16, 2 |
| | 2, 7, 3, 3, 13, 1, 16, 1 | | | 2, 3, 14, 7, 1, 3, 16, 1 |
| 631 | 5, 2, 2, 8, 5, 2, 5, 5 | | | 5, 8, 15, 5, 15, 5, 2, 2, 2 |
| | 2, 5, 5, 8, 5, 2, 2, 2 | | | 2, 5, 2, 5, 8, 2, 5, 5 |
| 632 | 3, 8, 16, 2, 5, 5, 5 | | | 8, 3, 15, 5, 5, 5, 2 |
| | 3, 2, 16, 8, 5, 5, 5 | | | 2, 5, 8, 5, 5, 3, 15 |
| 633 | 5, 3, 1, 16, 3, 2, 16, 5, 13, 5, 5 | | | 5, 1, 15, 5, 15, 5, 15, 3, 2, 16, 3, 3 |
| | 5, 5, 16, 3, 3, 5, 16, 2, 13, 1, 1 | | | 5, 2, 5, 16, 3, 15, 1, 3, 5, 5 |
| 634 | 3, 8, 14, 2, 5, 5, 5 | | | 8, 5, 5, 5, 3, 13, 2 |
| | 2, 3, 5, 5, 8, 5 | | | 2, 5, 8, 5, 5, 3 |
| 635 | 3, 2, 5, 13, 8, 16, 2, 5 | | | 8, 5, 15, 3, 15, 5, 2, 16, 2 |
| | 3, 2, 16, 5, 16, 8, 5, 2, 13 | | | 2, 5, 8, 2, 15, 5, 16, 3 |
| 636 | 3, 2, 14, 10, 5, 13, 1, 3, 16, 5, 13, 5, 13 | | | 5, 5, 15, 2, 16, 3, 10, 13, 1, 3, 3 |
| | 3, 10, 1, 5, 14, 3, 16, 5, 13, 2, 13, 2, 13 | | | 10, 2, 14, 3, 15, 1, 5, 16, 3, 5, 16, 5, 16 |
| 637 | 3, 7, 16, 4, 1, 16, 5, 13, 1, 16 | | | 5, 3, 15, 7, 16, 1, 13, 1, 15, 4, 16 |
| | 3, 5, 16, 4, 13, 7, 1, 14, 1, 16 | | | 4, 1, 14, 7, 5, 16, 1, 15, 3, 15 |
| 638 | 8, 2, 5, 5, 1, 16, 3, 3, 3 | | | 1, 8, 15, 3, 5, 5, 3, 13, 2, 2 |
| | 3, 2, 8, 5, 5, 1, 14, 3, 3 | | | 3, 1, 14, 2, 3, 5, 8, 5, 5 |
| 639 | 3, 2, 10, 8, 16, 6, 2, 5 | | | 6, 8, 15, 10, 15, 5, 2, 3 |
| | 3, 6, 16, 8, 5, 10, 2 | | | 6, 5, 8, 2, 3, 15, 10 |
| 640 | 4, 2, 14, 2, 16, 2, 14, 2, 14, 2, 14, 5, 13, 5, 13, 5, 13 | | | 2, 5, 2, 16, 2, 2, 13, 5, 4, 16, 2, 4, 16, 2 |
| | 2, 4, 16, 5, 13, 2, 2, 14, 5, 2, 13, 2, 2, 13, 2 | | | 4, 2, 14, 2, 15, 2, 15, 2, 14, 2, 15, 5, 16, 5, 16, 5, 16, 5, 16 |
| 641 | 2, 5, 10, 16, 4, 6, 16, 3, 13 | | | 6, 10, 15, 5, 15, 3, 16, 2, 4 |
| | 2, 4, 16, 10, 3, 14, 6, 13, 5 | | | 4, 6, 14, 3, 16, 10, 2, 5 |
| 642 | 2, 8, 13, 2, 5, 13, 1, 16, 3 | | | 1, 8, 15, 5, 3, 2, 16, 2 |
| | 2, 3, 16, 8, 5, 2, 13, 1 | | | 3, 1, 2, 2, 15, 5, 16, 8, 16 |
| 643 | 3, 8, 16, 2, 2, 2, 5 | | | 5, 3, 15, 8, 2, 2, 2 |
| | 3, 5, 16, 2, 8, 2, 2 | | | 5, 2, 2, 2, 8, 3, 15 |
| 644 | 3, 5, 14, 3, 16, 5, 14, 2, 4 | | | 5, 5, 15, 4, 3, 13, 3, 15, 2 |
| | 3, 3, 16, 2, 5, 14, 5, 16, 4 | | | 2, 4, 14, 3, 5, 3, 15, 5, 14 |
| 645 | 1, 5, 16, 3, 16, 1, 14, 3, 2, 3, 3 | | | 1, 5, 15, 3, 15, 3, 3, 13, 3, 15, 2, 2 |
| | 1, 5, 16, 3, 3, 16, 2, 1, 14, 3, 3 | | | 3, 1, 14, 2, 3, 3, 5, 15, 1, 15, 1, 15 |
| 646 | 5, 2, 2, 8, 13, 2, 5 | | | 8, 5, 15, 2, 16, 5, 2, 16, 2 |
| | 5, 2, 16, 8, 2, 13, 5, 2, 13 | | | 2, 2, 14, 8, 16, 5, 2, 16, 5 |
| 647 | 8, 2, 5, 5, 5, 4, 16, 6, 14, 6, 14 | | | 6, 8, 15, 5, 5, 4, 13, 2, 2 |
| | 2, 4, 16, 8, 5, 5, 5, 6, 14, 6, 14 | | | 4, 6, 14, 2, 15, 5, 8, 5, 5, 5 |
| 648 | 3, 10, 7, 16, 4, 2, 5, 13, 5, 5 | | | 7, 10, 15, 5, 5, 2, 16, 4, 3, 3 |
| | 3, 4, 16, 7, 10, 5, 5, 2, 13, 2, 13 | | | 4, 7, 5, 2, 5, 16, 3, 15, 10, 10 |
| 649 | 1, 5, 16, 5, 16, 5, 16, 8, 16, 2, 5, 5 | | | 8, 5, 15, 5, 15, 5, 15, 1, 15, 5, 2, 2 |
| | 1, 5, 16, 5, 16, 5, 16, 2, 16, 8, 5, 5 | | | 2, 5, 8, 5, 65, 5, 65, 5, 65, 1, 65, 1, 65 |
| 650 | 3, 1, 14, 3, 16, 1, 8, 16, 2, 5, 5 | | | 8, 3, 15, 3, 15, 5, 3, 2, 3, 13, 3, 13 |
| | 3, 3, 16, 2, 16, 8, 5, 1, 1, 14, 1, 14 | | | 2, 5, 8, 3, 15, 1, 3, 15, 1, 14, 1, 14 |
| 651 | 5, 8, 16, 2, 5, 1, 16, 3, 14, 5, 5 | | | 5, 8, 15, 5, 15, 3, 5, 1, 13, 2, 2 |
| | 5, 2, 16, 1, 16, 5, 16, 8, 5, 3, 3 | | | 5, 3, 1, 15, 2, 15, 5, 8, 5, 15, 5, 15 |
| 652 | 5, 3, 4, 1, 16, 3, 3, 3, 3 | | | 1, 5, 15, 3, 4, 13, 3, 3, 3, 3 |
| | 5, 3, 3, 16, 3, 16, 4, 1, 14, 3, 3 | | | 3, 1, 14, 4, 3, 3, 3, 5, 5 |
| 653 | 3, 1, 16, 1, 14, 3, 16, 4, 16, 3, 3, 3 | | | 4, 3, 15, 3, 15, 1, 13, 3, 3, 1, 13, 1, 13 |
| | 3, 3, 16, 3, 16, 3, 16, 1, 14, 4, 1, 14, 1, 14 | | | 3, 4, 3, 3, 1, 15, 1, 14, 3, 15, 3, 15 |
| 654 | 8, 2, 5, 5, 5, 3, 16, 1, 14, 1, 14 | | | 1, 8, 15, 5, 5, 5, 3, 2, 13, 2, 13 |
| | 2, 3, 16, 8, 5, 5, 5, 1, 14, 1, 14 | | | 3, 1, 14, 2, 15, 5, 8, 5, 5, 5 |
| 655 | 2, 5, 13, 5, 4, 6, 3, 16, 1, 14, 1, 14 | | | 1, 5, 15, 5, 15, 4, 2, 16, 4, 3, 13, 3, 13 |
| | 5, 3, 16, 5, 16, 4, 14, 2, 13, 4, 1, 14, 1, 14 | | | 4, 4, 14, 3, 15, 1, 14, 5, 2, 5, 16, 5, 16 |
| 656 | 2, 5, 13, 5, 2, 16, 3, 16, 5, 1, 1 | | | 1, 5, 15, 5, 15, 5, 15, 2, 16, 2, 16, 3,3 |
| | 5, 3, 16, 5, 16, 1, 2, 13, 2, 5, 5 | | | 3, 1, 2, 5, 5, 15, 2, 5, 16, 5, 16 |
| 657 | 8, 2, 5, 2, 16, 3, 16, 5, 1, 1 | | | 1, 8, 15, 5, 15, 5, 2, 3, 2, 2 |
| | 2, 3, 16, 8, 5, 1, 2, 5, 5 | | | 3, 1, 2, 5, 2, 15, 5, 8, 8 |
| 658 | 3, 7, 16, 2, 5, 5, 3, 3, 13, 3, 13 | | | 3, 15, 7, 16, 3, 5, 5, 2, 2 |
| | 3, 3, 16, 3, 2, 7, 13, 5, 5, 5 | | | 3, 7, 16, 3, 2, 5, 5, 3, 15, 3, 15 |
| 659 | 2, 5, 13, 8, 13, 2, 5, 13, 5, 13, 5, 13, 5, 13 | | | 5, 8, 15, 5, 15, 5, 5, 2, 16, 2, 2 |
| | 5, 2, 16, 5, 16, 8, 5, 5, 2, 13, 2, 13 | | | 2, 5, 16, 2, 15, 5, 16, 8, 16, 5, 16, 5, 16, 5, 16 |
| 660 | 1, 5, 16, 1, 16, 3, 14, 5, 16, 2, 5, 13, 5, 13 | | | 5, 5, 15, 3, 15, 5, 15, 1, 15, 2, 16, 1, 13, 1, 13 |
| | 1, 5, 16, 1, 16, 5, 16, 5, 16, 2, 13, 3, 3 | | | 2, 5, 16, 5, 1, 15, 3, 14, 5, 15, 1, 15, 1, 15 |

TABLE 18-continued

CJKV unified ideographs

| No. 11. | Top | Left | Bottom | Right |
|---|---|---|---|---|
| 661 | 5, 4, 5, 16, 5, 16, 2, 1, 14, 3, 3, 3, 3 | | | 1, 5, 15, 5, 15, 5, 15, 3, 3, 13, 2, 4, 2, 4 |
| | 4, 5, 5, 14, 5, 16, 3, 16, 2, 1, 14, 3, 1, 14, 3 | | | 4, 3, 14, 1, 14, 2, 3, 5, 15, 5, 15, 5, 5, 15, 5 |
| 662 | 3, 3, 16, 3, 16, 2, 16, 3, 16, 5, 1, 1 | | | 1, 3, 15, 5, 15, 3, 15, 3, 15, 2, 3, 3 |
| | 3, 3, 16, 3, 16, 3, 16, 1, 2, 5, 5 | | | 3, 1, 2, 5, 3, 15, 3, 15, 3, 15, 3, 15 |
| 663 | 8, 2, 5, 8, 16, 6, 2, 5, 5 | | | 6, 8, 15, 8, 5, 5, 2, 2, 2 |
| | 2, 6, 16, 8, 8, 5, 5, 2, 2 | | | 6, 5, 8, 2, 2, 15, 5, 8, 8 |
| 664 | 5, 4, 6, 8, 13, 2, 5, 5, 5 | | | 8, 5, 15, 5, 5, 6, 16, 4, 16, 2, 2 |
| | 5, 2, 16, 8, 5, 5, 4, 13, 6, 13, 6, 13 | | | 2, 5, 8, 5, 4, 16, 6, 16, 5, 5 |
| 665 | 3, 2, 1, 16, 3, 14, 5, 13, 3, 1, 1 | | | 1, 5, 3, 15, 3, 15, 2, 16, 3, 1, 13, 1, 13 |
| | 3, 1, 16, 5, 16, 3, 2, 13, 1, 3, 14, 3, 14 | | | 3, 2, 1, 5, 16, 1, 15, 3, 15, 3, 3 |
| 666 | 8, 2, 2, 5, 13, 5, 13, 5, 13, 5, 5 | | | 5, 5, 15, 8, 15, 5, 5, 2, 16, 2, 2 |
| | 2, 5, 16, 5, 16, 8, 5, 5, 2, 13, 2, 13 | | | 5, 2, 5, 16, 2, 15, 5, 16, 8, 5, 16, 5, 16 |
| 667 | 3, 1, 5, 16, 2, 5, 13, 1, 16, 3, 14, 5, 3, 14, 5 | | | 5, 3, 15, 3, 15, 5, 15, 5, 15, 2, 16, 1, 13, 3, 1, 13, 3 |
| | 3, 5, 16, 5, 16, 1, 16, 5, 16, 2, 13, 1, 3, 14, 1, 3, 14 | | | 5, 2, 1, 15, 3, 15, 5, 16, 5, 3, 15, 1, 3, 15, 1 |
| 668 | 5, 2, 5, 5, 5, 2, 1, 16, 3, 3, 1, 16, 3, 3 | | | 1, 5, 15, 3, 5, 15, 5, 15, 5, 15, 3, 13, 2, 2, 3, 13, 2, 2 |
| | 5, 3, 16, 2, 2, 5, 5, 5, 1, 14, 3, 5, 1, 14, 3 | | | 3, 1, 14, 2, 3, 5, 2, 5, 5, 5, 5, 5 |

FIG. 16 is a diagram of the fifth 42 radicals of unified ideographs. The resolving of these characters is summarized in the following Table 19. In Table 19 the first numeral is the reference number from FIG. 16 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 19

CJKV unified ideographs

| No. 12. | Top | Left | Bottom | Right |
|---|---|---|---|---|
| 669 | 8, 7, 14, 2, 2, 5, 5, 5, 5, 5, 5 | | | 7, 5, 5, 2, 8, 13, 5, 5, 2, 5, 2 |
| | 2, 8, 5, 5, 2, 14, 7, 5, 5, 5, 5 | | | 2, 7, 14, 5, 2, 5, 8, 5, 5, 5, 5 |
| 670 | 3, 8, 16, 2, 5, 8, 5, 2, 16, 5, 13, 2, 16, 5, 13 | | | 5, 8, 15, 3, 15, 8, 15, 5, 5, 5, 2, 16, 2, 2, 16, 2 |
| | 3, 2, 16, 5, 16, 8, 5, 8, 5, 2, 13, 5, 2, 13 | | | 2, 5, 16, 2, 15, 5, 8, 5, 8, 3, 15, 8, 3, 15 |
| 671 | 4, 8, 13, 5, 13, 5, 13, 1, 16, 1, 14, 3, 3, 16, 3, 3, 16 | | | 1, 5, 15, 3, 8, 16, 5, 16, 4, 16, 3, 13, 1, 15, 3, 13, 1, 15 |
| | 8, 1, 16, 3, 16, 5, 13, 5, 4, 13, 1, 14, 3, 1, 14, 3 | | | 3, 4, 14, 1, 14, 1, 15, 3, 5, 16, 8, 16, 5, 16, 8, 16, 5, 16 |
| 672 | 3, 1, 14, 5, 2, 2, 5, 13, 5, 13, 5, 5, 13, 5 | | | 5, 5, 15, 5, 15, 5, 15, 1, 15, 2, 16, 2, 3, 2, 3 |
| | 3, 2, 5, 5, 5, 5, 1, 14, 2, 13, 1, 14, 2, 13 | | | 2, 5, 2, 5, 16, 5, 16, 3, 5, 1, 15, 5, 1, 15 |
| 673 | 5, 2, 7, 13, 2, 1, 16, 1, 14, 1, 16, 1, 14, 1, 16, 1, 14 | | | 7, 5, 15, 1, 13, 1, 15, 2, 16, 1, 13, 1, 15, 2, 1, 15, 2 |
| | 5, 2, 16, 7, 1, 14, 1, 16, 2, 13, 1, 14, 1, 16, 1, 14, 1, 16 | | | 2, 1, 14, 2, 14, 1, 14, 7, 13, 1, 15, 1, 15, 5, 1, 15, 5 |
| 674 | 2, 5, 13, 5, 13, 5, 7, 16, 2, 2, 5, 2, 5 | | | 7, 5, 15, 5, 15, 5, 15, 5, 2, 2, 16, 2, 2, 16, 2 |
| | 5, 2, 16, 5, 16, 5, 16, 7, 5, 2, 13, 2, 2, 13, 2 | | | 2, 7, 5, 2, 5, 15, 2, 5, 16, 5, 16, 5, 16, 5, 16 |
| 675 | 2, 2, 14, 5, 5, 5, 5, 5, 5, 5, 5 | | | 5, 5, 15, 5, 15, 2, 15, 2, 5, 13, 5, 5, 5, 5 |
| | 5, 5, 16, 5, 16, 2, 2, 14, 5, 5, 5, 5 | | | 2, 2, 14, 5, 5, 5, 5, 5, 5, 5 |
| 676 | 5, 3, 8, 16, 2, 2, 2, 5, 5, 5, 5, 5, 5 | | | 8, 5, 15, 3, 15, 5, 2, 5, 5, 2, 2, 5, 2,2 |
| | 5, 2, 16, 3, 8, 5, 2, 5, 5, 2, 5, 5, 2 | | | 2, 5, 8, 2, 2, 5, 5, 3, 15, 5, 5, 5, 3, 15,5 |

TABLE 19-continued

CJKV unified ideographs

| No. 12. | Top | Left | Bottom | Right |
|---|---|---|---|---|
| 677 | 2, 2, 14, 5, 13, 5, 2, 16, 8, 13, 2, 5, 13, 5, 13, 2, 5, 13, 5, 13 | | | 5, 8, 15, 5, 15, 5, 15, 2, 16, 5, 2, 16, 2, 16, 2, 2, 16, 2, 16, 2 |
| | 5, 2, 16, 5, 16, 2, 13, 8, 5, 5, 2, 13, 2, 13, 5, 2, 13, 2, 13 | | | 2, 5, 16, 2, 15, 5, 16, 8, 16, 2, 15, 5, 2, 5, 16, 5, 2, 5, 16 |
| 678 | 3, 8, 13, 5, 8, 16, 2, 5, 2, 16, 5, 13, 3, 16, 5, 13, 2, 16, 5, 13, 3, 16, 5, 13 | | | 5, 8, 15, 5, 15, 5, 15, 5, 8, 2, 16, 3, 2, 16, 3, 2, 16, 3, 2, 16, 3 |
| | 8, 2, 16, 5, 16, 3, 16, 5, 8, 5, 5, 3, 13, 2, 13, 5, 5, 3, 13, 2, 13 | | | 2, 3, 15, 5, 16, 5, 16, 2, 15, 5, 8, 5, 15, 3, 8, 16, 8, 5, 15, 3, 8, 16 |
| 679 | 2, 2, 14, 5, 5, 5, 5, 5, 5, 5, 5, 5, 5 | | | 5, 5, 15, 5, 15, 5, 15, 2, 2, 5, 5, 5, 5, 5 |
| | 5, 5, 16, 5, 16, 5, 16, 2, 2, 14, 5, 5, 5, 5, 5, 5 | | | 5, 2, 2, 5, 5, 5, 5, 5, 5, 5, 5 |
| 680 | 1, 5, 16, 1, 16, 3, 14, 5, 8, 16, 2, 5, 5, 2, 5, 5 | | | 8, 5, 15, 1, 15, 5, 15, 3, 13, 5, 15, 5, 1, 13, 2, 5, 1, 13, 2 |
| | 1, 2, 16, 5, 16, 1, 16, 5, 16, 8, 5, 5, 3, 5, 5, 3 | | | 2, 5, 8, 5, 5, 15, 1, 15, 3, 14, 5, 15, 1, 15, 3, 14, 5, 15, 1, 15 |
| 681 | 5, 3, 8, 16, 2, 5, 5, 5, 3, 16, 1, 14, 5, 3, 16, 1, 14 | | | 1, 8, 15, 5, 15, 3, 13, 5, 5, 5, 3, 13, 2, 5, 3, 13, 2 |
| | 5, 2, 16, 3, 16, 3, 8, 5, 5, 5, 1, 14, 5, 5, 1, 14 | | | 3, 1, 14, 2, 15, 5, 8, 5, 5, 3, 15, 5, 5, 3, 15, 5 |
| 682 | 9, 4, 3, 16, 2, 8, 13, 2, 5, 13, 1, 16, 3, 5, 13, 1, 16, 3 | | | 9, 1, 13, 8, 15, 3, 15, 3, 5, 2, 16, 2, 4, 2, 16, 2, 4 |
| | 4, 9, 3, 14, 2, 16, 3, 16, 8, 5, 2, 13, 1, 5, 2, 13, 1 | | | 4, 3, 14, 9, 1, 2, 2, 15, 5, 16, 8, 16, 3, 5, 16, 8, 16, 3 |
| 683 | 9, 3, 14, 1, 16, 3, 16, 2, 14, 4, 9, 13, 3, 14, 1, 16, 9, 13, 3, 14, 1, 16 | | | 9, 9, 15, 1, 15, 1, 15, 3, 15, 3, 15, 2, 16, 3, 13, 4, 16, 2, 16, 3, 13, 4, 16 |
| | 9, 3, 16, 9, 16, 4, 13, 2, 13, 1, 14, 3, 16, 1, 16, 3, 16, 3, 16, 1, 16, 3, 16 | | | 4, 2, 14, 9, 16, 1, 15, 3, 15, 3, 9, 15, 1, 15, 3, 15, 9, 15, 1, 15, 3, 15 |
| 684 | 3, 1, 1, 16, 8, 16, 2, 5, 5, 1, 16, 3, 5, 1, 16, 3, 3 | | | 1, 8, 15, 1, 15, 1, 15, 3, 5, 5, 3, 13, 2, 3, 5, 3, 13, 2, 3 |
| | 3, 1, 16, 3, 16, 2, 8, 5, 5, 5, 1, 16, 3, 5, 5, 1, 16, 3 | | | 3, 1, 14, 2, 3, 5, 8, 5, 1, 15, 3, 15, 1, 5, 1, 15, 3, 15, 1 |
| 685 | 1, 3, 14, 5, 3, 8, 16, 2, 5, 5, 5, 5, 5, 5 | | | 8, 5, 15, 3, 15, 3, 13, 5, 5, 5, 1, 13, 2, 5, 1, 13, 2 |
| | 1, 5, 16, 2, 16, 3, 14, 8, 5, 5, 5, 3, 14, 5, 5, 3, 14 | | | 2, 5, 8, 5, 5, 3, 15, 5, 15, 1, 15, 3, 14, 5, 15, 1, 15, 3, 14 |
| 686 | 3, 2, 5, 13, 3, 1, 8, 16, 2, 5, 5, 2, 5, 5 | | | 8, 1, 15, 5, 15, 3, 15, 5, 5, 2, 16, 3, 2, 2, 16, 3, 2 |
| | 3, 2, 16, 5, 16, 3, 8, 5, 13, 2, 13, 5, 1, 2, 13, 5, 1 | | | 2, 5, 8, 5, 3, 15, 2, 1, 5, 16, 3, 1, 5, 16, 3 |
| 687 | 5, 2, 2, 5, 13, 5, 13, 7, 3, 16, 1, 14, 1, 14, 1, 14, 3, 16, 1, 14, 1, 14 | | | 7, 5, 15, 5, 15, 5, 15, 1, 13, 1, 13, 2, 16, 1, 13, 3, 13 |
| | 2, 3, 16, 5, 7, 5, 5, 1, 14, 1, 14, 2, 13, 1, 14, 1, 14, 1, 14, 2, 13, 1 | | | 2, 2, 16, 1, 13, 3, 13, 2 |
| | 1, 14, 2, 13, 1, 14 | | | 3, 1, 14, 1, 14, 1, 14, 7, 14, 2, 2, 5, 16, 5, 16, 5, 2, 5, 16, 5, 16, 5 |
| 688 | 8, 2, 5, 2, 10, 3, 7, 16, 2, 5, 5, 7, 16, 2, 5, 5 | | | 7, 10, 15, 8, 5, 5, 5, 2, 2, 2, 3, 2, 2, 2, 3 |
| | 3, 2, 16, 2, 10, 8, 7, 5, 5, 2, 5, 5, 5, 2, 5 | | | 2, 8, 5, 5, 3, 15, 10, 2, 2, 8, 5, 2, 2, 8, 5 |
| 689 | 1, 5, 16, 8, 16, 2, 5, 7, 16, 2, 8, 16, 2, 5, 2, 8, 16, 2, 5 | | | 7, 8, 15, 5, 15, 1, 15, 5, 8, 13, 5, 2, 2, 2, 5, 2, 2, 2 |
| | 1, 5, 16, 2, 16, 2, 16, 8, 5, 7, 2, 16, 8, 5, 7, 2, 16, 8, 5 | | | 2, 2, 14, 7, 5, 8, 2, 15, 5, 8, 5, 15, 1, 15, 5, 8, 5, 15, 1, 15 |
| 690 | 5, 3, 14, 2, 5, 5, 5, 3, 16, 3, 14, 3, 16, 1, 14, 3, 3, 16 | | | 3, 3, 15, 3, 15, 1, 13, 5, 15, 5, 15, 5, 15, 5, 15, 3, 3 |
| | 3, 14, 3, 16, 1, 14, 3 | | | 2, 5, 15, 5, 15, 3, 3, 2 |
| | 5, 3, 16, 3, 2, 5, 5, 5, 1, 3, 14, 3, 16, 3, 16, 5, 1, 3, 14, 3, 16, 3, 16, 5, 1, 3, 14, 3, 16 | | | 3, 3, 14, 1, 3, 3, 15, 5, 2, 5, 5, 3, 15, 5, 2, 5, 5, 3, 15 |
| 691 | 2, 5, 14, 5, 5, 14, 4, 14, 2, 2, 5, 13, 5, 13, 5, 5, 5, 13 | | | 4, 5, 13, 5, 5, 5, 15, 2, 16, 5, 13, 5, 15, 5, 15, 2, 16 |
| | 5, 13, 5, 5 | | | 2, 13, 5, 15, 5, 15, 2, 16, 2, 13 |

TABLE 19-continued

CJKV unified ideographs

| No. | Top | Left | Bottom | Right |
|---|---|---|---|---|
| 12. | | | | |
| | 2, 5, 14, 5, 16, 5, 16, 2, 13, 5, 14, 5, 16, 5, 16, 2, 13, | | | 2, 4, 14, 5, 15, 5, 14, 2, 2, 5, 16, 5, 16, 5, 5, 5, 16, |
| | 4, 14, 5, 16, 5, 16, 2, 13, 4, 14 | | | 5, 16, 5, 5 |
| 692 | 2, 1, 14, 1, 14, 3, 13, 2, 14, 1, 16, 1, 14, 1, 16, 5, 6, | | | 6, 2, 15, 3, 5, 1, 13, 1, 13, 3, 16, 1, 13, 1, 13, 1, 13, |
| | 16, 3, 1, 14, 1, 16, 5, 6, 16, 3 | | | 2, 3, 16, 1, 13, 1, 13, 1, 13, 2 |
| | 2, 6, 16, 5, 3, 1, 14, 1, 16, 3, 13, 1, 14, 1, 16, 1, 14, | | | 6, 3, 2, 15, 5, 2, 1, 15, 1, 15, 3, 16, 1, 15, 1, 15, 1, |
| | 2, 3, 13, 1, 14, 1, 16, 1, 14, 2 | | | 15, 1, 15, 3, 16, 1, 15, 1, 15, 1, 15 |
| 693 | 5, 8, 16, 2, 5, 7, 16, 2, 1, 16, 3, 14, 5, 2, 1, 16, 3, | | | 7, 8, 15, 5, 15, 5, 5, 13, 3, 15, 2, 1, 13, 2, 2, 2, 1, 13, |
| | 14, 5, 2 | | | 2, 2 |
| | 5, 2, 16, 2, 16, 8, 5, 7, 1, 14, 5, 16, 2, 3, 1, 14, 5, | | | 2, 2, 14, 7, 5, 1, 15, 3, 14, 2, 15, 5, 8, 5, 15, 2, 15, 5, |
| | 16, 2, 3 | | | 8, 5, 15 |
| 694 | 3, 8, 16, 2, 2, 5, 13, 5, 3, 16, 6, 14, 3, 14, 1, 14, 3, | | | 6, 1, 15, 8, 15, 3, 15, 3, 5, 5, 3, 13, 2, 16, 3, 13, 2, 5, |
| | 3, 16, 6, 14, 3, 14, 1, 14, 3 | | | 3, 13, 2, 16, 3, 13, 2 |
| | 3, 2, 16, 4, 16, 8, 5, 5, 2, 13, 6, 16, 3, 14, 3, 1, 2, | | | 3, 6, 14, 3, 15, 1, 3, 2, 15, 5, 8, 2, 5, 16, 3, 16, 5, 8, |
| | 13, 6, 16, 3, 14, 3, 1 | | | 2, 5, 16, 3, 16 |
| 695 | 3, 10, 8, 16, 2, 2, 5, 13, 5, 3, 16, 1, 14, 1, 14, 1, | | | 1, 8, 15, 10, 15, 5, 5, 1, 13, 2, 16, 1, 13, 3, 13, 2, 3, |
| | 14, 5, 3, 16, 1, 14, 1, 14, 1, 14 | | | 2, 16, 1, 13, 3, 13, 2, 3 |
| | 3, 2, 16, 3, 16, 8, 5, 5, 10, 1, 14, 2, 13, 1, 14, 1, | | | 3, 1, 14, 1, 14, 1, 14, 2, 15, 5, 8, 2, 5, 16, 3, 15, 10, |
| | 14, 10, 1, 14, 2, 13, 1, 14, 1, 14 | | | 8, 2, 5, 16, 3, 15, 10 |
| 696 | 3, 8, 16, 2, 5, 5, 5, 7, 3, 16, 1, 14, 1, 14, 1, 14, 7, 3, | | | 7, 1, 15, 5, 15, 5, 8, 15, 5, 5, 1, 13, 1, 13, 1, 13, 3, 13, |
| | 16, 1, 14, 1, 14, 1, 14 | | | 2, 1, 13, 1, 13, 1, 13, 3, 13, 2 |
| | 3, 2, 16, 3, 16, 8, 5, 5, 5, 7, 1, 14, 1, 14, 1, 14, 5, 7, | | | 3, 1, 14, 1, 14, 1, 14, 7, 14, 2, 5, 5, 8, 5, 3, 15, 5, 5, |
| | 1, 14, 1, 14, 1, 14 | | | 8, 5, 3, 15 |
| 697 | 2, 5, 8, 16, 2, 1, 16, 1, 14, 3, 13, 1, 16, 1, 14, 1, 16, | | | 8, 5, 15, 5, 1, 13, 1, 13, 3, 16, 1, 13, 1, 13, 1, 13, 2, |
| | 5, 3, 13, 1, 16, 1, 14, 1, 16, 5 | | | 2, 1, 13, 1, 13, 1, 13, 2, 2 |
| | 2, 2, 16, 8, 5, 1, 14, 1, 16, 3, 13, 1, 14, 1, 16, 5, 1, | | | 2, 5, 8, 1, 15, 1, 15, 3, 16, 1, 15, 1, 15, 1, 15, 2, 5, 1, |
| | 14, 3, 13, 1, 14, 1, 16, 5, 1, 14 | | | 15, 1, 15, 1, 15, 2, 5 |
| 698 | 1, 5, 16, 4, 2, 16, 2, 14, 8, 13, 5, 2, 16, 6, 14, 5, 3, | | | 6, 8, 15, 1, 15, 3, 5, 5, 2, 16, 3, 13, 5, 15, 2, 2, 16, 4, |
| | 3, 5, 2, 16, 6, 14, 5, 3, 3 | | | 2, 16, 3, 13, 5, 15, 2, 2, 16, 4 |
| | 1, 4, 16, 5, 8, 5, 3, 14, 2, 2, 13, 5, 2, 13, 6, 3, 2, 2, | | | 4, 3, 14, 6, 14, 2, 5, 3, 5, 8, 2, 16, 2, 16, 5, 1, 15, 5, |
| | 13, 5, 2, 13, 6, 3 | | | 8, 2, 16, 2, 16, 5, 1, 15 |
| 699 | 2, 5, 13, 3, 16, 3, 14, 1, 1, 3, 1, 3, 16, 10, 1, 13, 3, | | | 1, 1, 15, 1, 15, 5, 15, 10, 16, 3, 3, 2, 16, 1, 13, 3, 3, |
| | 1, 3, 16, 10, 1, 13 | | | 3, 2, 16, 1, 13, 3, 3 |
| | 5, 3, 16, 3, 16, 3, 16, 10, 1, 2, 13, 1, 13, 3, 14, 1, | | | 10, 1, 16, 3, 3, 15, 2, 1, 3, 15, 3, 15, 1, 1, 5, 16, 3, |
| | 1, 2, 13, 1, 13, 3, 14, 1, 1 | | | 15, 3, 15, 1, 1, 5, 16 |
| 700 | 1, 5, 16, 4, 2, 16, 2, 14, 5, 13, 5, 13, 4, 16, 6, 14, | | | 6, 5, 15, 1, 15, 5, 15, 2, 16, 4, 13, 6, 13, 5, 15, 2, 16, |
| | 4, 14, 6, 14, 5, 13, 4, 16, 6, 14, 4, 14, 6, 14 | | | 4, 13, 4, 6, 13, 5, 15, 2, 16, 4, 13, 4 |
| | 1, 4, 16, 5, 5, 14, 4, 16, 2, 13, 6, 14, 5, 14, 4, 16, | | | 4, 4, 14, 4, 14, 2, 14, 2, 14, 6, 14, 6, 14, 5, 16, 5, 16, |
| | 2, 13, 6, 14, 6, 14, 5, 14, 4, 16, 2, 13, 6, 14 | | | 5, 1, 15, 6, 14, 5, 16, 5, 16, 5, 1, 15 |
| 701 | 2, 2, 14, 5, 13, 5, 5, 16, 2, 8, 13, 2, 5, 13, 5, 3, 16, | | | 1, 8, 15, 5, 15, 5, 15, 5, 2, 16, 5, 5, 2, 16, 3, 13, 2, 2, |
| | 1, 14, 8, 13, 2, 5, 13, 5, 3, 16, 1, 14 | | | 5, 5, 2, 16, 3, 13, 2, 2 |
| | 5, 5, 16, 2, 16, 3, 16, 2, 13, 8, 5, 5, 5, 2, 13, 2, 13, | | | 3, 1, 14, 2, 15, 5, 8, 2, 5, 16, 5, 2, 15, 5, 2, 5, 16, 5, |
| | 1, 14, 5, 5, 5, 2, 13, 2, 13, 1, 14 | | | 16, 5, 2, 15, 5, 2, 5, 16 |
| 702 | 3, 2, 5, 13, 3, 1, 3, 16, 1, 4, 16, 1, 16, 3, 14, 3, 16, | | | 1, 1, 15, 1, 15, 3, 5, 15, 3, 15, 4, 13, 2, 16, 1, 3, 13, |
| | 1, 14, 1, 4, 16, 1, 16, 3, 14, 3, 16, 1, 14 | | | 1, 15, 3, 4, 13, 2, 16, 1, 3, 13, 1, 15, 3 |
| | 3, 3, 16, 1, 16, 5, 16, 3, 16, 3, 16, 2, 13, 4, 16, 1, 1, | | | 3, 4, 14, 1, 14, 1, 15, 3, 15, 3, 15, 1, 3, 15, 2, 1, 5, |
| | 3, 14, 1, 16, 2, 13, 4, 16, 1, 1, 3, 14, 1, 16 | | | 16, 3, 1, 3, 15, 2, 1, 5, 16, 3 |
| 703 | 8, 2, 2, 1, 16, 3, 14, 5, 13, 5, 3, 16, 1, 14, 1, | | | 1, 5, 15, 5, 15, 5, 8, 15, 5, 1, 13, 3, 13, 2, 16, 1, 13, 1, |
| | 14, 1, 14, 5, 13, 5, 3, 16, 1, 14, 1, 14, 1, 14 | | | 13, 3, 13, 2, 3, 13, 2, 16, 1, 13, 1, 13, 3, 13, 2 |

TABLE 19-continued

CJKV unified ideographs

| No. 12. | Top | Left | Bottom | Right |
|---|---|---|---|---|
| | 2, 3, 16, 5, 16, 5, 16, 8, 5, 1, 14, 1, 16, 2, 13, 1, 14, 3, 14, 1, 16, 1, 14, 1, 16, 2, 13, 1, 14, 3, 14, 1, 16 | | | 3, 1, 14, 1, 14, 1, 14, 5, 15, 2, 5, 16, 2, 15, 5, 16, 8, 1, 15, 3, 15, 5, 16, 2, 15, 5, 16, 8, 1, 15, 3, 15 |
| 704 | 2, 2, 14, 1, 16, 3, 14, 5, 2, 3, 16, 1, 14, 7, 13, 2, 3, 16, 1, 14, 3, 16, 1, 14, 7, 13, 2, 3, 16, 1, 14 | | | 7, 1, 15, 5, 15, 3, 15, 1, 13, 2, 2, 16, 3, 13, 2, 2, 3, 13, 1, 13, 2, 16, 3, 13, 2, 2, 3, 13, 1, 13 |
| | 1, 5, 16, 3, 16, 2, 16, 7, 3, 14, 2, 2, 13, 2, 3, 14, 1, 16, 1, 16, 2, 2, 13, 2, 3, 14, 1, 16, 1, 16 | | | 2, 3, 14, 2, 14, 1, 14, 7, 16, 3, 15, 1, 15, 5, 2, 2, 1, 15, 3, 15, 1, 15, 5, 2, 2, 1, 15, 3, 15 |
| 705 | 8, 2, 6, 2, 5, 5, 5, 8, 2, 5, 5, 5, 5, 5, 8, 2, 5, 5, 5, 5 | | | 6, 8, 15, 8, 15, 5, 5, 5, 2, 5, 5, 5, 5, 2, 2, 2, 5, 5, 5, 5, 2, 2 |
| | 2, 2, 16, 8, 5, 5, 5, 5, 6, 2, 5, 8, 5, 5, 5, 6, 2, 5, 8, 5, 5 | | | 6, 2, 2, 15, 5, 5, 8, 5, 5, 5, 2, 5, 5, 8, 5, 5, 5, 2, 5, 5, 8 |
| 706 | 8, 2, 5, 5, 5, 2, 16, 2, 14, 8, 5, 2, 5, 8, 4, 2, 14, 8, 5, 2, 5, 8, 4 | | | 8, 2, 15, 5, 2, 8, 13, 5, 5, 5, 8, 13, 2, 5, 4, 2, 5, 5, 8, 13, 2, 5, 4, 2 |
| | 2, 5, 16, 4, 8, 2, 14, 8, 5, 5, 5, 2, 16, 5, 8, 2, 5, 5, 5, 2, 16, 5, 8, 2 | | | 4, 2, 14, 8, 8, 5, 5, 2, 2, 2, 15, 5, 8, 5, 5, 2, 2, 2, 15, 5, 8, 5, 5 |
| 707 | 2, 2, 14, 5, 13, 5, 13, 5, 10, 8, 16, 2, 1, 13, 5, 1, 16, 3, 14, 3, 8, 16, 2, 1, 13, 5, 1, 16, 3, 14, 3 | | | 1, 5, 15, 10, 16, 2, 16, 3, 13, 3, 15, 8, 15, 5, 15, 5, 15, 5, 1, 13, 2, 16, 2, 8, 15, 5, 15, 5, 15, 5, 1, 13, 2, 16, 2 |
| | 5, 2, 16, 1, 16, 3, 16, 5, 8, 5, 2, 13, 3, 5, 14, 10, 16, 1, 13, 2, 13, 5, 2, 13, 3, 5, 14, 10, 16, 1, 13, 2, 13 | | | 3, 10, 14, 1, 16, 1, 15, 3, 14, 2, 15, 5, 8, 2, 5, 2, 5, 16, 5, 16, 5, 8, 2, 5, 2, 5, 16, 5, 16 |
| 708 | 3, 8, 14, 2, 5, 5, 5, 2, 16, 2, 14, 6, 14, 1, 16, 1, 14, 1, 16, 1, 14, 3, 3, 2, 16, 2, 14, 6, 14, 1, 16, 1, 14, 1, 16, 1, 14 | | | 6, 8, 15, 5, 5, 3, 13, 1, 15, 1, 15, 2, 5, 13, 3, 15, 3, 13, 1, 15, 1, 15, 2, 2, 1, 15, 2, 5, 13, 3, 15, 3, 13, 1, 15, 1, 15 |
| | 2, 3, 16, 2, 3, 5, 5, 1, 14, 1, 16, 3, 14, 2, 8, 5, 1, 14, 1, 16, 6, 14, 1, 14, 1, 16, 3, 14, 2, 8, 5, 1, 14 | | | 3, 3, 14, 6, 14, 2, 2, 1, 15, 1, 15, 1, 15, 1, 15, 2, 15, 5, 8, 5, 5, 3, 1, 15, 1, 15, 1, 15, 2, 15, 5, 8, 5 |
| 709 | 3, 8, 16, 2, 5, 5, 5, 8, 16, 2, 2, 5, 13, 5, 5, 16, 4, 2, 8, 16, 2, 2, 5, 13, 5, 5, 16, 4 | | | 5, 8, 15, 8, 15, 5, 1, 15, 5, 5, 5, 5, 5, 2, 2, 16, 4, 2, 2, 5, 5, 5, 2, 2, 16, 4, 2 |
| | 3, 2, 16, 5, 16, 2, 16, 4, 8, 5, 8, 5, 5, 5, 5, 2, 13, 2, 5, 8, 5, 5, 5, 5, 2, 13 | | | 4, 2, 14, 5, 2, 15, 5, 8, 2, 5, 16, 2, 15, 5, 8, 5, 5, 3, 15, 2, 5, 16, 2, 15, 5, 8, 5, 5 |
| 710 | 1, 5, 16, 1, 16, 3, 14, 2, 7, 16, 3, 14, 2, 4, 1, 3, 4, 16, 2, 14, 5, 5, 3, 14, 2, 4, 1, 3, 4, 16, 2, 14 | | | 2, 6, 15, 5, 15, 1, 15, 3, 5, 5, 3, 2, 3, 13, 2, 13, 1, 13, 7, 13, 4, 4, 5, 3, 2, 3, 13, 2, 13, 1, 13, 7, 13 |
| | 1, 5, 16, 7, 16, 4, 16, 4, 5, 5, 1, 14, 2, 16, 3, 14, 3, 14, 2, 3, 2, 1, 5, 1, 14, 2, 16, 3, 14, 3, 14, 2, 3 | | | 4, 2, 14, 5, 5, 4, 15, 2, 14, 3, 14, 7, 6, 2, 3, 1, 15, 3, 14, 5, 15, 1, 15, 3, 14, 7, 6, 2, 3, 1, 15, 3, 14 |

FIG. 17 is a diagram of the last 4 radicals of unified ideographs and the first 30 CJKV simplified and supplemental ideographs. The resolving of these characters is summarized in the following Table 20. In Table 20 the first numeral is the reference number from FIG. 17 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 20

CJKV Simplified and supplemental ideographs

| No. 13. | Top | Left | Bottom | Right |
|---|---|---|---|---|
| 711 | 2, 2, 16, 5, 5, 2, 16, 3, 14, 3, 14, 2, 14, 1, 1, 5, 3, 16, | | | 2, 5, 15, 5, 15, 5, 5, 1, 13, 1, 15, 3, 3, 1, 13, 1, 13, 3, |
| | 3, 14, 1, 1, 3, 14, 2, 14, 1, 1, 5, 3, 16, 3, 14, 5 | | | 3, 2, 2, 1, 15, 3, 3, 1, 13, 1, 13, 3, 3, 2 |
| | 5, 2, 16, 5, 2, 5, 3, 14, 3, 16, 1, 1, 2, 3, 14, 3, 16, 5, | | | 2, 5, 2, 3, 15, 3, 14, 1, 1, 5, 3, 15, 3, 14, 1, 1, 5, 15, |
| | 1, 1, 3, 16, 1, 1, 2, 3, 14, 3, 16, 5, 2 | | | 2, 2, 1, 5, 3, 15, 3, 14, 1, 1, 5, 15, 5 |
| 712 | 1, 2, 14, 5, 16, 5, 16, 1, 16, 3, 14, 5, 8, 5, 7, 16, 2, | | | 6, 5, 5, 5, 8, 15, 5, 5, 2, 7, 13, 5, 15, 3, 15, 5, 15, 1, |
| | 6, 5, 5, 5, 5, 8, 5, 7, 16, 2, 6, 5, 5, 5 | | | 15, 5, 5, 5, 2, 7, 13, 5, 15, 3, 15, 5, 15, 1, 15, 1, 2 |
| | 1, 2, 16, 5, 16, 1, 16, 5, 16, 7, 5, 5, 3, 2, 14, 8, 6, | | | 2, 6, 14, 7, 5, 5, 5, 5, 5, 5, 8, 5, 15, 1, 15, 3, 14, 2, 5, |
| | 16, 5, 5, 5, 5, 5, 3, 2, 14, 8, 6, 16, 5, 5, 5 | | | 15, 5, 5, 5, 8, 5, 15, 1, 15, 3, 14, 5, 1, 15 |
| 713 | 3, 10, 8, 16, 2, 6, 2, 5, 5, 8, 16, 8, 5, 13, 1, 16, 3, 13, | | | 6, 10, 15, 8, 15, 8, 15, 5, 5, 1, 13, 3, 16, 2, 5, 5, 5, 8, |
| | 5, 8, 16, 5, 5, 8, 16, 8, 5, 13, 1, 16, 3, 13, 5, 13, 5, 5 | | | 16, 8, 16, 5, 1, 13, 3, 16, 2, 5, 5, 5, 8, 16, 5, 2, 3 |
| | 3, 2, 16, 8, 16, 8, 16, 10, 8, 5, 13, 5, 5, 13, 5, 5, 6, 2, | | | 6, 5, 8, 15, 2, 5, 8, 5, 16, 3, 15, 1, 16, 5, 15, 8, 5, 16, |
| | 5, 8, 5, 13, 5, 5, 13, 5, 5, 6, 2, 1, 14, 3, 13, 5 | | | 2, 15, 5, 5, 5, 16, 3, 15, 1, 16, 5, 15, 8, 5, 16, 2, 15, 8, 3, 15, 10 |
| 714 | 3, 1, 5, 16, 8, 16, 8, 14, 8, 14, 2, 2, 2, 5, 5, 5, 7, 16, | | | 7, 8, 15, 5, 15, 1, 15, 5, 5, 2, 2, 16, 8, 13, 5, 2, 2, 16, |
| | 2, 2, 2, 2, 2, 5, 5, 5, 7, 16, 2, 5, 13 | | | 8, 13, 5, 2, 2, 2, 16, 8, 13, 5, 2, 2, 16, 8, 13, 2, 3 |
| | 3, 2, 16, 2, 16, 8, 5, 7, 5, 16, 5, 2, 16, 2, 13, 8, 5, 3, | | | 2, 2, 14, 2, 14, 7, 5, 16, 2, 15, 2, 14, 2, 14, 5, 5, 5, 8, |
| | 2, 16, 2, 13, 5, 16, 5, 2, 16, 2, 13, 8, 5, 3, 8, 5 | | | 8, 8, 5, 15, 2, 14, 2, 14, 5, 5, 5, 8, 8, 3, 15, 1 |
| 800 | 3, 10, 8, 16, 2, 6, 5, 13, 5, 13, 5, 13 | | | 6, 10, 15, 8, 5, 16, 5, 16, 2, 3, 3 |
| | 3, 2, 16, 8, 5, 10, 5, 6, 13, 6, 13 | | | 6, 2, 15, 5, 16, 8, 5, 16, 3, 15, 10, 10 |
| 801 | 1, 1, 16 | | | 1, 1, 15 |
| | 1, 1, 16 | | | 1, 1, 15 |
| 802 | 3, 4 | | | 3, 4 |
| | 4, 3 | | | 4, 3 |
| 803 | 10 | | | 10 |
| | 10 | | | 10 |
| 804 | 6 | | | 6 |
| | 6 | | | 6 |
| 805 | 9 | | | 9 |
| | 9 | | | 9 |
| 806 | 3, 2 | | | 3, 2 |
| | 3, 2 | | | 2, 3 |
| 807 | 7, 4 | | | 7, 4 |
| | 4, 7 | | | 4, 7 |
| 808 | 9, 4 | | | 9, 4 |
| | 4, 9 | | | 4, 9 |
| 809 | 3, 10 | | | 10, 3 |
| | 3, 10 | | | 3, 10 |
| 810 | 2, 4, 14 | | | 4, 2, 13 |
| | 2, 4, 14 | | | 4, 2, 15 |
| 811 | 2, 5 | | | 5, 2 |
| | 2, 5 | | | 2, 5 |
| 812 | 7, 6 | | | 6, 7 |
| | 6, 7 | | | 6, 7 |
| 813 | 1, 2, 14, 3, 14 | | | 3, 2, 13, 1, 13 |
| | 1, 2, 14, 3, 14 | | | 1, 2, 14, 3, 14 |
| 814 | 1, 1, 14, 3, 14 | | | 3, 1, 13, 1, 13 |
| | 1, 1, 14, 3, 14 | | | 1, 1, 14, 3, 14 |
| 815 | 5, 4, 6 | | | 6, 5, 4 |
| | 5, 4, 6 | | | 4, 6, 14, 5 |

TABLE 20-continued

CJKV Simplified and supplemental ideographs

| No. 13. | Top | Left | Bottom | Right |
|---|---|---|---|---|
| 816 | 3, 1, 14, 4, 16, 6, 14 | | | 6, 1, 15, 4, 13, 3, 15 |
| | 3, 4, 16, 1, 14, 6, 14 | | | 4, 6, 14, 3, 15, 1 |
| 817 | 4, 5, 13, 6, 16 | | | 6, 5, 15, 4, 16 |
| | 5, 4, 13, 6, 14 | | | 4, 6, 14, 5, 16 |
| 818 | 3, 1, 14, 9, 16, 4 | | | 9, 1, 15, 4, 3, 15 |
| | 3, 4, 16, 9, 1, 14 | | | 4, 9, 3, 15, 1, 14 |
| 819 | 8, 6, 5 | | | 6, 8, 5 |
| | 6, 8, 5 | | | 6, 5, 8 |
| 820 | 3, 3, 3, 1, 16, 3 | | | 1, 3, 3, 3, 3 |
| | 3, 3, 3, 3, 1 | | | 3, 1, 3, 3, 3 |
| 821 | 3, 10, 5, 5 | | | 5, 10, 5, 3 |
| | 3, 5, 16, 10, 5 | | | 5, 10, 5, 3 |
| 822 | 8, 5, 5 | | | 8, 5, 5 |
| | 8, 5, 5 | | | 5, 8, 5 |
| 823 | 2, 3, 16, 1, 16 | | | 1, 2, 13, 3, 13 |
| | 3, 2, 14, 1, 14 | | | 2, 3, 15, 1, 15 |
| 824 | 4, 3, 16, 1, 16, 1, 14 | | | 1, 1, 13, 4, 13, 3, 13 |
| | 3, 4, 14, 1, 14, 1, 14 | | | 3, 4, 14, 1, 14, 1, 14 |
| 825 | 4, 5, 13, 3, 13 | | | 3, 5, 15, 4, 16 |
| | 5, 3, 16, 4, 13 | | | 4, 3, 16, 5, 16 |
| 826 | 3, 5, 1, 16, 3, 13 | | | 1, 5, 15, 3, 16, 3 |
| | 3, 1, 16, 3, 13, 5 | | | 3, 1, 16, 3, 15, 5 |
| 827 | 5, 4, 3, 16, 5, 13, 6, 16 | | | 6, 5, 15, 5, 15, 4, 16, 3 |
| | 5, 3, 16, 4, 5, 13, 6, 14 | | | 4, 6, 14, 3, 15, 5, 16, 5 |
| 828 | 8, 2, 5, 16, 5, 16 | | | 8, 5, 13, 5, 15, 2 |
| | 2, 8, 5, 14, 5, 16 | | | 2, 5, 14, 8, 5, 16 |
| 829 | 7, 2, 5, 5 | | | 7, 5, 5, 2 |
| | 2, 7, 5, 5 | | | 2, 7, 5, 5 |
| 830 | 2, 5, 3, 16, 10, 1 | | | 10, 5, 15, 1, 2, 15, 3 |
| | 3, 2, 16, 10, 1, 5 | | | 10, 1, 3, 2, 15, 5 |
| 831 | 7, 3, 1, 16, 5, 13, 1, 16, 5, 13 | | | 5, 5, 15, 7, 16, 1, 13, 1, 13, 3, 16 |
| | 5, 3, 13, 5, 16, 7, 13, 1, 14, 1, 16 | | | 7, 3, 5, 16, 1, 15, 5, 16, 1, 15 |
| 832 | 8, 2, 5, 6, 16, 5, 3 | | | 6, 8, 15, 5, 16, 5, 3, 13, 2 |
| | 3, 2, 8, 5, 5, 6, 13 | | | 3, 6, 14, 2, 5, 16, 5, 8 |
| 833 | 1, 1, 16, 3, 16 | | | 3, 1, 15, 1, 15 |
| | 1, 1, 16, 3, 16 | | | 3, 1, 15, 1, 15 |
| 834 | 2, 1, 16, 3, 16, 3, 16, 1, 16 | | | 1, 3, 15, 4, 13, 3, 13, 1, 15 |
| | 1, 3, 16, 4, 14, 3, 14, 1, 16 | | | 3, 4, 14, 1, 14, 1, 15, 3, 15 |
| 835 | 3, 1, 14, 1, 14, 1, 14 | | | 1, 1, 13, 1, 13, 3, 13 |
| | 3, 1, 14, 1, 14, 1, 14 | | | 3, 1, 14, 1, 14, 1, 14 |

FIG. 18 is a diagram of the last 42 CJKV simplified and supplemental ideographs. The resolving of these characters is summarized in the following Table 21. In Table 21 the first numeral is the reference number from FIG. 18 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 21

CJKV Simplified and supplemental ideographs

| No. 14. | Top | Left | Bottom | Right |
|---|---|---|---|---|
| 836 | 3, 1, 16, 1, 14, 3, 14 | | | 3, 3, 15, 1, 13, 1, 13 |
| | 3, 1, 16, 1, 14, 3, 14 | | | 1, 1, 14, 3, 14, 3, 15 |
| 837 | 4, 2, 14, 6, 14, 14 | | | 6, 2, 13, 4, 13 |
| | 4, 2, 14, 6, 14 | | | 4, 2, 14, 6, 14 |
| 838 | 2, 1, 16, 3, 16 | | | 2, 3, 13, 1, 15 |
| | 1, 3, 16, 2, 14 | | | 3, 2, 14, 1, 15 |
| 839 | 2, 3, 16, 5, 13, 5 | | | 5, 5, 15, 2, 3 |
| | 3, 5, 16, 5, 2, 13 | | | 5, 2, 3, 15, 5, 16 |
| 840 | 4, 3, 13, 3 | | | 4, 3, 16, 3 |
| | 4, 3, 13, 3 | | | 4, 3, 3, 16 |
| 841 | 5, 2, 5, 13, 3 | | | 3, 5, 15, 5, 15, 2, 16 |
| | 5, 5, 16, 3, 16, 2, 13 | | | 3, 2, 5, 16, 5 |
| 842 | 10, 2, 16, 2, 5, 3 | | | 3, 5, 15, 10, 15, 2, 2 |
| | 10, 3, 16, 2, 2, 5 | | | 3, 2, 2, 5, 10 |

TABLE 21-continued

CJKV Simplified and supplemental ideographs

| No. | Top | Left | Bottom | Right |
|---|---|---|---|---|
| 843 | 8, 2, 2, 2, 5 | | | 8, 5, 2, 2, 2 |
| | 2, 8, 5, 2, 2 | | | 2, 5, 8, 2, 2 |
| 844 | 5, 5, 16, 4, 3, 16, 1, 16 | | | 1, 5, 15, 5, 15, 4, 3 |
| | 5, 5, 5, 3, 5, 4, 1 | | | 3, 4, 14, 1, 14, 5, 5, 15 |
| 845 | 1, 10, 16, 2, 1, 16 | | | 1, 1, 15, 10, 2 |
| | 1, 10, 16, 2, 3, 14 | | | 2, 1, 14, 10, 1, 15 |
| 846 | 3, 3, 14, 5, 5, 1, 1 | | | 1, 5, 3, 1, 13, 5, 3 |
| | 3, 5, 1, 3, 14, 5, 1 | | | 1, 1, 14, 3, 3, 5, 5 |
| 847 | 3, 3, 3, 1, 16, 3, 3, 16, 1, 14, 1, 14, 1, 14, 1, 14 | | | 1, 1, 15, 3, 13, 3, 1, 3, 3, 3, 13, 3, 3, 13 |
| | 3, 3, 16, 3, 3, 3, 1, 16, 1, 1, 16, 1, 1, 16 | | | 3, 2, 14, 2, 14, 3, 15, 1, 3, 3, 3, 3, 3 |
| 848 | 3, 3, 3, 3, 3, 16 | | | 3, 3, 15, 3, 3, 3 |
| | 3, 3, 16, 3, 3, 3 | | | 3, 3, 15, 3, 3, 3 |
| 849 | 8, 2, 1, 16, 3, 13 | | | 8, 1, 13, 3, 16, 2 |
| | 2, 8, 1, 14, 3, 13 | | | 2, 3, 14, 8, 1, 16 |
| 850 | 10, 3, 3, 16, 1, 14 | | | 1, 10, 15, 3, 13, 3 |
| | 3, 3, 16, 10, 1, 14 | | | 3, 1, 14, 3, 15, 10 |
| 851 | 10, 3, 4, 6 | | | 6, 10, 4, 3 |
| | 3, 4, 16, 10, 6 | | | 4, 6, 14, 3, 15, 10 |
| 852 | 8, 2, 2, 2 | | | 8, 2, 2, 2 |
| | 2, 8, 2, 2 | | | 2, 8, 2, 2 |
| 853 | 1, 3, 14, 5, 16, 4, 5, 13, 5, 13 | | | 5, 5, 15, 5, 15, 3, 15, 4, 16, 1, 13 |
| | 1, 5, 16, 5, 16, 5, 16, 4, 13, 3, 14 | | | 4, 5, 5, 16, 5, 1, 15, 3, 14 |
| 854 | 1, 3, 14, 5, 16, 2, 5, 13, 5 | | | 5, 5, 15, 5, 15, 3, 15, 2, 16, 1, 13 |
| | 1, 5, 16, 5, 16, 5, 16, 2, 13, 3, 14 | | | 5, 2, 5, 16, 5, 1, 15, 3, 14 |
| 855 | 2, 2, 14, 5, 5, 5, 16, 2, 5, 13, 5, 13 | | | 5, 5, 15, 5, 15, 2, 13, 2, 2, 13, 5, 5 |
| | 5, 5, 16, 5, 16, 2, 2, 13, 2, 14, 5, 5 | | | 2, 5, 16, 5, 2, 15, 2, 14, 5, 5, 5 |
| 856 | 2, 3, 14, 5, 13, 5, 13 | | | 5, 3, 16, 5, 13, 2, 16 |
| | 5, 3, 16, 5, 13, 2, 13 | | | 3, 5, 16, 2, 5, 16 |
| 857 | 2, 8, 13, 5, 13, 5, 13 | | | 5, 8, 16, 5, 2, 16 |
| | 8, 5, 13, 5, 2, 13 | | | 2, 5, 16, 8, 16, 5, 16 |
| 858 | 2, 8, 13, 5, 13, 5, 13, 5 | | | 5, 5, 15, 8, 16, 5, 2, 16 |
| | 8, 5, 16, 5, 13, 5, 2, 13 | | | 5, 2, 5, 16, 8, 16, 5, 16 |
| 859 | 7, 4, 1, 16, 3, 16 | | | 7, 3, 13, 1, 15, 4 |
| | 4, 7, 1, 14, 3, 16 | | | 4, 7, 3, 15, 1, 15 |
| 860 | 3, 8, 14, 2, 5, 5, 5, 5, 5 | | | 8, 5, 5, 5, 13, 5, 15, 3, 2, 2 |
| | 3, 2, 5, 5, 8, 14, 5, 5, 5 | | | 2, 5, 14, 5, 8, 5, 5, 3, 3 |
| 861 | 2, 2, 14, 5, 13 | | | 5, 2, 16, 2, 16 |
| | 5, 2, 13, 2, 13 | | | 2, 2, 14, 5, 16 |
| 862 | 2, 2, 14, 5, 5 | | | 5, 2, 2, 13, 5 |
| | 5, 2, 2, 14, 5 | | | 2, 2, 14, 5, 5 |
| 863 | 2, 2, 14, 5, 5 | | | 5, 2, 2, 13, 5 |
| | 5, 2, 2, 14, 5 | | | 2, 2, 14, 5, 5 |
| 864 | 2, 5, 10, 16, 4, 6, 16, 3, 13, 9, 16, 4, 9, 16, 4 | | | 9, 6, 15, 10, 15, 5, 15, 3, 16, 2, 15, 4, 4, 4, 4 |
| | 2, 4, 16, 10, 3, 14, 4, 16, 6, 13, 9, 5, 9, 5 | | | 4, 4, 14, 9, 6, 15, 3, 16, 10, 2, 15, 5, 2, 15, 5 |
| 865 | 1, 10, 16, 2, 3, 16, 1, 16 | | | 1, 1, 15, 3, 15, 10, 2 |
| | 1, 10, 16, 2, 3, 14, 1, 16 | | | 2, 1, 14, 10, 3, 15, 1, 15 |
| 866 | 5, 2, 2, 8, 13, 2, 5 | | | 8, 5, 15, 5, 2, 16, 2, 16, 2 |
| | 5, 2, 16, 8, 5, 2, 13, 2, 13 | | | 2, 5, 8, 2, 16, 2, 16, 5 |
| 867 | 5, 4, 6, 8, 13, 2, 5 | | | 8, 5, 15, 5, 6, 13, 4, 13, 2 |
| | 5, 2, 16, 8, 5, 4, 13, 6, 13 | | | 2, 5, 8, 4, 16, 6, 16, 5 |
| 868 | 8, 2, 4, 16, 6, 16 | | | 6, 8, 15, 4, 13, 2 |
| | 2, 4, 16, 8, 6 | | | 4, 6, 14, 2, 15, 8 |
| 869 | 3, 10, 7, 16, 4, 2, 5, 13, 5, 13, 5, 13 | | | 7, 10, 15, 5, 5, 2, 16, 4, 3, 3 |
| | 3, 4, 16, 7, 10, 5, 5, 2, 13, 2, 13 | | | 4, 2, 14, 7, 5, 16, 5, 16, 3, 15, 10, 10 |
| 870 | 3, 10, 7, 16, 2, 3, 16, 1, 3, 16, 1, 3, 16, 1 | | | 7, 10, 15, 1, 13, 1, 15, 3, 3, 2, 3, 2, 3 |
| | 3, 2, 16, 7, 10, 3, 14, 3, 16, 1, 1, 1, 1 | | | 2, 3, 14, 7, 1, 3, 15, 1, 3, 15, 10, 3, 15, 10 |
| 871 | 1, 8, 16, 3 | | | 3, 1, 15, 8 |
| | 1, 8, 16, 3 | | | 3, 8, 1, 15 |
| 872 | 8, 2, 4, 16, 1 | | | 1, 8, 15, 4, 2 |
| | 2, 4, 16, 8, 1 | | | 4, 1, 2, 15, 8 |
| 873 | 8, 2, 5, 2, 2, 16, 5, 3, 3 | | | 3, 5, 15, 8, 15, 5, 2, 2, 2, 2 |
| | 2, 3, 16, 2, 8, 5, 2, 5, 5 | | | 3, 2, 2, 5, 2, 16, 5, 8, 8 |
| 874 | 3, 5, 13, 2, 16, 5, 13, 5, 13 | | | 5, 5, 15, 5, 15, 2, 16, 3, 16 |
| | 5, 5, 16, 3, 13, 5, 2, 13 | | | 2, 5, 16, 3, 15, 5, 16, 5, 16 |
| 875 | 1, 8, 16, 3, 1 | | | 1, 1, 15, 8, 1 |
| | 1, 8, 16, 3, 1 | | | 3, 1, 8, 1, 15 |
| 876 | 1, 1, 16, 8, 16, 3, 1 | | | 1, 1, 15, 1, 15, 8, 1 |
| | 1, 1, 16, 8, 16, 3, 16, 1 | | | 3, 1, 8, 1, 15, 1, 15 |

TABLE 21-continued

CJKV Simplified and supplemental ideographs

| No. 14. | Top | Left | Bottom | Right |
|---|---|---|---|---|
| 877 | 1, 10, 16, 10, 1 | | | 1, 1, 15, 10, 10 |
| | 1, 10, 16, 10, 1 | | | 10, 1, 10, 1, 15 |

FIG. 19 is a diagram of the last 36 CJKV simplified and supplemental ideographs. The resolving of these characters is summarized in the following Table 22. In Table 22 the first numeral is the reference number from FIG. 19 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 22

CJKV Simplified and supplemental ideographs

| No. 15. | Top | Left | Bottom | Right |
|---|---|---|---|---|
| 878 | 10, 2, 4 | | | 4, 10, 2 |
| | 2, 10, 4 | | | 2, 4, 14, 10 |
| 879 | 3, 5, 5, 16, 2, 5, 13, 3 | | | 3, 5, 15, 5, 15, 5, 15, 2, 16, 3 |
| | 3, 5, 16, 5, 16, 3, 16, 5, 2, 13 | | | 3, 2, 5, 16, 5, 3, 16, 5 |
| 880 | 5, 2, 5, 5, 5, 2, 1, 16, 3, 3, 1, 16, 3, 3 | | | 1, 5, 15, 5, 15, 5, 15, 5, 15, 3, 3, 13, 2, 2, 3, 13, 2, 2 |
| | 5, 3, 16, 2, 2, 5, 5, 5, 1, 14, 3, 5, 1, 14, 3 | | | 3, 1, 14, 2, 3, 5, 2, 15, 5, 5, 5, 5, 5, 5 |
| 881 | 5, 2, 5, 5, 5, 3, 1, 16, 3, 1, 16, 3 | | | 1, 5, 15, 5, 15, 5, 15, 5, 15, 3, 3, 2, 3, 2 |
| | 5, 3, 16, 2, 3, 5, 5, 5, 1, 5, 1 | | | 3, 1, 3, 5, 2, 5, 5, 5, 5 |
| 882 | 2, 3, 14, 5, 13, 1, 16, 3 | | | 1, 5, 15, 3, 15, 3, 13, 2, 16 |
| | 5, 3, 16, 2, 13, 3, 14, 1, 14 | | | 3, 1, 14, 2, 5, 16, 3, 15 |
| 883 | 1, 7, 14, 2, 16 | | | 7, 1, 13, 2, 13 |
| | 2, 1, 14, 7, 14 | | | 2, 7, 14, 1, 15 |
| 884 | 3, 8, 16, 2, 5, 8, 5, 8, 5, 8, 5 | | | 8, 3, 15, 5, 8, 5, 8, 5, 2, 5, 2 |
| | 3, 2, 16, 8, 5, 5, 8, 5, 8, 5, 8 | | | 2, 5, 8, 5, 8, 5, 8, 3, 15, 8, 3, 15 |
| 885 | 5, 2, 8, 13, 3, 5, 16, 5, 16, 5, 16, 5, 16, 5, 16 | | | 5, 5, 15, 10, 15, 5, 15, 2, 16, 5, 13, 5, 15, 3, 5, 15, 3 |
| | 5, 3, 16, 10, 5, 16, 5, 16, 2, 13, 5, 14, 5, 16, 5, 14, 5, 16 | | | 5, 2, 14, 5, 14, 5, 15, 5, 15, 3, 15, 10, 16, 5, 10, 16, 5 |
| 886 | 2, 5, 5, 13, 5, 13, 7, 16, 2, 5, 5, 5, 5 | | | 7, 5, 15, 5, 15, 5, 15, 5, 5, 2, 16, 2, 2, 16, 2 |
| | 5, 2, 16, 5, 16, 5, 16, 7, 5, 5, 2, 13, 5, 2, 13 | | | 2, 7, 5, 5, 5, 15, 2, 5, 16, 5, 16, 5, 16, 5, 16 |
| 887 | 2, 5, 13, 5, 13, 7, 13 | | | 7, 5, 15, 5, 15, 2, 16 |
| | 5, 5, 16, 7, 16, 2, 13 | | | 2, 7, 16, 5, 16, 5, 16 |
| 888 | 5, 3, 8, 2, 4, 16, 1 | | | 1, 8, 15, 5, 15, 3, 13, 4, 2 |
| | 5, 2, 16, 4, 16, 8, 3, 1 | | | 4, 1, 2, 15, 8, 3, 5 |
| 889 | 9, 3, 14, 1, 16 | | | 9, 1, 15, 3, 15 |
| | 9, 3, 14, 1, 16 | | | 9, 1, 15, 3, 15 |
| 890 | 9, 4, 1, 16, 3, 13 | | | 9, 1, 13, 3, 16, 4 |
| | 4, 9, 1, 14, 3, 13 | | | 4, 3, 14, 9, 1, 16 |
| 891 | 3, 1, 1, 16, 8, 16, 2, 5, 5, 1, 16, 3, 3, 5, 1, 16, 3, 3 | | | 1, 8, 15, 1, 15, 1, 15, 3, 5, 5, 3, 13, 3, 2, 5, 3, 13, 3, 2 |
| | 3, 3, 16, 2, 1, 14, 8, 5, 5, 1, 14, 1, 3, 5, 1, 14, 1, 3 | | | 3, 1, 14, 2, 3, 5, 8, 5, 1, 15, 3, 15, 1, 5, 1, 15, 3, 15, 1 |
| 892 | 3, 1, 1, 16, 8, 16, 2, 5, 5, 5, 5, 5, 5 | | | 5, 1, 15, 1, 15, 5, 8, 5, 5, 2, 3, 5, 2, 3 |
| | 3, 2, 16, 1, 14, 8, 5, 5, 5, 5, 3, 5, 5, 3 | | | 2, 5, 5, 5, 8, 5, 1, 15, 3, 15, 1, 1, 15, 3, 15, 1 |
| 893 | 3, 1, 1, 16, 8, 16, 2, 5, 5, 1, 16, 3, 5, 1, 16, 3 3, 5, 2, 3 | | | 1, 8, 15, 1, 15, 1, 15, 5, 15, 3, 5, 2, |
| | 3, 3, 16, 2, 1, 14, 8, 5, 5, 1, 14, 1, 5, 1, 14, 1 | | | 3, 1, 2, 5, 8, 5, 1, 15, 3, 15, 1, 1, 15, 3, 15, 1 |
| 894 | 3, 10, 2, 16, 3 | | | 3, 10, 15, 2, 3 |
| | 3, 3, 16, 10, 2 | | | 3, 2, 3, 15, 10 |
| 895 | 3, 3, 14, 3, 14, 1, 14, 1, 1, 5, 16, 3, 8, 2, 5, 5, 5, 5, 16, 3, 8, 2, 5, 5, 5 | | | 8, 5, 15, 1, 15, 3, 13, 3, 5, 5, 5, 5, 1, 13, 3, 1, 13, 3, 5, 5, 5, 1, 13, 3, 1, 13, 3 |

TABLE 22-continued

CJKV Simplified and supplemental ideographs

| No. 15. | Top | Left | Bottom | Right |
|---|---|---|---|---|
| | 3, 5, 16, 2, 16, 1, 3, 14, 8, 5, 5, 5, 3, 14, 1, 3, 14, 1, 5, 5, 5, 3, 14, 1, 3, 14, 1, 1 | | | 2, 5, 8, 5, 5, 3, 15, 5, 1, 15, 1, 14, 1, 14, 3, 3, 3, 5, 1, 15, 1, 14, 1, 14, 3, 3, 3 |
| 896 | 10, 3, 16, 7, 5, 16 10, 3, 16, 5, 16, 7 | | | 7, 10, 5, 13, 3 5, 7, 14, 3, 10 |
| 897 | 8, 2, 8, 10, 3, 7, 16, 2, 5, 5, 2, 5, 5 3, 2, 16, 2, 8, 8, 10, 7, 5, 5, 7, 5, 5 | | | 7, 10, 15, 8, 5, 5, 8, 2, 2, 3, 2, 2, 3 2, 7, 5, 5, 3, 15, 10, 2, 8, 8, 2, 8, 8 |
| 898 | 3, 8, 16, 2, 4, 5, 13, 5, 13, 6, 16, 3, 16, 1, 14, 3, 6, 16, 3, 16, 1, 14, 3 3, 2, 16, 4, 16, 8, 5, 13, 5, 13, 6, 14, 3, 14, 3, 1, 6, 14, 3, 14, 3, 1 | | | 6, 1, 15, 8, 15, 3, 15, 5, 3, 5, 3, 4, 16, 2, 5, 3, 4, 16, 2 4, 6, 14, 3, 15, 1, 3, 2, 15, 5, 16, 8, 5, 16, 3, 15, 5, 16, 8, 5, 16, 3, 15 |
| 899 | 3, 10, 8, 16, 2, 2, 5, 13, 5, 5, 16, 5, 5, 16 3, 2, 16, 5, 16, 8, 5, 10, 5, 2, 13, 5, 2, 13 | | | 5, 8, 15, 10, 15, 5, 5, 2, 16, 2, 3, 2,3 5, 2, 15, 5, 8, 2, 5, 16, 3, 15, 10, 3, 15, 10 |
| 900 | 3, 7, 16, 2, 1, 16, 7, 5, 16 3, 2, 16, 5, 16, 7, 7, 1, 14 | | | 7, 3, 15, 7, 1, 13, 5, 13, 2 5, 7, 14, 2, 7, 1, 15, 3, 15 |
| 901 | 2, 5, 8, 16, 2, 1, 16, 3, 13, 5, 5 2, 2, 16, 8, 5, 1, 14, 3, 13, 5, 5 | | | 8, 5, 15, 5, 1, 13, 3, 16, 2, 2, 2 2, 5, 8, 3, 15, 1, 16, 2, 15, 5, 5 |
| 902 | 2, 5, 5, 13, 5, 13, 3, 16, 10, 1, 13, 1, 13 5, 3, 16, 5, 16, 5, 16, 1, 16, 10, 13, 2, 13, 2, 13 | | | 1, 5, 15, 5, 15, 5, 15, 10, 16, 2, 16, 3, 3 10, 1, 16, 3, 5, 15, 2, 5, 16, 5, 16, 5, 16 |
| 903 | 2, 2, 14, 5, 13, 5, 2, 16, 8, 13, 2, 5, 13, 5, 3, 16, 1, 16, 3, 13, 2, 16, 14, 2, 5, 13, 5, 3, 16, 1, 14 5, 5, 16, 2, 16, 3, 16, 8, 5, 5, 2, 13, 2, 13, 2, 13, 1, 16, 5, 2, 13, 2, 13, 2, 13, 1, 16 | | | 1, 8, 15, 5, 15, 5, 15, 5, 5, 2, 16, 2, 2, 2, 16, 2, 16, 3, 13, 2, 16, 2 3, 1, 14, 2, 15, 5, 8, 2, 5, 16, 5, 15, 2, 2, 5, 16, 5, 16, 5, 15, 2, 2, 5, 16 |
| 904 | 8, 2, 5, 6, 8, 13, 2, 5, 13, 5, 13, 5, 13, 5, 13 2, 2, 16, 8, 8, 5, 5, 5, 6, 13, 5, 6, 13 | | | 6, 8, 15, 8, 16, 5, 5, 16, 5, 16, 2, 2, 2, 2 6, 2, 5, 16, 8, 16, 5, 16, 2, 15, 5, 8, 5, 8 |
| 905 | 1, 5, 16, 1, 16, 3, 13, 4, 16, 2, 14, 5, 5, 5, 5 1, 5, 16, 1, 16, 4, 16, 3, 5, 5, 2, 5, 2 | | | 2, 1, 15, 5, 15, 1, 15, 3, 16, 5, 5, 4, 5, 4 4, 2, 14, 5, 5, 3, 15, 1, 16, 5, 15, 1, 15, 5, 15, 1, 15 |
| 906 | 1, 5, 16, 1, 16, 3, 13, 4, 16, 2, 14 1, 5, 16, 1, 16, 4, 16, 3, 13, 2, 14 | | | 2, 1, 15, 5, 15, 1, 15, 3, 16, 4, 13 4, 2, 14, 3, 15, 1, 16, 5, 15, 1, 15 |
| 907 | 2, 2, 14, 5, 5, 2, 16, 2, 14, 2, 14, 1, 16, 3, 16, 5, 13, 1, 3, 5, 2, 14, 1, 16, 3, 16, 5, 13, 1, 3, 5 5, 2, 16, 5, 2, 1, 14, 5, 16, 3, 16, 2, 2, 13, 5, 3, 16, 1, 2, 3, 16, 2, 2, 13, 5, 3, 16, 1, 2 | | | 2, 5, 15, 5, 15, 5, 1, 13, 5, 15, 3, 15, 2, 13, 2, 3, 1, 13, 2, 2, 3, 15, 2, 13, 2, 3, 1, 13, 2, 2 2, 5, 2, 3, 15, 2, 1, 5, 16, 1, 15, 3, 15, 5, 15, 2, 2, 5, 5, 16, 1, 15, 3, 15 |
| 908 | 1, 2, 3, 16, 2, 2, 13, 5, 3, 16, 1, 2 2, 2, 14, 5, 5, 2, 16, 3, 14, 2, 14, 2, 5, 2, 14, 2, 5 5, 2, 16, 5, 2, 3, 14, 1, 2, 5, 2, 2, 5, 2 | | | 5, 16, 1, 15, 3, 15, 5, 15, 2, 2, 5 2, 5, 15, 5, 15, 5, 1, 13, 2, 3, 2, 2, 3, 2, 2 2, 5, 2, 3, 15, 1, 16, 5, 15, 2, 2, 5, 2, 2, 5 |
| 909 | 1, 5, 16, 1, 16, 3, 14, 5, 8, 16, 2, 6, 5, 13, 5, 13, 2, 6, 5, 13, 5, 13 1, 5, 16, 1, 16, 5, 16, 2, 16, 8, 5, 5, 6, 13, 3, 14, 5, 5, 6, 13, 3, 14, 5, 5, 6, 13, 3, 14, 5 5, 6, 13, 3, 14 | | | 6, 5, 15, 3, 15, 1, 15, 1, 15, 8, 5, 16, 5, 16, 1, 13, 2, 5, 16, 5, 16, 1, 13, 2 5, 16, 5, 16, 1, 13, 2 6, 2, 15, 5, 16, 8, 5, 16, 5, 15, 1, 15, 3, 14, 5, 15, 1, 3, 14, 5, 15, 1, 15, 1, 15, 3, 14, 5, 15, 1, 15 |
| 910 | 4, 1, 14, 5, 13, 6, 16, 3, 13 5, 4, 13, 3, 14, 1, 14, 6, 13 | | | 6, 5, 15, 1, 15, 3, 16, 4, 16 4, 6, 14, 3, 16, 5, 16, 1, 15 |
| 911 | 3, 8, 16, 2, 5, 5, 6, 2, 8, 16, 8, 5, 13, 1, 16, 3, 13, 5, 5, 5, 8, 16, 8, 8, 16, 5, 13, 2, 8, 16, 8, 5, 13, 1, 16, 3, 13, 5, 5, 5 3, 2, 16, 8, 16, 8, 16, 5, 5, 13, 5, 5, 13, 5, 5 2, 5, 8, 1, 14, 5, 13, 5, 5, 13, 5, 5, 2, 5, 3, 13, 5 | | | 6, 3, 15, 8, 8, 5, 5, 1, 13, 3, 16, 2, 5, 5, 5, 8, 16, 8, 16, 5, 1, 13, 3, 16, 2, 5, 5, 8, 16, 8, 5, 2 6, 5, 15, 8, 2, 5, 16, 5, 8, 3, 15, 1, 16, 5, 15, 8, 5, 16, 2, 15, 5, 5, 8, 3, 15, 1, 16, 5, 15, 8, 5, 16, 2, 15, 8, 3, 15 |
| 912 | 3, 10, 8, 16, 2, 6, 5, 13, 5, 13, 8, 13, 2, 5, 13, 5, 13 5, 13, 8, 13, 2, 5, 13, 5, 13 3, 2, 16, 2, 16, 8, 5, 8, 5, 10, 5, 5, 6, 13, 5, 10, 5, 5, 6, 13 | | | 6, 10, 15, 8, 16, 8, 5, 16, 5, 16, 5, 16, 5, 16, 2, 2, 3 5, 16, 5, 16, 2, 2, 3 6, 2, 15, 5, 16, 8, 5, 16, 2, 15, 5, 16, 8, 16, 5, 16, 3, 8, 16, 5, 16, 3 |
| | 6, 13 | | | 15, 10, 5, 16, 8, 16, 5, 16, 3, 15, 10 |

TABLE 22-continued

CJKV Simplified and supplemental ideographs

| No. 15. | Top | Left | Bottom | Right |
|---|---|---|---|---|
| 913 | 3, 10, 8, 16, 2, 6, 5, 13, 5, 13, 5, 13<br>3, 2, 16, 8, 5, 10, 5, 6, 13, 6, 13 | | | 6, 10, 15, 8, 5, 16, 5, 16, 2, 3, 3<br>6, 2, 15, 5, 16, 8, 5, 16, 3, 15, 10, 10 |

FIG. 20 is a diagram of the first 42 characters of the phonetic Japanese called Hiragana. The resolving of these characters is summarized in the following Table 23. In Table 23 the first numeral is the reference number from FIG. 20 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 23

Japanese Hiragana characters

| No. 16. | Top | Left | Bottom | Right |
|---|---|---|---|---|
| 1001 | 6, 5, 13, 9, 13, 7, 3, 13<br>5, 9, 16, 3, 6, 13, 7 | | | 7, 5, 15, 6, 16, 3, 16, 9<br>9, 7, 3, 6, 16, 5, 16 |
| 1002 | 6, 1, 14<br>6, 1, 14 | | | 1, 6, 13<br>6, 1, 14 |
| 1003 | 1, 7, 16<br>1, 7, 16 | | | 7, 1, 15<br>7, 1, 15 |
| 1004 | 1, 10, 16, 3, 6<br>1, 10, 16, 3, 6 | | | 6, 1, 15, 10, 3<br>10, 6, 14, 3, 1, 15 |
| 1005 | 4, 1, 14, 5, 13, 7, 13<br>5, 4, 13, 7, 13, 1, 14 | | | 7, 1, 15, 4, 16, 5, 16<br>4, 7, 16, 5, 16, 1, 14 |
| 1006 | 3, 1, 14, 7, 13<br>7, 3, 13, 1, 14 | | | 1, 7, 13, 3, 16<br>3, 7, 16, 1, 14 |
| 1007 | 3, 1, 14, 1, 14, 1, 16, 7, 13<br>7, 3, 13, 1, 14, 1, 16, 1, 14 | | | 1, 1, 15, 1, 13, 7, 13, 3, 16<br>3, 7, 16, 1, 14, 1, 15, 1, 14 |
| 1008 | 1, 5, 13, 5, 13, 9<br>5, 5, 16, 9, 16, 1, 13 | | | 9, 5, 15, 5, 15, 1, 16<br>9, 1, 5, 16, 5, 16 |
| 1009 | 1, 1, 14, 1, 14, 5, 13, 5, 13, 9 | | | 9, 1, 15, 5, 15, 5, 15, 1, 13, 3, 16 |
| | 5, 5, 16, 9, 16, 1, 13, 1, 14, 1, 14 | | | 9, 1, 5, 16, 5, 16, 1, 15, 1, 14 |
| 1010 | 3, 1<br>3, 1 | | | 1, 3<br>1, 3 |
| 1011 | 3, 1, 14, 1, 14, 1<br>3, 1, 1, 14, 1, 14 | | | 1, 1, 13, 1, 13, 3, 13<br>1, 3, 1, 15, 1, 14 |
| 1012 | 6, 4, 14, 5, 13<br>6, 5, 14, 4, 13 | | | 5, 4, 16, 6<br>6, 4, 5, 16 |
| 1013 | 6, 4, 14, 1, 14, 1, 14, 5, 13<br>6, 5, 14, 4, 13, 1, 14, 1, 14 | | | 5, 1, 15, 1, 13, 4, 16, 6, 13<br>6, 4, 5, 16, 1, 15, 1, 14 |
| 1014 | 10, 6, 16<br>10, 6, 16 | | | 6, 10, 15<br>6, 10, 16 |
| 1015 | 10, 1, 14, 1, 14, 6, 16<br>10, 6, 16, 1, 14, 1, 14 | | | 6, 1, 15, 10, 15, 1, 13<br>6, 10, 16, 1, 15, 1, 14 |
| 1016 | 1, 5, 13, 9<br>5, 9, 16, 1 | | | 9, 5, 15, 1, 16<br>9, 1, 5, 16 |
| 1017 | 1, 1, 14, 1, 14, 5, 13, 9<br>5, 9, 16, 1, 13, 1, 14, 1, 14 | | | 9, 1, 15, 5, 15, 1, 16, 1, 13<br>9, 1, 5, 16, 1, 15, 1, 14 |
| 1018 | 6<br>6 | | | 6<br>6 |
| 1019 | 6, 1, 14, 1, 14<br>6, 1, 14, 1, 14 | | | 6, 1, 15, 1, 13<br>6, 1, 15, 1, 14 |
| 1020 | 4, 5, 13, 9, 7, 13<br>5, 9, 16, 7, 4, 13 | | | 5, 7, 13, 6, 16, 9<br>7, 9, 4, 16, 5, 16 |
| 1021 | 4, 1, 14, 1, 14, 5, 13, 9, 7, 13<br>5, 9, 16, 7, 4, 13, 1, 14, 1, 14 | | | 5, 1, 15, 1, 13, 7, 13, 6, 16, 9<br>7, 9, 4, 16, 5, 16, 1, 15, 1, 14 |
| 1022 | 6, 4, 14, 5, 13<br>5, 6, 13, 4, 13 | | | 6, 5, 16, 4, 16<br>6, 4, 15, 5, 16 |
| 1023 | 6, 4, 14, 1, 14, 1, 14, 5, 13<br>5, 6, 13, 4, 13, 1, 14, 1, 14 | | | 6, 1, 15, 5, 16, 1, 13, 4, 16<br>6, 4, 15, 5, 16, 1, 15, 1, 14 |
| 1024 | 10, 9<br>10, 9 | | | 9, 10<br>9, 10 |

TABLE 23-continued

Japanese Hiragana characters

| No. 16. | Top | Left | Bottom | Right |
|---|---|---|---|---|
| 1025 | 10, 1, 14, 1, 14, 9 | | | 9, 1, 15, 10, 13, 1 |
| | 10, 9, 1, 14, 1, 14 | | | 9, 10, 1, 15, 1, 14 |
| 1026 | 3, 5, 13, 10, 16, 6, 16 | | | 6, 10, 15, 5, 13, 3, 16 |
| | 5, 3, 13, 10, 14, 6, 16 | | | 3, 6, 14, 10, 15, 5, 16 |
| 1027 | 3, 1, 14, 1, 14, 5, 13, 10, 16, 6, 16 | | | 6, 1, 15, 10, 15, 1, 13, 5, 13, 3, 16 |
| | 5, 3, 13, 10, 14, 6, 16, 1, 14, 1, 14 | | | 3, 6, 14, 10, 15, 5, 16, 1, 15, 1, 14 |
| 1028 | 6, 5, 13, 7 | | | 7, 5, 15, 6, 16 |
| | 5, 6, 13, 7 | | | 7, 6, 5, 16 |
| 1029 | 6, 1, 14, 1, 14, 5, 13, 7 | | | 7, 1, 15, 1, 13, 5, 13, 3, 16 |
| | 5, 6, 13, 7, 1, 14, 1, 14 | | | 7, 6, 5, 16, 1, 15, 1, 14 |
| 1030 | 7 | | | 7 |
| | 7 | | | 7 |
| 1031 | 7, 1, 14, 1, 14 | | | 7, 1, 15, 1, 13 |
| | 7, 1, 14, 1, 14 | | | 7, 1, 15, 1, 14 |
| 1032 | 9 | | | 9 |
| | 9 | | | 9 |
| 1033 | 9, 1, 14, 1, 14 | | | 1, 1, 13, 9, 13 |
| | 9, 1, 14, 1, 14 | | | 9, 1, 15, 1, 14 |
| 1034 | 1, 9 | | | 9, 1 |
| | 1, 9 | | | 9, 1 |
| 1035 | 1, 1, 14, 1, 14, 9 | | | 9, 1, 15, 1, 13, 1 |
| | 1, 9, 1, 14, 1, 14 | | | 9, 1, 1, 15, 1, 14 |
| 1036 | 3, 1, 14, 5, 13, 4, 16, 9, 1, 13 | | | 1, 1, 15, 4, 16, 9, 5, 13, 3, 16 |
| | 5, 3, 13, 9, 14, 6, 1, 13, 1, 14 | | | 9, 1, 4, 16, 3, 15, 5, 16, 1, 14 |
| 1037 | 6, 10, 14, 6, 16 | | | 6, 10, 15, 6, 13 |
| | 6, 10, 14, 6, 16 | | | 6, 6, 14, 10, 15 |
| 1038 | 1, 3, 13, 9, 13, 7, 9, 1, 13 | | | 1, 7, 16, 9, 3, 16, 1, 16, 9, 16 |
| | 1, 9, 13, 3, 13, 7, 9, 1, 13 | | | 9, 9, 14, 3, 7, 16, 1, 16, 1, 16 |
| 1039 | 4, 10, 13, 7, 13, 9, 1, 13 | | | 1, 7, 16, 9, 4, 16, 10, 16 |
| | 10, 4, 13, 7, 13, 9, 1, 13 | | | 4, 9, 14, 7, 16, 1, 16, 10, 16 |
| 1040 | 9, 7, 3 | | | 7, 3, 9 |
| | 9, 3, 7 | | | 9, 7, 3 |
| 1041 | 6, 4, 14, 5, 13, 9, 1, 13 | | | 1, 5, 15, 4, 16, 9, 6, 13 |
| | 6, 5, 14, 9, 16, 4, 13, 1, 13 | | | 6, 9, 14, 1, 4, 16, 5, 16 |
| 1042 | 6, 4, 14, 1, 14, 1, 14, 5, 13, 9, 1, 13 | | | 1, 1, 15, 5, 15, 1, 13, 4, 16, 9, 13, 6 |
| | 6, 5, 14, 9, 16, 4, 13, 1, 13, 1, 14, 1, 14 | | | 6, 9, 14, 1, 4, 16, 5, 16, 1, 15, 1, 14 |

FIG. 21 is a diagram of the last 35 characters of the phonetic Japanese called Hiragana. The resolving of these characters is summarized in the following Table 24. In Table 24 the first numeral is the reference number from FIG. 21 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 24

Japanese Hiragana characters

| No. 17. | Top | Left | Bottom | Right |
|---|---|---|---|---|
| 1043 | 6, 4, 14, 11, 14, 5, 13, 9, 1, 13 | | | 1, 11, 15, 5, 15, 4, 16, 9, 6, 13 |
| | 6, 5, 14, 9, 16, 4, 13, 1, 13, 11 | | | 6, 9, 14, 1, 4, 16, 5, 16, 11, 14 |
| 1044 | 9, 4, 1 | | | 1, 4, 9 |
| | 9, 4, 1 | | | 9, 4, 1 |
| 1045 | 9, 1, 14, 1, 14, 4, 1 | | | 1, 1, 15, 1, 13, 4, 9 |
| | 9, 4, 1, 1, 14, 1, 14 | | | 9, 4, 1, 1, 15, 1, 14 |
| 1046 | 9, 11, 14, 4, 1 | | | 1, 11, 15, 4, 9 |
| | 9, 4, 1, 11, 14 | | | 9, 4, 1, 11, 15 |
| 1047 | 1, 7, 16, 3, 16, 1, 14 | | | 1, 1, 15, 7, 13, 3, 13 |
| | 1, 3, 16, 7, 14, 1, 14 | | | 3, 7, 14, 1, 14, 1, 15 |
| 1048 | 1, 1, 14, 1, 14, 7, 16, 3, 16, 1, 14 | | | 1, 1, 15, 1, 13, 7, 13, 1, 13, 3, 13 |

TABLE 24-continued

Japanese Hiragana characters

| No. 17. | Top | Left | Bottom | Right |
|---|---|---|---|---|
| | 1, 3, 16, 7, 14, 1, 14, 1, 14, 1, 16 | | | 3, 7, 14, 1, 14, 1, 15, 1, 14, 1, 14 |
| 1049 | 1, 11, 14, 7, 16, 3, 16, 1, 14 | | | 1, 11, 15, 7, 13, 1, 13, 3, 13 |
| | 1, 3, 16, 7, 14, 11, 14, 1, 16 | | | 3, 7, 14, 1, 14, 1, 15, 11, 14 |
| 1050 | 3, 1 | | | 1, 3 |
| | 3, 1 | | | 3, 1 |
| 1051 | 3, 1, 14, 1, 14, 1 | | | 1, 1, 15, 1, 13, 3 |
| | 3, 1, 1, 14, 1, 14 | | | 3, 1, 1, 15, 1, 14 |
| 1052 | 3, 11, 14, 1 | | | 1, 11, 15, 3 |
| | 3, 1, 11, 14 | | | 3, 1, 11, 15 |
| 1053 | 6, 5, 14, 4, 5, 13, 9, 1, 13 | | | 1, 5, 15, 5, 15, 4, 16, 9, 6, 13 |
| | 6, 5, 14, 5, 16, 9, 16, 4, 13, 1, 13 | | | 6, 9, 14, 1, 4, 16, 5, 16, 5 |
| 1054 | 6, 5, 14, 1, 14, 1, 14, 4, 5, 13, 9, 1, 13 | | | 1, 1, 15, 5, 15, 5, 15, 1, 13, 4, 16, 9, 6, 13 |
| | 6, 5, 14, 5, 16, 9, 16, 4, 13, 1, 13, 1, 14, 1, 14 | | | 6, 9, 14, 1, 4, 16, 5, 16, 5, 1, 15, 1, 14 |
| 1055 | 6, 5, 14, 11, 14, 4, 5, 13, 9, 1, 13 | | | 1, 11, 15, 5, 15, 5, 15, 4, 16, 9, 6, 13 |
| | 6, 5, 14, 5, 16, 9, 16, 4, 13, 1, 13, 11, 14 | | | 6, 9, 14, 1, 4, 16, 5, 16, 5, 11, 14 |
| 1056 | 4, 5, 13, 5, 13, 9, 1, 13 | | | 1, 5, 15, 5, 15, 4, 16, 9 |
| | 5, 5, 16, 9, 16, 4, 13, 1, 13 | | | 9, 1, 4, 16, 5, 16, 5, 16 |
| 1057 | 7, 9, 1, 13, 3, 13 | | | 1, 3, 16, 7, 16, 9 |
| | 7, 9, 1, 13, 3, 13 | | | 9, 3, 14, 7, 16, 1, 16 |
| 1058 | 4, 5, 13, 9, 9, 13 | | | 9, 5, 15, 4, 16, 9 |
| | 5, 9, 16, 4, 13, 9, 13 | | | 9, 9, 4, 16, 5, 16 |
| 1059 | 1, 3, 13, 9, 13, 7 | | | 7, 3, 16, 1, 16, 9, 16 |
| | 1, 9, 13, 3, 13, 7 | | | 9, 7, 3, 16, 1, 16 |
| 1060 | 6, 5, 13, 5, 13 | | | 6, 5, 16, 5, 16 |
| | 5, 5, 13, 6, 13 | | | 6, 5, 16, 5, 16 |
| 1061 | 1, 1, 14, 7, 13 | | | 7, 1, 15, 1, 16 |
| | 1, 7, 13, 1, 14 | | | 1, 7, 16, 1, 15 |
| 1062 | 6, 4, 14, 7, 13 | | | 7, 4, 16, 6 |
| | 6, 7, 4, 13 | | | 6, 4, 14, 7, 16 |
| 1063 | 4, 5, 9, 1, 13 | | | 1, 5, 15, 4, 16, 9 |
| | 9, 4, 1, 13, 5 | | | 9, 1, 4, 16, 5 |
| 1064 | 1, 6, 16, 7 | | | 7, 1, 15, 6 |
| | 1, 6, 16, 7 | | | 7, 6, 1, 15 |
| 1065 | 6, 4, 14 | | | 4, 6, 13 |
| | 6, 4, 14 | | | 4, 6, 15 |
| 1066 | 10, 7, 9, 1 | | | 7, 10, 1, 9 |
| | 10, 9, 16, 7, 1 | | | 9, 7, 1, 10 |
| 1067 | 4, 10, 13, 3, 13, 6 | | | 6, 3, 4, 16, 10, 16 |
| | 10, 4, 13, 3, 13, 6 | | | 4, 6, 14, 3, 16, 10, 16 |
| 1068 | 10, 7 | | | 7, 10 |
| | 10, 7 | | | 7, 10 |
| 1069 | 4, 10, 13, 7, 13 | | | 7, 4, 16, 10, 16 |
| | 10, 4, 13, 7, 13 | | | 4, 7, 16, 10, 16 |
| 1070 | 7, 9, 7, 13, 9, 1 | | | 7, 1, 9, 7, 16, 9 |
| | 7, 9, 7, 13, 9, 1 | | | 9, 9, 14, 7, 16, 7, 16, 1 |
| 1071 | 10, 7, 9, 1, 3, 11, 11 | | | 11, 7, 15, 10, 11, 3, 1, 9 |
| | 10, 9, 16, 3, 7, 1, 11, 11 | | | 3, 11, 14, 11, 9, 7, 1, 10 |
| 1072 | 3, 5, 13, 8, 9, 13 | | | 9, 8, 16, 5, 15, 3, 16 |
| | 5, 3, 13, 8, 9, 13 | | | 9, 8, 16, 3, 5, 16 |
| 1073 | 3, 11, 4 | | | 4, 11, 3 |
| | 3, 11, 4 | | | 3, 4, 14, 11 |
| 1074 | 1, 1, 14, 1, 14, 7, 16 | | | 7, 1, 15, 1, 13, 1, 13 |
| | 1, 7, 16, 1, 14, 1, 14 | | | 7, 1, 15, 1, 14, 1, 14 |
| 1075 | 1, 1, 14 | | | 1, 1, 13 |
| | 1, 1, 14 | | | 1, 1, 14 |
| 1076 | 11 | | | 11 |
| | 11 | | | 11 |
| 1077 | 1, 3 | | | 3, 1 |
| | 1, 3 | | | 3, 1 |

FIG. 22 is a diagram of the first 35 characters of the Arabic alphabet. The resolving of these characters is summarized in the following Table 25. In Table 25 the first numeral is the reference number from FIG. 22 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 25

Arabic alphabet

| No. 18. | Top | Left | Bottom | Right |
|---|---|---|---|---|
| 1101 | 9, 3 | | | 3, 9 |
| | 9, 3 | | | 3, 9 |
| 1102 | 1, 6, 2, 16 | | | 2, 6, 15, 3 |
| | 3, 2, 16, 6 | | | 2, 3, 15, 6 |
| 1103 | 9, 3, 2, 16 | | | 2, 3, 15, 9 |
| | 9, 2, 16, 3 | | | 2, 3, 15, 9 |
| 1104 | 9, 3, 9, 16, 7 | | | 7, 3, 15, 9, 9 |
| | 9, 9, 16, 3, 7 | | | 7, 9, 3, 15, 9 |
| 1105 | 2, 9, 16, 3 | | | 3, 2, 15, 9 |
| | 2, 9, 16, 3 | | | 3, 9, 2, 15 |
| 1106 | 9, 3, 9, 16, 6, 16, 7 | | | 7, 9, 6, 13, 3, 9 |
| | 9, 6, 16, 3, 7, 9 | | | 6, 7, 9, 3, 15, 9 |
| 1107 | 2 | | | 2 |
| | 2 | | | 2 |
| 1108 | 6, 4, 11, 16 | | | 11, 4, 15, 6 |
| | 6, 11, 16, 4 | | | 11, 6, 15, 4 |
| 1109 | 11, 11, 14, 7, 16, 6 | | | 7, 11, 15, 6, 11, 13 |
| | 11, 6, 16, 11, 14, 7 | | | 6, 7, 11, 15, 11, 14 |
| 1110 | 11, 11, 14, 6, 16, 4 | | | 4, 11, 15, 6, 11, 13 |
| | 11, 6, 16, 11, 14, 4 | | | 6, 4, 11, 15, 11, 14 |
| 1111 | 11, 11, 16, 11, 14, 6, 16, 4 | | | 4, 11, 15, 11, 15, 6, 11, 13 |
| | 11, 11, 16, 6, 16, 11, 14, 4 | | | 6, 4, 11, 15, 11, 14, 11, 15 |
| 1112 | 9, 11, 14 | | | 9, 11, 15 |
| | 9, 11, 14 | | | 9, 11, 14 |
| 1113 | 9 | | | 9 |
| | 9 | | | 9 |
| 1114 | 11, 9, 16 | | | 9, 11, 15 |
| | 11, 9, 16 | | | 9, 11, 15 |
| 1115 | 7 | | | 7 |
| | 7 | | | 7 |
| 1116 | 11, 7, 16 | | | 7, 11, 15 |
| | 11, 7, 16 | | | 7, 11, 15 |
| 1117 | 4 | | | 4 |
| | 4 | | | 4 |
| 1118 | 11, 4, 16 | | | 4, 11, 15 |
| | 11, 4, 16 | | | 4, 11, 15 |
| 1119 | 6, 6, 14, 6, 14, 4, 14, 4, 4 | | | 4, 6, 4, 6, 4, 6 |
| | 6, 4, 6, 6, 4, 6, 4 | | | 6, 4, 6, 6, 14, 4, 4 |
| 1120 | 11, 11, 16, 11, 14, 6, 16, 6, 6, 4, 4, 4 | | | 4, 11, 15, 11, 15, 6, 4, 11, 13, 6, 4, 6 |
| | 11, 11, 16, 6, 16, 4, 6, 14, 11, 4, 6, 4 | | | 6, 4, 6, 6, 14, 4, 4, 11, 15, 11, 14, 11, 15 |
| 1121 | 7, 6, 16, 4, 6 | | | 7, 6, 4, 6 |
| | 6, 4, 6, 7 | | | 6, 4, 6, 7 |
| 1122 | 11, 7, 16, 6, 16, 4, 6 | | | 7, 11, 15, 6, 4, 6 |
| | 11, 6, 16, 4, 6, 7 | | | 6, 4, 6, 7, 15, 11 |
| 1123 | 2, 7 | | | 7, 2 |
| | 7, 2 | | | 7, 2 |
| 1124 | 2, 11, 14, 7 | | | 7, 11, 15, 2 |
| | 7, 2, 11, 14 | | | 7, 2, 11, 15 |
| 1125 | 9, 9 | | | 9, 9 |
| | 9, 9 | | | 9, 9 |
| 1126 | 11, 9, 16, 9 | | | 9, 11, 15, 9 |
| | 11, 9, 16, 9 | | | 9, 9, 11, 15 |
| 1127 | 5 | | | 5 |
| | 5 | | | 5 |
| 1128 | 11, 9, 16, 7, 6 | | | 7, 11, 15, 9, 6 |
| | 11, 6, 16, 7, 9 | | | 6, 7, 9, 11, 15 |
| 1129 | 11, 11, 14, 9, 16, 7, 6 | | | 7, 11, 15, 9, 11, 13, 6 |
| | 11, 6, 16, 9, 11, 14, 7 | | | 6, 7, 9, 11, 15, 11, 14 |
| 1130 | 9, 4, 14, 7 | | | 4, 7, 13, 9 |
| | 7, 4, 16, 7 | | | 4, 7, 15, 9 |
| 1131 | 4, 6 | | | 4, 6 |
| | 6, 4 | | | 6, 4 |

TABLE 25-continued

Arabic alphabet

| No. 18. | Top | Left | Bottom | Right |
|---|---|---|---|---|
| 1132 | 7, 9 | | | 9, 7 |
| | 7, 9 | | | 9, 7 |
| 1133 | 11, 6, 16, 4 | | | 4, 11, 15, 6 |
| | 11, 6, 16, 4 | | | 6, 4, 11, 15 |
| 1134 | 7, 6 | | | 7, 6 |
| | 6, 7 | | | 6, 7 |
| 1135 | 9, 7 | | | 7, 9 |
| | 7, 9 | | | 7, 9 |

Figure 23:
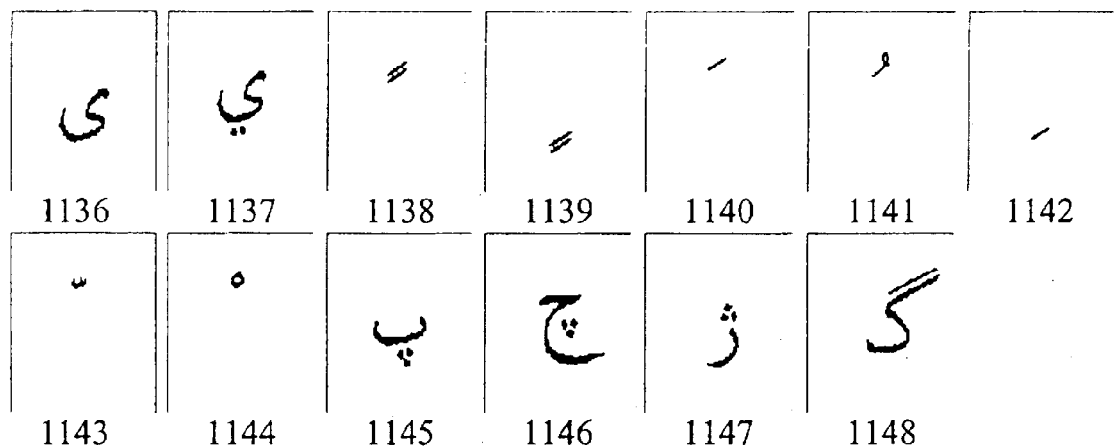
FIG. 23 is a diagram of the next 13 characters of the Arabic Alphabet.

FIG. 23 is a diagram of the last 13 characters of the Arabic alphabet. The resolving of these characters is summarized in the following Table 26. In Table 26 the first numeral is the reference number from FIG. 23 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 26

Arabic alphabet

| No. 19. | Top | Left | Bottom | Right |
|---|---|---|---|---|
| 1136 | 9, 6, 16, 7 | | | 7, 9, 6 |
| | 6, 7, 9 | | | 6, 7, 9 |
| 1137 | 9, 6, 16, 7, 11, 16, 11, 14 | | | 11, 7, 15, 9, 11, 13, 6 |
| | 6, 11, 16, 7, 11, 14, 9 | | | 11, 11, 14, 6, 15, 7, 9 |
| 1138 | 3, 3, 16 | | | 3, 3, 15 |
| | 3, 3, 16 | | | 3, 3, 15 |
| 1139 | 3, 3, 16 | | | 3, 3, 15 |
| | 3, 3, 16 | | | 3, 3, 15 |
| 1140 | 3 | | | 3 |
| | 3 | | | 3 |
| 1141 | 9, 7, 13 | | | 9, 7, 16 |
| | 7, 9, 13 | | | 7, 9, 16 |
| 1142 | 3 | | | 3 |
| | 3 | | | 3 |
| 1143 | 6, 6, 14, 4, 4 | | | 4, 6, 4, 6 |
| | 6, 4, 6, 4 | | | 6, 6, 14, 4, 4 |

TABLE 26-continued

Arabic alphabet

| No. 19. | Top | Left | Bottom | Right |
|---|---|---|---|---|
| 1144 | 11 | | | 11 |
| | 11 | | | 11 |
| 1145 | 6, 4, 11, 16, 11, 14, 11, 16 | | | 11, 11, 15, 4, 15, 11, 13, 6 |
| | 6, 11, 16, 11, 16, 4, 11, 14 | | | 11, 11, 15, 11, 14, 6, 15, 4 |
| 1146 | 9, 11, 14, 11, 14, 11, 16 | | | 9, 11, 15, 11, 15, 11, 13 |
| | 9, 11, 14, 11, 16, 11, 14 | | | 9, 11, 14, 11, 15, 11, 14 |
| 1147 | 11, 11, 16, 11, 14, 4, 16 | | | 4, 11, 15, 11, 15, 11, 13 |
| | 11, 11, 16, 4, 16, 11, 14 | | | 4, 11, 15, 11, 14, 11, 15 |
| 1148 | 3, 3, 16, 7 | | | 3, 3, 15, 7 |
| | 3, 7, 16, 3 | | | 7, 3, 3, 15 |

Figure 24:
FIG. 24 is a diagram of 41 characters of the Hebrew Alphabet.

FIG. 24 is a diagram of the 41 characters of the Hebrew alphabet. The resolving of these characters is summarized in the following Table 27. In Table 27 the first numeral is the reference number from FIG. 24 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 27

Hebrew alphabet

| No. 20. | Top | Left | Bottom | Right |
|---|---|---|---|---|
| 1201 | 1, 1, 14, 3, 9, 7 | | | 1, 1, 15, 3, 7, 13, 9 |
| | 1, 9, 7, 3, 1 | | | 7, 1, 14, 9, 3, 1 |
| 1202 | 8, 5 | | | 5, 8 |
| | 8, 5 | | | 5, 8 |
| 1203 | 9, 3 | | | 9, 3 |
| | 9, 3 | | | 3, 9 |
| 1204 | 5, 2 | | | 2, 5 |
| | 5, 2 | | | 2, 5 |
| 1205 | 5, 2, 2, 15 | | | 2, 5, 2, 13 |
| | 5, 2, 16, 2 | | | 2, 2, 14, 5 |

TABLE 27-continued

Hebrew alphabet

| No. | Top | Left | Bottom | Right |
|---|---|---|---|---|
| 1206 | 8 | | | 8 |
| | 8 | | | 8 |
| 1207 | 1, 2 | | | 2, 1 |
| | 1, 2 | | | 2, 1 |
| 1208 | 5, 2, 2 | | | 2, 5, 2 |
| | 5, 2, 2 | | | 2, 2, 5 |
| 1209 | 1, 7, 14, 6 | | | 7, 6, 1 |
| | 1, 6, 7 | | | 6, 7, 1 |
| 1210 | 7 | | | 7 |
| | 7 | | | 7 |
| 1211 | 8 | | | 8 |
| | 8 | | | 8 |
| 1212 | 7 | | | 7 |
| | 7 | | | 7 |
| 1213 | 7, 7 | | | 7, 7 |
| | 7, 7 | | | 7, 7 |
| 1214 | 8, 2, 5 | | | 5, 8, 2 |
| | 8, 2, 5 | | | 5, 2, 8 |
| 1215 | 1, 7, 3 | | | 7, 3, 13, 1 |
| | 1, 3, 7 | | | 3, 7, 14, 1 |
| 1216 | 1, 2 | | | 2, 1 |
| | 1, 2 | | | 2, 1 |
| 1217 | 1, 2, 5 | | | 5, 2, 1 |
| | 1, 5, 16, 2 | | | 5, 2, 1 |
| 1218 | 7, 6 | | | 7, 6 |
| | 7, 6 | | | 6, 7 |
| 1219 | 1, 1, 14, 2, 4 | | | 4, 1, 1, 13, 2 |
| | 1, 4, 16, 2, 1 | | | 4, 2, 1, 1 |
| 1220 | 8, 6, 16 | | | 8, 6, 13 |
| | 8, 6, 16 | | | 6, 8, 14 |
| 1221 | 7, 6, 16 | | | 7, 6, 13 |
| | 7, 6, 16 | | | 7, 6, 15 |
| 1222 | 1, 1, 14, 2, 3 | | | 3, 1, 2, 1 |
| | 1, 2, 3, 1 | | | 2, 3, 1, 1 |
| 1223 | 1, 1, 14, 7, 3 | | | 7, 3, 1, 1 |
| | 1, 7, 3, 1 | | | 7, 3, 1, 1 |
| 1224 | 7, 2, 16 | | | 7, 2, 13 |
| | 7, 2, 16 | | | 2, 7, 15 |
| 1225 | 8 | | | 8 |
| | 8 | | | 8 |
| 1226 | 1, 1, 14, 1, 14, 6, 3, 4 | | | 4, 1, 1, 13, 3, 6, 1 |
| | 1, 6, 3, 1, 4, 1 | | | 6, 4, 3, 1, 1, 1 |
| 1227 | 8, 4 | | | 8, 4 |
| | 8, 4 | | | 4, 8 |
| 1228 | 11, 11, 16 | | | 11, 11, 15 |
| | 11, 11, 16 | | | 11, 11, 15 |
| 1229 | 11, 11, 14, 11, 14, 11, 16, 11, 14 | | | 11, 11, 15, 11, 13, 11, 15, 11, 13 |
| | 11, 11, 16, 11, 14, 11, 16, 11, 14 | | | 11, 11, 14, 11, 15, 11, 14, 11, 14 |
| 1230 | 5, 11, 14, 11, 16 | | | 11, 11, 15, 5, 13 |
| | 5, 11, 16, 11, 14 | | | 5, 11, 14, 11, 15 |
| 1231 | 5, 11, 14, 2, 11, 14 | | | 11, 11, 15, 5, 13, 2 |
| | 5, 2, 11, 14, 11, 16 | | | 2, 11, 14, 5, 11, 14 |
| 1232 | 11 | | | 11 |
| | 11 | | | 11 |
| 1233 | 11, 11, 14 | | | 11, 11, 13 |
| | 11, 11, 14 | | | 11, 11, 14 |
| 1234 | 11, 11, 14, 11, 16 | | | 11, 11, 15, 11, 13 |
| | 11, 11, 16, 11, 14 | | | 11, 11, 15, 11, 14 |
| 1235 | 5 | | | 5 |
| | 5 | | | 5 |
| 1236 | 5, 2 | | | 5, 2 |
| | 5, 2 | | | 2, 5 |
| 1237 | 11, 11, 16, 11, 16 | | | 11, 11, 15, 11, 15, 15 |
| | 11, 11, 16, 11, 16 | | | 11, 11, 15, 11, 15, 15 |
| 1238 | 2 | | | 2 |
| | 2 | | | 2 |
| 1239 | 8, 8, 14 | | | 8, 8, 13 |
| | 8, 8, 14 | | | 8, 8, 14 |
| 1240 | 7, 8, 14 | | | 8, 7, 13 |
| | 7, 8, 14 | | | 7, 8, 14 |

TABLE 27-continued

Hebrew alphabet

| No. 20. | Top | Left | Bottom | Right |
|---|---|---|---|---|
| 1241 | 7, 7, 14 | | | 7, 7, 13 |
| | 7, 7, 14 | | | 7, 7, 14 |

FIG. 25 is a diagram of the 35 characters of the Devanagari alphabet. The resolving of these characters is summarized in the following Table 28. In Table 28 the first numeral is the reference number from FIG. 25 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 28

Devanagari characters

| No. 21. | Top | Left | Bottom | Right |
|---|---|---|---|---|
| 1301 | 7, 5, 14, 2, 7, 5 | | | 5, 2, 5, 9, 9 |
| | 7, 7, 5, 5, 14, 2 | | | 7, 2, 14, 5, 7, 5 |
| 1302 | 7, 5, 14, 2, 2, 7, 5 | | | 5, 2, 2, 5, 9, 9 |
| | 7, 7, 5, 5, 14, 2, 2 | | | 7, 2, 14, 2, 14, 5, 7, 5 |
| 1303 | 5, 2, 9, 7, 9, 1, 13 | | | 1, 5, 15, 7, 16, 9, 2, 9 |
| | 5, 9, 16, 9, 16, 1, 7, 13, 2 | | | 9, 1, 7, 16, 9, 2, 5 |
| 1304 | 9, 5, 2, 9, 7, 9, 1, 13 | | | 1, 5, 15, 9, 15, 7, 16, 9, 2, 9 |
| | 5, 9, 16, 9, 16, 1, 7, 13, 9, 2 | | | 9, 1, 7, 16, 9, 2, 5, 9 |
| 1305 | 5, 7, 7 | | | 7, 5, 15, 7 |
| | 5, 7, 16, 7 | | | 7, 7, 5 |
| 1306 | 5, 7, 7, 9 | | | 7, 5, 15, 7, 7 |
| | 5, 7, 16, 7, 9 | | | 7, 9, 7, 5 |
| 1307 | 5, 2, 11, 9, 14, 7, 13, 3, 9 | | | 9, 5, 15, 9, 7, 16, 2, 3, 11 |
| | 5, 11, 16, 3, 2, 7, 9, 13, 9 | | | 3, 9, 14, 2, 9, 7, 16, 11, 5 |
| 1308 | 5, 2, 9, 7, 9 | | | 9, 5, 15, 7, 2, 9 |
| | 5, 9, 16, 7, 2, 9 | | | 9, 9, 14, 7, 2, 5 |
| 1309 | 6, 4, 5, 16, 6, 4 | | | 6, 4, 15, 5, 15, 4, 6 |
| | 6, 5, 16, 4, 6, 4 | | | 6, 4, 15, 5, 6, 15, 4 |
| 1310 | 6, 8, 5, 6, 4 | | | 6, 5, 4, 8, 6 |
| | 6, 5, 16, 8, 6, 4 | | | 6, 4, 15, 5, 8, 6 |
| 1311 | 5, 6, 4 | | | 6, 5, 4 |
| | 5, 6, 4 | | | 6, 4, 15, 5 |
| 1312 | 1, 5, 6, 4 | | | 6, 5, 4, 1 |
| | 1, 5, 6, 4 | | | 6, 4, 15, 5, 1 |
| 1313 | 6, 4, 7, 16, 5, 14, 2, 2, 7, 5 | | | 5, 4, 15, 2, 6, 2, 5, 9, 9 |
| | 6, 7, 16, 4, 7, 5, 5, 2, 2 | | | 7, 2, 14, 2, 14, 5, 7, 5, 15, 6, 4 |
| 1314 | 6, 8, 7, 16, 5, 2, 2, 7, 5 | | | 5, 8, 2, 2, 6, 5, 9, 9 |
| | 7, 7, 5, 6, 14, 5, 16, 8, 6, 4 | | | 7, 2, 14, 2, 14, 5, 7, 5, 8, 6 |
| 1315 | 1, 7, 5, 16, 2, 2, 7, 5 | | | 5, 1, 2, 2, 5, 9, 9 |
| | 7, 7, 5, 5, 14, 1, 2, 2 | | | 7, 2, 14, 2, 14, 5, 7, 5, 1 |
| 1316 | 1, 1, 7, 5, 16, 2, 2, 7, 5 | | | 5, 1, 2, 1, 2, 5, 9, 9 |
| | 7, 7, 5, 5, 14, 1, 1, 2, 2 | | | 7, 2, 14, 2, 14, 5, 7, 5, 1, 1 |
| 1317 | 5, 2, 9, 8, 13 | | | 8, 5, 15, 2, 16, 9 |
| | 5, 9, 16, 8, 2, 13 | | | 2, 8, 16, 9, 5 |
| 1318 | 5, 4, 2, 9, 6 | | | 5, 2, 6, 9, 4 |
| | 5, 6, 16, 4, 9, 2 | | | 6, 2, 4, 9, 5 |
| 1319 | 5, 4, 2 | | | 5, 2, 4 |
| | 5, 4, 2 | | | 2, 4, 13, 5 |
| 1320 | 5, 9, 2, 9 | | | 5, 2, 9, 9 |
| | 5, 9, 16, 9, 2 | | | 2, 9, 9, 5 |
| 1321 | 5, 2, 9, 11, 14, 7 | | | 11, 5, 15, 7, 13, 9, 2 |
| | 5, 9, 16, 7, 2, 11, 14 | | | 7, 11, 14, 9, 2, 5 |
| 1322 | 5, 2, 5, 9 | | | 5, 2, 9, 5 |
| | 5, 5, 16, 9, 2 | | | 2, 9, 5, 5 |
| 1323 | 5, 2, 9, 9, 16, 7, 9, 8, 13 | | | 8, 5, 15, 9, 16, 2, 7, 5, 8 |
| | 5, 9, 16, 9, 7, 9, 2, 8, 13 | | | 9, 8, 14, 7, 16, 9, 9, 2, 5 |
| 1324 | 5, 2, 6, 16, 5, 14, 7 | | | 5, 2, 5, 7, 6 |
| | 5, 6, 16, 7, 5, 2 | | | 6, 2, 14, 7, 5, 5 |
| 1325 | 5, 2, 2, 9, 7, 9, 1, 13 | | | 5, 2, 9, 1, 13, 7, 2, 9 |
| | 5, 9, 16, 9, 16, 1, 7, 13, 2, 2 | | | 9, 2, 14, 1, 7, 16, 9, 2, 5 |

TABLE 28-continued

Devanagari characters

| No. 21. | Top | Left | Bottom | Right |
|---|---|---|---|---|
| 1326 | 5, 2, 7, 5, 16 | | | 5, 2, 5, 7 |
| | 5, 7, 16, 5, 2 | | | 7, 2, 14, 5, 5 |
| 1327 | 5, 2, 9 | | | 9, 5, 15, 2 |
| | 5, 9, 16, 2 | | | 9, 2, 5 |
| 1328 | 5, 2, 11 | | | 11, 5, 15, 2 |
| | 5, 11, 16, 2 | | | 11, 2, 5 |
| 1329 | 5, 2, 9, 7 | | | 7, 5, 15, 9, 2 |
| | 5, 9, 16, 7, 2 | | | 7, 9, 2, 5 |
| 1330 | 5, 2, 9, 9, 7 | | | 7, 5, 15, 9, 9, 2 |
| | 5, 9, 16, 9, 2, 7 | | | 9, 7, 9, 2, 5 |
| 1331 | 5, 6, 4, 2 | | | 5, 2, 4, 6 |
| | 5, 6, 4, 2 | | | 6, 2, 14, 4, 5 |
| 1332 | 5, 2, 9 | | | 5, 2, 9 |
| | 5, 9, 16, 2 | | | 9, 2, 5 |
| 1333 | 9, 5, 14, 7, 6, 4, 2 | | | 5, 2, 4, 6, 7, 9 |
| | 9, 6, 16, 7, 5, 14, 4, 2 | | | 2, 6, 14, 4, 7, 9, 5 |
| 1334 | 5, 2, 9, 9, 7, 13 | | | 9, 5, 15, 7, 16, 9, 2 |
| | 5, 9, 16, 9, 13, 7, 2 | | | 9, 7, 16, 9, 2, 5 |
| 1335 | 9, 5, 14, 7, 9, 2 | | | 5, 2, 9, 9, 7 |
| | 9, 9, 7, 5, 14, 2 | | | 9, 2, 9, 7, 5 |

FIG. 26 is a diagram of the 28 characters of the Devanagari alphabet. The resolving of these characters is summarized in the following Table 29. In Table 29 the first numeral is the reference number from FIG. 26 and the second column first line are the keystrokes on the FIG. 1 keyboard with a top scan as in FIG. 2. The third column first line are the keystrokes on the FIG. 1 keyboard with a right scan as in FIG. 5. The second column second line are the keystrokes on the FIG. 1 keyboard with a left scan as in FIG. 4. The third column second line are the keystrokes on the FIG. 1 keyboard with a bottom scan as in FIG. 3.

TABLE 29

Devanagari characters

| No. 22. | Top | Left | Bottom | Right |
|---|---|---|---|---|
| 1336 | 5, 2, 5, 2 | | | 5, 2, 5, 2 |
| | 5, 2, 16, 5, 2 | | | 2, 2, 14, 5, 5 |
| 1337 | 5, 2, 5, 2, 11, 16 | | | 11, 5, 15, 2, 5, 2 |
| | 5, 11, 16, 2, 16, 5, 2 | | | 11, 2, 15, 2, 5, 5 |
| 1338 | 5, 6, 2 | | | 5, 2, 6 |
| | 5, 6, 2 | | | 2, 6, 5 |
| 1339 | 5, 6, 2, 8, 13 | | | 8, 5, 15, 2, 16, 6 |
| | 5, 6, 8, 2, 13 | | | 2, 8, 16, 6, 5 |
| 1340 | 5, 2, 9, 1 | | | 5, 2, 9, 1 |
| | 5, 9, 16, 1, 2 | | | 2, 9, 1, 5 |
| 1341 | 9, 5, 14, 7, 5, 13, 2 | | | 5, 2, 5, 7, 16, 9 |
| | 9, 5, 16, 7, 13, 5, 14, 2 | | | 2, 7, 14, 5, 16, 9, 5 |
| 1342 | 5, 4, 2, 5, 13 | | | 5, 2, 5, 4, 16 |
| | 5, 4, 5, 13, 2 | | | 2, 4, 13, 5, 16, 5 |
| 1343 | 5, 7, 2, 6, 4 | | | 5, 2, 4, 6, 7 |
| | 5, 6, 16, 7, 4, 2 | | | 2, 6, 14, 4, 7, 5 |
| 1344 | 5, 4, 1 | | | 1, 5, 15, 4 |
| | 5, 1, 16, 4 | | | 1, 4, 5 |
| 1345 | 5, 4, 1, 11, 16 | | | 11, 1, 15, 5, 15, 4 |
| | 5, 11, 16, 1, 16, 4 | | | 11, 1, 15, 4, 5 |
| 1346 | 5, 2, 9, 16, 3 | | | 5, 2, 3, 9 |
| | 5, 9, 16, 3, 2 | | | 9, 2, 14, 3, 5 |
| 1347 | 5, 2, 9, 16, 7, 3 | | | 7, 5, 15, 2, 3, 9 |
| | 5, 9, 16, 3, 7, 2 | | | 9, 7, 14, 3, 2, 5 |
| 1348 | 5, 2, 9, 16, 7, 3, 11, 16 | | | 11, 7, 15, 5, 15, 2, 3, 9 |
| | 5, 11, 16, 9, 16, 3, 7, 2 | | | 11, 9, 15, 7, 14, 3, 2, 5 |
| 1349 | 5, 2, 9 | | | 5, 2, 9 |
| | 5, 9, 16, 2 | | | 2, 9, 5 |
| 1350 | 5, 9, 7, 2, 9, 1, 13 | | | 5, 2, 1, 7, 9, 9 |
| | 5, 9, 16, 9, 1, 7, 13, 2 | | | 1, 2, 14, 9, 7, 16, 9, 5 |
| 1351 | 5, 6, 1, 2 | | | 5, 2, 6, 1 |
| | 5, 6, 1, 2 | | | 2, 6, 1, 5 |

TABLE 29-continued

Devanagari characters

| No. 22. | Top | Left | Bottom | Right |
|---|---|---|---|---|
| 1352 | 5, 4, 2, 5, 13, 1 | | | 5, 2, 5, 1, 4 |
| | 5, 1, 16, 4, 5, 13, 2 | | | 1, 2, 14, 4, 5, 16, 5 |
| 1353 | 5, 2, 9, 9 | | | 9, 5, 15, 9, 2 |
| | 5, 9, 16, 9, 2 | | | 9, 9, 2, 5 |
| 1354 | 5, 2, 9, 8, 13, 11, 16 | | | 11, 8, 15, 5, 15, 2, 16, 9 |
| | 5, 11, 16, 9, 16, 8, 2, 13 | | | 11, 2, 15, 8, 16, 9, 5 |
| 1355 | 5, 4, 2, 9, 6, 11, 16 | | | 11, 5, 15, 2, 6, 9, 4 |
| | 5, 11, 16, 6, 16, 4, 9, 2 | | | 11, 6, 15, 2, 4, 9, 5 |
| 1356 | 5, 4, 2, 11, 16 | | | 11, 5, 15, 2, 4 |
| | 5, 11, 16, 4, 2 | | | 11, 2, 15, 4, 13, 5 |
| 1357 | 5, 2, 6, 16, 5, 14, 7, 11, 16 | | | 11, 5, 15, 2, 5, 7, 6 |
| | 5, 11, 16, 6, 16, 7, 5, 2 | | | 11, 6, 15, 2, 14, 7, 5, 5 |
| 1358 | 5, 2, 9, 7, 11, 16 | | | 11, 7, 15, 5, 15, 9, 2 |
| | 5, 11, 16, 9, 16, 7, 2 | | | 11, 7, 15, 9, 2, 5 |
| 1359 | 5, 2, 9, 9, 7, 11, 16 | | | 11, 7, 15, 5, 15, 9, 9, 2 |
| | 5, 11, 16, 9, 16, 9, 2, 7 | | | 11, 9, 15, 7, 9, 2, 5 |
| 1360 | 5, 6, 2, 8, 13, 11, 16 | | | 11, 8, 15, 5, 15, 2, 16, 6 |
| | 5, 11, 16, 6, 8, 2, 13 | | | 11, 2, 15, 8, 13, 6, 5 |
| 1361 | 5, 7, 2, 6, 4, 11, 16 | | | 11, 5, 15, 2, 4, 6, 7 |
| | 5, 11, 16, 6, 16, 7, 4, 2 | | | 11, 2, 15, 6, 14, 4, 7, 5 |
| 1362 | 5, 2, 11, 16, 9, 14, 7, 13, 3, 9, 9 | | | 9, 5, 15, 9, 9, 7, 16, 2, 3, 11 |
| | 5, 11, 16, 3, 2, 7, 9, 13, 9, 9 | | | 3, 9, 14, 2, 9, 9, 7, 16, 11, 5 |
| 1363 | 5, 2, 9, 7, 9, 9 | | | 9, 5, 15, 9, 7, 2, 9 |
| | 5, 9, 16, 7, 2, 9, 9 | | | 9, 9, 14, 9, 7, 2, 5 |

The signal from the FIG. 1 keyboard may be conveyed to an input device in several ways. The simplest way is to interpose a lookup table between the FIG. 1 keyboard and the device. A lookup table is embodied in either a programmable Read Only Memory chip or in software. When a string of keystrokes is inputted into the lookup table it returns the character associated with that string.

An equivalent to the lookup table may also be constructed by applying principles of Boolean algebra to the Tables above. The tables above can be reduced by such methods to a series of logical gates. While it is conceivable such gates could be hard wired into a logic network to give the desired output it is more likely that the gates would be virtual and embodied in embedded software.

Figure 27:
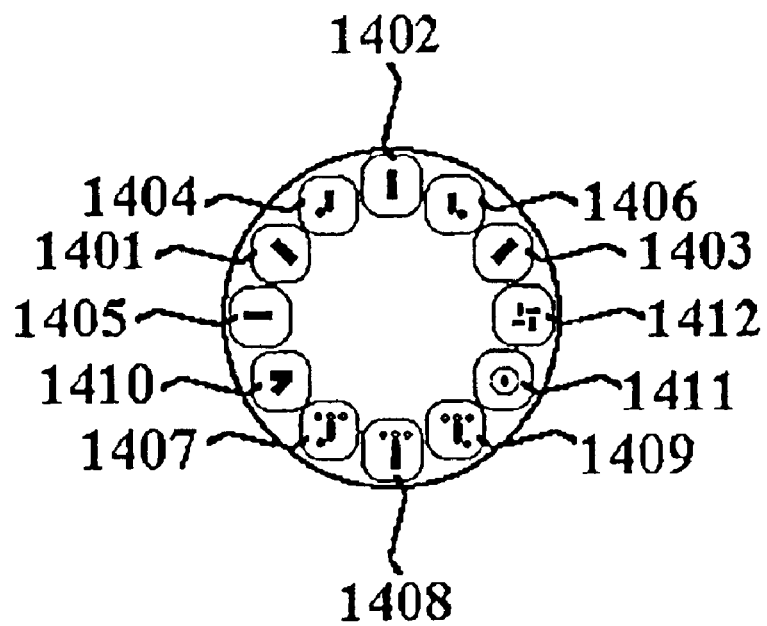
FIG. 27 is a diagram of a second embodiment of the input device of the invention.

FIG. 27 is a diagram of a second embodiment of the input device of the invention. FIG. 27 illustrates a second virtual keyboard. FIG. 27 is a reproduction of the screen on graphic user interface (GUI) device. In such devices a cursor is moved to different portions of a screen by an input device (not shown). The input devices usable include mice, joysticks, game-pads, and arrow keys on an conventional 101 keyboard. When the cursor is moved to a position or hot spot on the screen and activated a signal is produced which the device recognizes as the symbol portrayed on the screen. Icons 1401–1412 are arranged in a circle on the screen. Icon 1401 corresponds to key 1 in FIG. 1. Activation of icons 1401–1411 causes a reaction equivalent to pressing keys 1–11 in FIG. 1. Opposite side icon 1412 shifts the display to the FIG. 28 configuration.

Figure 28:
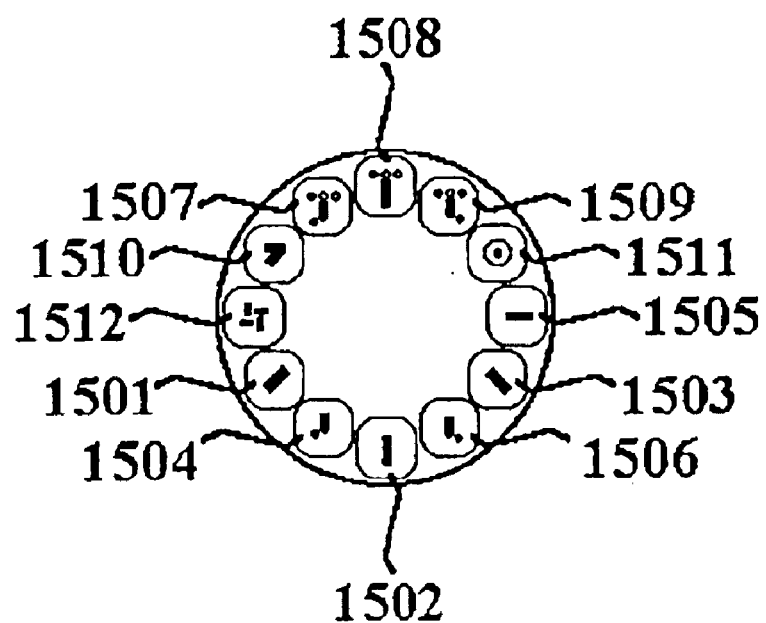
FIG. 28 is a diagram of a third embodiment of the input device of the invention.

In FIG. 28 the icons 1501–1512 are equivalent to key 1–12 in the FIG. 1 embodiments. For example, icon 1501 in FIG. 28 is equivalent to key 1 in FIG. 1. Icons 1501–1512 are arranged in a circle on the screen. Icons 1501–1512 are arranged in a circle on the screen. Icon 1501 corresponds to key 1 in FIG. 1. Activation of icons 1501–1511 causes a reaction equivalent to pressing keys 1–11 in FIG. 1. Opposite side icon 1512 shifts the display to the FIG. 27 configuration.

Figure 29:
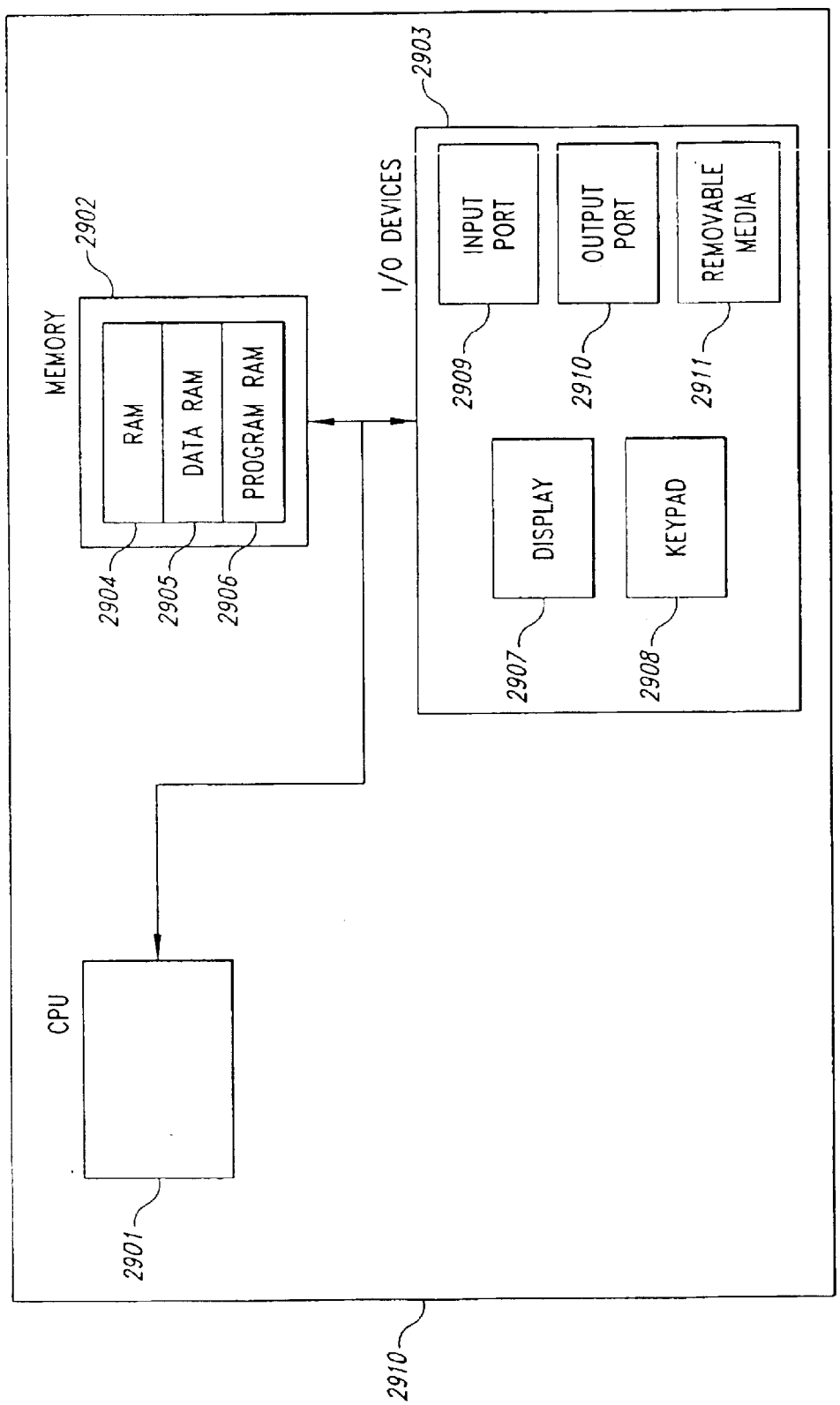
FIG. 29 is a functional block diagram of an embodiment of a computer system of the invention.

FIG. 29 is a functional block diagram of a computer system 2900 for practicing exemplary embodiments of the method and apparatus for input of alphanumeric data from a 12-key keypad. The system according to the present invention contains a Central Processing Unit (CPU) 2901, a computer memory 2902, and input/output devices 2903. One skilled in the art will appreciate that the functions provided by the CPU 2901 may be implemented by any conventional processing device, such as a microprocessor, programmable controller, Programmable Logic Array (PLA), Digital Signal Processor (DSP), Application Specific Integrated Circuit (ASIC), or the like. The present invention is not limited by the specific device selected to implement the function of the CPU 2901.

The memory 2902 comprises random access memory (RAM) 2904, a data read-only memory (ROM) 2905, and a program ROM 2906. The RAM 2904 is a read and write memory used for storing the status of dynamic variables used in the execution of the program that is typically executed from the program ROM 2906. The data ROM 2905 contains data needed to implement the invention including tables containing stroke sequences of character sets according to various scanning algorithms. The program ROM 2906 contains a program for execution by the CPU 2901. For clarity, the data ROM 2905 and program ROM 2906 are illustrated in FIG. 29 as separate portions of the memory 2902 since each portion stores a different form of information. However, those skilled in the art will recognize that other memory configurations can be implemented with a single ROM portion. Furthermore, a portion of the RAM 2904 may be non-volatile RAM that can be used to implement part or all of the data ROM 2905 and program ROM 2906. One skilled in the art will also appreciate that volatile memories may be substituted for nonvolatile memories as long as a means of programming the memory is provided.

The input/output devices 2903 comprise a display 2907, a keypad 2908, an input port 2909 and output port 2910. The display 2907 may vary greatly in form depending upon the application for which a particular implementation of the invention is desired. For many applications a liquid crystal display (LCD) will be suitable, although electroluminescent displays and LED displays may be used as well. For desktop applications, a CRT may be used. The keypad 2908 allows for tactile input of stroke sequences and mode commands. FIG. 1 illustrates one embodiment of the keypad 2908, such as may be used in a hand-held device or wireless communication device (e.g., a cellular telephone). One skilled in the art will appreciate that real switches may be used or even virtual switches such as those displayed on a screen that are activated by means of a touch sensitive input device or a user-positionable cursor and selection device.

The input port 2909 and the output port 2910 may be implemented by any suitable bus or communication device. One skilled in the art will recognize that a wireless medium using bidirectional radio frequency communications, a bidirectional optical or infrared bus, or hardwired buses such as IEEE 1394, universal serial bus, and RS-232 buses may be used as well.

If implemented as a wireless communication device, such as a cellular telephone or personal digital assistant (PDA), the input port 2909 and output port 2910 may be implemented as a transmitter and receiver, respectively. Such implementation would permit "over-the-air" programming wherein the user can select one or more language character sets for downloading. Over-the-air programming is known in the art and need not be described in detail herein. For example, the device may access a server via a computer network, such as the Internet, to download selected character sets or other data.

In a similar implementation, the system 2900 may be coupled to a computer network (e.g., the Internet) via another computer, such as a personal computer (PC). The computer system 2900 may be connected to a PC using a cable and download data (e.g., character sets) in a conventional manner using, by way of example, one of the communication technologies described above. Alternatively, the system 2900 could be coupled to the PC using wireless technology, such as Bluetooth wireless communications technology. The present invention is not limited by the manner in which data, such as character sets, are provided to the system 2900.

In addition the system 2900 may contain removable media 2911 such as might be found in a memory cartridge, a diskette, or a smartcard. The removable media 2911 may be used to augment the memory 2902 provided the access time of the removable media 2911 does not appreciably degrade system performance. One skilled in the art will appreciate that the CPU 2901 may copy the program from the removable media 2911 or the program ROM 2906 to the RAM 2904 for faster execution or other reasons. One skilled in the art will appreciate that the smartcard may contain information that is personal to the owner of the smartcard and may be used to inform a system according to the present invention to, for example, use a particular language character set. For example, a plug-in module known as a subscriber identity module (SIM) is often used in cellular telephones. A SIM can be used in the system 2900 to provide data, such as character sets. The user can interchange SIMs to change character sets.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A keyboard for inputting data to electronic devices comprising, a plurality of keys in a rectangular array of keys wherein each of said keys is assigned to a basic stroke of handwriting, and wherein all keys assigned to leftward facing strokes are located on the leftmost column of keys on said keyboard and all keys assigned to rightward facing stroke are located in the rightmost column of said keyboard.

2. A keyboard as in claim 1 wherein all key assigned to vertical horizontal, downward ending and circular strokes are located a centrally located column of said keyboard.

3. An arbitrary symbol entry system comprising:
a keypad having keys that represent strokes included in a set of symbols wherein the keys are arranged in a rectangular array wherein each of said keys is assigned to a basic stroke of handwriting wherein keys assigned to leftward facing strokes are located on the leftmost column of keys on said keyboard and all keys assigned to rightward facing strokes are located in the rightmost column of said keyboard;
a data structure comprising sequences of strokes for each symbol in the set of symbols wherein the sequences are determined by a first predetermined scan pattern applied to each symbol in the set of symbols; and
a symbol retriever that accepts a keypad activation sequences from the keypad; searches the data structure for sequences that match the entered sequence; and returns a symbol that is matched by the entered sequences of strokes.

4. The system of claim 3 wherein the sequences of strokes comprise digital representations of the strokes used to decompose each symbol.

5. The system of claim 3 wherein each of the keys represents a different stroke included, in the set of symbols.

6. The system of claim 3 wherein the symbol retriever locates a desired symbol by matching the strokes represented by a sequence of activated keys with a selected sequence of strokes stored in the data structure.

7. The system of claim 3 wherein each of the keypad keys depicts a printed symbology corresponding to a different stroke included in the set of symbols, the data structure containing stroke sequences corresponding to selected ones of the keypad keys.

8. The system of claim 3 wherein the data structure contains a second sequence of strokes that references an identical symbol, and the second sequence of strokes being determined by a second predetermined scan pattern different from the first predetermined scan pattern.

9. A keypad having keys that represent strokes included in a set of symbols wherein the keys are arranged in circular pattern wherein each of said keys is assigned to a basic stroke of handwriting wherein all keys assigned to leftward facing strokes are located on the left side of the circular pattern and all keys assigned to rightward facing strokes are located on the right side of the circular pattern.

10. A keypad as in claim 9 wherein keys assigned to downward ending strokes are located in the top center and bottom center of the circular pattern.

* * * * *

UNITED STATES PATENT AND TRADEMARK OFFICE
CERTIFICATE OF CORRECTION

PATENT NO. : 6,837,633 B2
DATED : January 4, 2005
INVENTOR(S) : Philip C. Lorenzo It is certified that error appears in the above-identified patent and that said Letters Patent is hereby corrected as shown below:

<u>Column 78,</u>
Line 22, change "stroke" to -- strokes --.
Line 31, after "wherein" insert -- all --.
Line 50, change "included," to -- included --.

Signed and Sealed this

Seventh Day of June, 2005

JON W. DUDAS
*Director of the United States Patent and Trademark Office*